(12) United States Patent
Frempong et al.

(10) Patent No.: US 10,235,511 B2
(45) Date of Patent: Mar. 19, 2019

(54) AUTHENTICATION INTEGRITY PROTECTION

(71) Applicant: Pearson Education, Inc., New York, NY (US)

(72) Inventors: Derek K. Frempong, Perry Hall, MD (US); Geanie Paek, Clarksville, MD (US); Andrew Silverman, Ellicot, MD (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 15/991,926

(22) Filed: May 29, 2018

(65) Prior Publication Data

US 2018/0341760 A1    Nov. 29, 2018

Related U.S. Application Data

(63) Continuation-in-part of application No. 14/256,857, filed on Apr. 18, 2014.

(60) Provisional application No. 61/813,958, filed on Apr. 19, 2013.

(51) Int. Cl.

| G06F 7/04 | (2006.01) |
|---|---|
| G06F 21/32 | (2013.01) |
| G06F 21/62 | (2013.01) |
| H04L 29/06 | (2006.01) |

(52) U.S. Cl.
CPC .............. *G06F 21/32* (2013.01); *G06F 21/62* (2013.01); *H04L 63/083* (2013.01); *H04L 63/0807* (2013.01); *H04L 63/0861* (2013.01)

(58) Field of Classification Search
None
See application file for complete search history.

(56) References Cited

U.S. PATENT DOCUMENTS

| 6,256,737 B1 | 7/2001 | Bianco |
|---|---|---|
| 6,976,168 B1 | 12/2005 | Branstad et al. |
| 7,216,361 B1 | 5/2007 | Roskind et al. |

(Continued)

FOREIGN PATENT DOCUMENTS

WO    WO2006069158 A2    7/2007

*Primary Examiner* — Brandon S Hoffman
(74) *Attorney, Agent, or Firm* — Kilpatrick Townsend and Stockton LLP

(57) ABSTRACT

Systems, methods, and processor-readable media are disclosed to adaptively secure access operations with respect to electronic resources. A request from an endpoint device may be detected, and adaptive authentication may be initiated. Identifiers for the endpoint device may be generated or retrieved. An access-right indicator may be identified to facilitate determination of whether particularized access for electronic resources is to be granted. Initiation of access events by the endpoint device may be detected. Sensor-based data that is based on a first set of sensors capturing phenomena at the endpoint device may be received. A particularized specification of recognized patterns mapped to the access-right indicator may be adaptively developed. A nonconformance of additional data with respect to the particularized specification may be detected. Responsive to the nonconformance, an activation adjustment in sensor operation may be selectively caused, and subsequent sensor-based data may be collected based on the activation adjustment.

20 Claims, 25 Drawing Sheets

(56) References Cited

U.S. PATENT DOCUMENTS

| | | |
|---|---|---|
| 8,646,060 B1 | 2/2014 | Ayed |
| 8,875,267 B1 | 10/2014 | Kolman et al. |
| 2006/0218393 A1 | 9/2006 | Hernandez et al. |
| 2007/0143832 A1 | 6/2007 | Perrella et al. |
| 2010/0217837 A1* | 8/2010 | Ansari .................. G06Q 30/04 709/218 |
| 2012/0244508 A1 | 9/2012 | Katz |
| 2014/0289790 A1 | 9/2014 | Wilson |
| 2014/0289833 A1 | 9/2014 | Briceno et al. |
| 2014/0315181 A1 | 10/2014 | Frempong et al. |
| 2014/0366128 A1 | 12/2014 | Venkateswaran et al. |
| 2015/0310444 A1 | 10/2015 | Chen et al. |
| 2016/0063235 A1 | 3/2016 | Tussy |

\* cited by examiner

AUTHENTICATION INTEGRITY PROTECTION

CROSS-REFERENCES TO RELATED APPLICATIONS

This application is a continuation-in-part of U.S. application Ser. No. 14/256,857, filed on Apr. 18, 2014, and entitled "ACADEMIC INTEGRITY PROTECTION," which claims benefit to U.S. Provisional Application No. 61/813,958, filed on Apr. 19, 2013, and entitled "ACADEMIC INTEGRITY PROTECTION."

BACKGROUND

Disclosed embodiments of the present disclosure relate generally to authentication, and in particular to systems, methods, and processor-readable media for authentication integrity protection.

Maintaining authentication integrity is paramount to fully securing access to computer systems. As use, access, and demand corresponding to computer systems continue to increase, circumvention of authentication measures continues to develop and to become more of a concern. Traditional means of authentication has been limited, failing to address various types of circumvention. Thus, there is a need for improvements in systems, methods, and processor-readable media that address the foregoing problems. This and other needs are addressed by the present disclosure.

BRIEF SUMMARY

Disclosed embodiments of the present disclosure relate generally to authentication, and in particular to systems, methods, and processor-readable media for authentication integrity protection.

In one aspect, an adaptive authentication system to adaptively secure a set of access operations with respect to one or more electronic resources is disclosed. The adaptive authentication system may include one or more adaptive processing devices and one or more non-transitory, computer-readable storage media storing instructions which, when executed by the one or more adaptive processing devices, cause the one or more adaptive processing devices to perform actions disclosed herein. The actions may include detecting a request received via an endpoint device, and initiating adaptive authentication with respect to the endpoint device. For example, the adaptive authentication one or a combination of the following. Responsive to the request, one or more identifiers for the endpoint device may be generated or retrieved. The one or more identifiers may uniquely correspond to the endpoint device amongst a set of endpoint devices. An access-right indicator may be identified, the access-right indicator configured to facilitate determination of whether particularized access for electronic resources is to be granted. Initiation of a set of one or more access events by the endpoint device may be detected. Sensor-based data that is based at least in part on a first set of one or more sensors at the endpoint device capturing phenomena at the endpoint device may be received, where the first set of one or more sensors is communicatively connected to the one or more adaptive processing devices. A particularized specification of one or more recognized patterns mapped to the access-right indicator may be adaptively developed based at least in part on processing the sensor-based data, the particularized specification of the one or more recognized patterns including one or more recognized patterns of sensor input. Additional data, which is one or more of based at least in part on the first set of one or more sensors, based at least in part on a second set of one or more sensors at the endpoint device, and/or based at least in part on input via an input interface of the endpoint device, may be received. A nonconformance of the additional data with respect to the particularized specification of the one or more recognized patterns mapped to the access-right indicator may be detected. Responsive to the detection of the nonconformance, an activation adjustment in operation of one or both of the first set of one or more sensors and the second set of one or more sensors may be selectively caused, and subsequent sensor-based data may be collected based at least in part on the activation adjustment of one or both of the first set of one or more sensors and the second set of one or more sensors.

In another aspect, one or more non-transitory, processor-readable media are disclosed as having processor-readable instructions thereon which, when executed by one or more processing devices, cause the one or more processing devices to facilitate adaptively securing a set of access operations with respect to one or more electronic resources by performing actions disclosed herein. The actions may include detecting a request received via an endpoint device, and initiating adaptive authentication with respect to the endpoint device. For example, the adaptive authentication one or a combination of the following. Responsive to the request, one or more identifiers for the endpoint device may be generated or retrieved. The one or more identifiers may uniquely correspond to the endpoint device amongst a set of endpoint devices. An access-right indicator may be identified, the access-right indicator configured to facilitate determination of whether particularized access for electronic resources is to be granted. Initiation of a set of one or more access events by the endpoint device may be detected. Sensor-based data that is based at least in part on a first set of one or more sensors at the endpoint device capturing phenomena at the endpoint device may be received, where the first set of one or more sensors is communicatively connected to the one or more adaptive processing devices. A particularized specification of one or more recognized patterns mapped to the access-right indicator may be adaptively developed based at least in part on processing the sensor-based data, the particularized specification of the one or more recognized patterns including one or more recognized patterns of sensor input. Additional data, which is one or more of based at least in part on the first set of one or more sensors, based at least in part on a second set of one or more sensors at the endpoint device, and/or based at least in part on input via an input interface of the endpoint device, may be received. A nonconformance of the additional data with respect to the particularized specification of the one or more recognized patterns mapped to the access-right indicator may be detected. Responsive to the detection of the nonconformance, an activation adjustment in operation of one or both of the first set of one or more sensors and the second set of one or more sensors may be selectively caused, and subsequent sensor-based data may be collected based at least in part on the activation adjustment of one or both of the first set of one or more sensors and the second set of one or more sensors.

In yet another aspect, a method of adaptive authentication to adaptively secure a set of access operations with respect to one or more electronic resources is disclosed. The method may include one or a combination of the following. A request received via an endpoint device may be detected, and adaptive authentication with respect to the endpoint device may be initiated. For example, the adaptive authentication one or a combination of the following. Responsive to the request, one or more identifiers for the endpoint device may be generated or retrieved. The one or more identifiers may uniquely correspond to the endpoint device amongst a set of endpoint devices. An access-right indicator may be identified, the access-right indicator configured to facilitate determination of whether particularized access for electronic resources is to be granted. Initiation of a set of one or more access events by the endpoint device may be detected. Sensor-based data that is based at least in part on a first set of one or more sensors at the endpoint device capturing phenomena at the endpoint device may be received, where the first set of one or more sensors is communicatively connected to the one or more adaptive processing devices. A particularized specification of one or more recognized patterns mapped to the access-right indicator may be adaptively developed based at least in part on processing the sensor-based data, the particularized specification of the one or more recognized patterns including one or more recognized patterns of sensor input. Additional data, which is one or more of based at least in part on the first set of one or more sensors, based at least in part on a second set of one or more sensors at the endpoint device, and/or based at least in part on input via an input interface of the endpoint device, may be received. A nonconformance of the additional data with respect to the particularized specification of the one or more recognized patterns mapped to the access-right indicator may be detected. Responsive to the detection of the nonconformance, an activation adjustment in operation of one or both of the first set of one or more sensors and the second set of one or more sensors may be selectively caused, and subsequent sensor-based data may be collected based at least in part on the activation adjustment of one or both of the first set of one or more sensors and the second set of one or more sensors.

In various embodiments, the systems, methods, and processor-readable media disclosed herein may further include one or a combination of the following. In disclosed embodiments, consequent to the request received via the endpoint device, activation of the first set of one or more sensors at the endpoint device may be caused. In disclosed embodiments, performance of at least part of the set of one or more access events may be selectively permitted based at least in part on processing the subsequent sensor-based data and matching one or more derived values corresponding to the subsequent sensor-based data to one or more stored values mapped to the access-right indicator.

In disclosed embodiments, after the selectively permitting performance, subsequently detected data may be received that is one or more of based at least in part on the first set of one or more sensors, based at least in part on the second set of one or more sensors at the endpoint device, based at least in part on a third set of one or more sensors at the endpoint device, and/or based at least in part on additional input via the input interface of the endpoint device. A subsequent nonconformance of the subsequently detected data with respect to the particularized specification of the one or more recognized patterns mapped to the access-right indicator may be detected. Responsive to the detection of the subsequent nonconformance, a subsequent activation adjustment in operation of one or more of the first set of one or more sensors, the second set of one or more sensors, and/or the second set of one or more sensors may be selectively caused. Further access may be selectively prohibited based at least in part on the subsequent activation adjustment.

In disclosed embodiments, performance of at least part of the set of one or more access events may be selectively prohibited based at least in part on processing the subsequent sensor-based data and detecting a mismatch of one or more derived values corresponding to the subsequent sensor-based data to one or more stored values mapped to the access-right indicator. In disclosed embodiments, the subsequent sensor-based data may be stored in association with the one or more identifiers for the endpoint device. A communication to a second endpoint device to facilitate authenticated access to the subsequent sensor-based data consequent to authentication of the second endpoint device by the one or more adaptive processing devices. In disclosed embodiments, the particularized specification of the one or more recognized patterns of the sensor input mapped to the access-right indicator may include a set of values corresponding to anticipated sensor input. The subsequent sensor-based data may be processed, and one or more derived values corresponding to the subsequent sensor-based data may be compared to the set of values.

In still another aspect, an adaptive authentication system to adaptively secure a set of access operations with respect to one or more electronic resources is disclosed as including one or a combination of the following. The adaptive authentication system may include one or more adaptive processing devices and one or more non-transitory, computer-readable storage media storing instructions which, when executed by the one or more adaptive processing devices, cause the one or more adaptive processing devices to perform actions disclosed herein. For example, a request received via an endpoint device may be detected, and, responsive to the request, an access-right indicator may be identified that is configured to facilitate determination of whether particularized access for electronic resources is to be granted. One or more identifiers for the endpoint device may be generated or retrieved, the one or more identifiers uniquely corresponding to the endpoint device amongst a set of endpoint devices. Initiation of a set of one or more access events initiated by the endpoint device may be detected. Sensor-based data may be received that is based at least in part on a first set of one or more sensors at the endpoint device capturing phenomena at the endpoint device, where the first set of one or more sensors is communicatively connected to the one or more adaptive processing devices. Additional data may be received that is one or more of based at least in part on the first set of one or more sensors, based at least in part on a second set of one or more sensors at the endpoint device, and/or based at least in part on input via an input interface of the endpoint device. A set of one or more authentication rules specified by a protocol record may be accessed, the set of one or more authentication rules including criteria for endpoint authentication. A particularized specification of one or more recognized patterns mapped to the access-right indicator may be adaptively developed based at least in part on processing the additional data. An endpoint qualification that is based at least in part on the particularized specification of one or more recognized patterns and the criteria for endpoint authentication may be generated. An activation adjustment in operation of one or more of the first set of one or more sensors, the second set of one or more sensors, a third set of one or more sensors, and/or a communication interface may be selected. A command to cause the activation adjustment may be transferred.

In still another aspect, one or more non-transitory, processor-readable media are disclosed as having processor-readable instructions thereon which, when executed by one or more processing devices, cause the one or more processing devices to facilitate adaptively securing a set of access operations with respect to one or more electronic resources by performing actions disclosed herein. The actions may include one or a combination of the following. For example, a request received via an endpoint device may be detected, and, responsive to the request, an access-right indicator may be identified that is configured to facilitate determination of whether particularized access for electronic resources is to be granted. One or more identifiers for the endpoint device may be generated or retrieved, the one or more identifiers uniquely corresponding to the endpoint device amongst a set of endpoint devices. Initiation of a set of one or more access events initiated by the endpoint device may be detected. Sensor-based data may be received that is based at least in part on a first set of one or more sensors at the endpoint device capturing phenomena at the endpoint device, where the first set of one or more sensors is communicatively connected to the one or more adaptive processing devices. Additional data may be received that is one or more of based at least in part on the first set of one or more sensors, based at least in part on a second set of one or more sensors at the endpoint device, and/or based at least in part on input via an input interface of the endpoint device. A set of one or more authentication rules specified by a protocol record may be accessed, the set of one or more authentication rules including criteria for endpoint authentication. A particularized specification of one or more recognized patterns mapped to the access-right indicator may be adaptively developed based at least in part on processing the additional data. An endpoint qualification that is based at least in part on the particularized specification of one or more recognized patterns and the criteria for endpoint authentication may be generated. An activation adjustment in operation of one or more of the first set of one or more sensors, the second set of one or more sensors, a third set of one or more sensors, and/or a communication interface may be selected. A command to cause the activation adjustment may be transferred.

In a further aspect, a method of adaptive authentication to adaptively secure a set of access operations with respect to one or more electronic resources is disclosed as including one or a combination of the following. A request received via an endpoint device may be detected, and, responsive to the request, an access-right indicator may be identified that is configured to facilitate determination of whether particularized access for electronic resources is to be granted. One or more identifiers for the endpoint device may be generated or retrieved, the one or more identifiers uniquely corresponding to the endpoint device amongst a set of endpoint devices. Initiation of a set of one or more access events initiated by the endpoint device may be detected. Sensor-based data may be received that is based at least in part on a first set of one or more sensors at the endpoint device capturing phenomena at the endpoint device, where the first set of one or more sensors is communicatively connected to the one or more adaptive processing devices. Additional data may be received that is one or more of based at least in part on the first set of one or more sensors, based at least in part on a second set of one or more sensors at the endpoint device, and/or based at least in part on input via an input interface of the endpoint device. A set of one or more authentication rules specified by a protocol record may be accessed, the set of one or more authentication rules including criteria for endpoint authentication. A particularized specification of one or more recognized patterns mapped to the access-right indicator may be adaptively developed based at least in part on processing the additional data. An endpoint qualification that is based at least in part on the particularized specification of one or more recognized patterns and the criteria for endpoint authentication may be generated. An activation adjustment in operation of one or more of the first set of one or more sensors, the second set of one or more sensors, a third set of one or more sensors, and/or a communication interface may be selected. A command to cause the activation adjustment may be transferred.

In various embodiments, the systems, methods, and processor-readable media disclosed herein may further include one or a combination of the following. In disclosed embodiments, performance of at least part of the set of one or more access events may be selectively permitted or prohibited based at least in part on processing subsequent sensor-based data consequent to the activation adjustment. In disclosed embodiments, the endpoint qualification may include an authentication score that is mapped to a characterization corresponding to the endpoint device. In disclosed embodiments, the first set of one or more sensors may correspond to a first sensor type, and the second set of one or more sensors may correspond to a second sensor type that is different from the first sensor type. In disclosed embodiments, the third set of one or more sensors may correspond to a third sensor type that is different from the first sensor type and the second sensor type. In disclosed embodiments, the one or more recognized patterns mapped to the access-right indicator may correspond to one or more of an identification pattern, an action pattern, a location pattern, and/or a temporal pattern. In disclosed embodiments, the criteria for endpoint authentication may specify a first weight accorded to a first type of sensor-based data generated based at least in part on the first set of one or more sensors, and a second weight accorded to a second type of sensor-based data generated based at least in part on the second set of one or more sensors.

In a further aspect, an adaptive authentication system to adaptively secure a set of access operations with respect to one or more electronic resources is disclosed as including one or a combination of the following. The adaptive authentication system may include one or more adaptive processing devices and one or more non-transitory, computer-readable storage media storing instructions which, when executed by the one or more adaptive processing devices, cause the one or more adaptive processing devices to perform actions disclosed herein. The action may include one or a combination of the following. Initiation of a set of one or more access events initiated by the endpoint device may be detected. Adaptive authentication with respect to the endpoint device may be caused and may include one or a combination of the following. A stage of authentication of the endpoint device may be initiated. The stage of authentication may include activation of one or both of a first set of one or more sensors at the endpoint device and a second set of one or more sensors at the endpoint device to capture phenomena at the endpoint device. One or both of the first set of one or more sensors and the second set of one or more sensors may be communicatively connected to the one or more adaptive processing devices. The first set of one or more sensors may correspond to a first sensor type. The second set of one or more sensors may correspond to a second sensor type that is different from the first sensor type. Sensor-based data may be received that is based at least in part on one or both the first set of one or more sensors and/or the second set of one or more sensors first set of one or more sensors activated with the first stage of authentication. Additional sensor-based data detected at the endpoint device may be received. A deviation of at least part of the additional data with respect to the sensor-based data previously received may be detected. An authentication score with respect to the endpoint device may be generated that is based at least in part on the additional sensor-based data and the sensor-based data previously received. One or more additional stages of authentication of the endpoint device may be initiated at least in part by transferring a command to cause an activation adjustment that is a function of the authentication score, where the activation adjustment adjusts operation of one or more of the first set of one or more sensors, the second set of one or more sensors, and/or a third set of one or more sensors. Consequent to the one or more additional stages of authentication, further sensor-based data detected at the endpoint device may be received, and access of the endpoint device to resources may be controlled based at least in part on the further sensor-based data.

In yet a further aspect, one or more non-transitory, processor-readable media are disclosed as having processor-readable instructions thereon which, when executed by one or more processing devices, cause the one or more processing devices to facilitate adaptively securing a set of access operations with respect to one or more electronic resources by performing actions disclosed herein. The actions may include one or a combination of the following. For example, initiation of a set of one or more access events initiated by the endpoint device may be detected. Adaptive authentication with respect to the endpoint device may be caused and may include one or a combination of the following. A stage of authentication of the endpoint device may be initiated. The stage of authentication may include activation of one or both of a first set of one or more sensors at the endpoint device and a second set of one or more sensors at the endpoint device to capture phenomena at the endpoint device. One or both of the first set of one or more sensors and the second set of one or more sensors may be communicatively connected to the one or more adaptive processing devices. The first set of one or more sensors may correspond to a first sensor type. The second set of one or more sensors may correspond to a second sensor type that is different from the first sensor type. Sensor-based data may be received that is based at least in part on one or both the first set of one or more sensors and/or the second set of one or more sensors first set of one or more sensors activated with the first stage of authentication. Additional sensor-based data detected at the endpoint device may be received. A deviation of at least part of the additional data with respect to the sensor-based data previously received may be detected. An authentication score with respect to the endpoint device may be generated that is based at least in part on the additional sensor-based data and the sensor-based data previously received. One or more additional stages of authentication of the endpoint device may be initiated at least in part by transferring a command to cause an activation adjustment that is a function of the authentication score, where the activation adjustment adjusts operation of one or more of the first set of one or more sensors, the second set of one or more sensors, and/or a third set of one or more sensors. Consequent to the one or more additional stages of authentication, further sensor-based data detected at the endpoint device may be received, and access of the endpoint device to resources may be controlled based at least in part on the further sensor-based data.

In still a further aspect, a method of adaptive authentication to adaptively secure a set of access operations with respect to one or more electronic resources is disclosed as including one or a combination of the following. For example, initiation of a set of one or more access events initiated by the endpoint device may be detected. Adaptive authentication with respect to the endpoint device may be caused and may include one or a combination of the following. A stage of authentication of the endpoint device may be initiated. The stage of authentication may include activation of one or both of a first set of one or more sensors at the endpoint device and a second set of one or more sensors at the endpoint device to capture phenomena at the endpoint device. One or both of the first set of one or more sensors and the second set of one or more sensors may be communicatively connected to the one or more adaptive processing devices. The first set of one or more sensors may correspond to a first sensor type. The second set of one or more sensors may correspond to a second sensor type that is different from the first sensor type. Sensor-based data may be received that is based at least in part on one or both the first set of one or more sensors and/or the second set of one or more sensors first set of one or more sensors activated with the first stage of authentication. Additional sensor-based data detected at the endpoint device may be received. A deviation of at least part of the additional data with respect to the sensor-based data previously received may be detected. An authentication score with respect to the endpoint device may be generated that is based at least in part on the additional sensor-based data and the sensor-based data previously received. One or more additional stages of authentication of the endpoint device may be initiated at least in part by transferring a command to cause an activation adjustment that is a function of the authentication score, where the activation adjustment adjusts operation of one or more of the first set of one or more sensors, the second set of one or more sensors, and/or a third set of one or more sensors. Consequent to the one or more additional stages of authentication, further sensor-based data detected at the endpoint device may be received, and access of the endpoint device to resources may be controlled based at least in part on the further sensor-based data.

In various embodiments, the systems, methods, and processor-readable media disclosed herein may further include one or a combination of the following. In disclosed embodiments, a mode of sensor operation for one or more of the first set of one or more sensors, the second set of one or more sensors, and/or a third set of one or more sensors may be selected, where the mode of sensor operation is a function of the authentication score. The activation adjustment may include causing one or more of the first set of one or more sensors, the second set of one or more sensors, and/or a third set of one or more sensors to operate in accordance with the mode of sensor operation.

In disclosed embodiments, an updated authentication score with respect to the endpoint device may be generated that is based at least in part on the further sensor-based data. A subsequent mode of sensor operation for one or more of the first set of one or more sensors, the second set of one or more sensors, and/or the third set of one or more sensors may be selected, where the subsequent mode of sensor operation is a function of the updated authentication score and is different from the mode of sensor operation. A subsequent command may be transferred to cause a subsequent activation adjustment so that one or more of the first set of one or more sensors, the second set of one or more sensors, and/or a third set of one or more sensors to operate in accordance with the second mode of sensor operation.

In disclosed embodiments, one or more of the first set of one or more sensors, the second set of one or more sensors, and/or a third set of one or more sensors for operation according to the activation adjustment may be selected, where the selecting is based at least in part on the authentication score. In disclosed embodiments, the selecting one or more of the first set of one or more sensors, the second set of one or more sensors, and/or a third set of one or more sensors for operation according to the activation adjustment may be further based at least in part on a precedence order. In disclosed embodiments, an updated authentication score with respect to the endpoint device may be generated that is based at least in part on the further sensor-based data. The controlling access of the endpoint device to resources may be a function of the of the updated authentication score. In disclosed embodiments, the controlling access of the endpoint device to resources as a function of the of the updated authentication score may include selectively permitting or prohibiting performance of at least part of the set of one or more access events.

With one aspect, an adaptive authentication system to adaptively secure a set of access operations with respect to one or more electronic resources is disclosed as including one or a combination of the following. The adaptive authentication system may include one or more adaptive processing devices and one or more non-transitory, computer-readable storage media storing instructions which, when executed by the one or more adaptive processing devices, cause the one or more adaptive processing devices to perform actions disclosed herein that may include one or a combination of the following. For example, a plurality of endpoint subsystems communicatively coupled to the one or more adaptive processing devices may be detected. A request received via an endpoint device of an endpoint subsystem of the plurality of endpoint subsystems may be detected. Adaptive authentication with respect to the endpoint device may be initiated. The adaptive authentication may include one or a combination of the following. A first stage of authentication of the endpoint device may be initiated. The first stage of authentication may include activation one or both of a first set of one or more sensors at the endpoint device and a second set of one or more sensors at the endpoint device to capture phenomena at the endpoint device. The endpoint device being colocated with at least one other endpoint device of the plurality of endpoint subsystems may be detected. A second stage of authentication of the endpoint device may be initiated. Additional sensor-based data detected at the endpoint device consequent to the second stage of authentication may be received. Based at least in part on the additional sensor-based data detected at the endpoint device consequent to the second stage of authentication, a third stage of authentication of a set of colocated endpoint devices may be initiated. The set of colocated endpoint devices may include the endpoint device and the at least one other endpoint device of the plurality of endpoint subsystems. Access of the set of colocated endpoint devices to resources may be controlled based at least in part on further sensor-based data received consequent to the third stage of authentication.

With another aspect, one or more non-transitory, processor-readable media are disclosed as having processor-readable instructions thereon which, when executed by one or more processing devices, cause the one or more processing devices to facilitate adaptively securing a set of access operations with respect to one or more electronic resources by performing actions disclosed herein. The actions may include one or a combination of the following. For example, a plurality of endpoint subsystems communicatively coupled to the one or more adaptive processing devices may be detected. A request received via an endpoint device of an endpoint subsystem of the plurality of endpoint subsystems may be detected. Adaptive authentication with respect to the endpoint device may be initiated. The adaptive authentication may include one or a combination of the following. A first stage of authentication of the endpoint device may be initiated. The first stage of authentication may include activation one or both of a first set of one or more sensors at the endpoint device and a second set of one or more sensors at the endpoint device to capture phenomena at the endpoint device. The endpoint device being colocated with at least one other endpoint device of the plurality of endpoint subsystems may be detected. A second stage of authentication of the endpoint device may be initiated. Additional sensor-based data detected at the endpoint device consequent to the second stage of authentication may be received. Based at least in part on the additional sensor-based data detected at the endpoint device consequent to the second stage of authentication, a third stage of authentication of a set of colocated endpoint devices may be initiated. The set of colocated endpoint devices may include the endpoint device and the at least one other endpoint device of the plurality of endpoint subsystems. Access of the set of colocated endpoint devices to resources may be controlled based at least in part on further sensor-based data received consequent to the third stage of authentication.

With still another aspect, a method of adaptive authentication to adaptively secure a set of access operations with respect to one or more electronic resources is disclosed as including one or a combination of the following. For example, a plurality of endpoint subsystems communicatively coupled to the one or more adaptive processing devices may be detected. A request received via an endpoint device of an endpoint subsystem of the plurality of endpoint subsystems may be detected. Adaptive authentication with respect to the endpoint device may be initiated. The adaptive authentication may include one or a combination of the following. A first stage of authentication of the endpoint device may be initiated. The first stage of authentication may include activation one or both of a first set of one or more sensors at the endpoint device and a second set of one or more sensors at the endpoint device to capture phenomena at the endpoint device. The endpoint device being colocated with at least one other endpoint device of the plurality of endpoint subsystems may be detected. A second stage of authentication of the endpoint device may be initiated. Additional sensor-based data detected at the endpoint device consequent to the second stage of authentication may be received. Based at least in part on the additional sensor-based data detected at the endpoint device consequent to the second stage of authentication, a third stage of authentication of a set of colocated endpoint devices may be initiated. The set of colocated endpoint devices may include the endpoint device and the at least one other endpoint device of the plurality of endpoint subsystems. Access of the set of colocated endpoint devices to resources may be controlled based at least in part on further sensor-based data received consequent to the third stage of authentication.

In various embodiments, the systems, methods, and processor-readable media disclosed herein may further include one or a combination of the following. In disclosed embodiments, the adaptive authentication may further include detecting a deviation of at least part of the additional data with respect to the sensor-based data previously received for the endpoint device. The third stage of authentication of the set of colocated endpoint devices may be initiated responsive to the detecting.

In disclosed embodiments, the adaptive authentication may further include, based at least in part on the additional sensor-based data detected at the endpoint device consequent to the second stage of authentication, detecting a coincidental action attribute, a coincidental temporal attribute, and/or a coincidental contextual attribute correlated to each endpoint device at least a subset of the set of colocated endpoint devices. The third stage of authentication of the set of colocated endpoint devices may be initiated responsive to the detecting. In disclosed embodiments, the detecting may be performed after determining that there is no a deviation of at least part of the additional data with respect to the sensor-based data previously received for the endpoint device that satisfies a threshold.

In disclosed embodiments, the third stage of authentication may include transferring commands to each subsystem corresponding to the set of colocated endpoint devices to cause activation adjustments of one or more sensors at each of the set of colocated endpoint devices. In disclosed embodiments, the activation may include a plurality of different activation adjustments. In disclosed embodiments, whether received requests from each endpoint device of the plurality of endpoint subsystems satisfy a threshold of temporal proximity may be determined, and the third stage of authentication may be initiated, and access may be controlled, only with respect to those endpoint devices sending a request that satisfies the threshold of temporal proximity.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
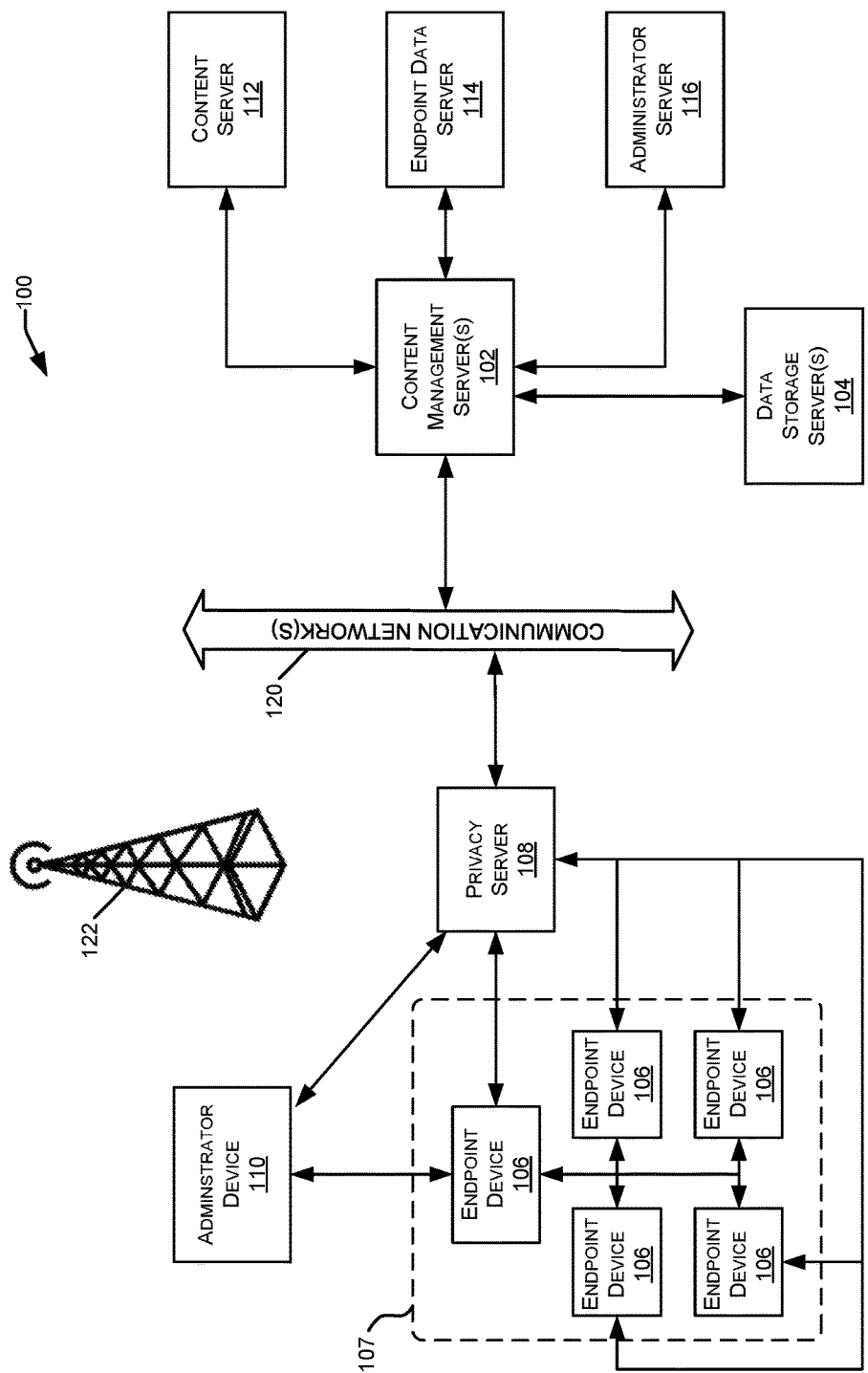
FIG. 1 is a block diagram illustrating an example of a content access network, in accordance with embodiments of the present disclosure.

With reference now to FIG. 1, a block diagram is shown illustrating various components of a content access network 100 which implements and supports certain embodiments and features described herein. The content access network 100 may correspond to, and may be variously referenced herein as, an adaptive authentication system 100. In some embodiments, the content access network 100 can comprise one or several physical components and/or one or several virtual components such as, for example, one or several cloud computing components. In some embodiments, the content access network 100 can comprise a mixture of physical and cloud computing components.

Content access network 100 may include one or more content management servers 102. As discussed below in more detail, content management servers 102 may be any correct type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content access network 100 may include one or more data storage servers 104, such as data storage servers and file-based storage systems. The data storage servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the data storage server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any correct level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives.

In some embodiments, the one or several hardware and/or software components of the data storage server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the endpoint device.

Data storages 104 may comprise stored data germane to the functions of the content access network 100. Illustrative examples of data storages 104 that may be maintained in certain embodiments of the content access network 100 are described below in reference to FIG. 3. In some embodiments, multiple data storages may reside on a single server 104, either using the same storage components of server 104 or using different physical storage components to assure data security and integrity between data storages. In other embodiments, each data storage may have a separate dedicated data storage server 104.

Content access network 100 also may include one or more endpoint devices 106 and/or administrator devices 110. Endpoint devices 106 and administrator devices 110 may display content received via the content access network 100, and may support various types of endpoint interactions with the content. Endpoint devices 106 and administrator devices 110 may include mobile devices such as smartphones, tablet computers, particular digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other endpoint devices 106 and administrator devices 110 may be special-purpose computing devices including, by way of example, particular computers, laptop computers, workstation computers, projection devices, and interactive room display systems. Additionally, endpoint devices 106 and administrator devices 110 may be any other electronic devices, such as a thin-client computers, an Internet-enabled gaming systems, business or home appliances, and/or particular messaging devices, capable of communicating over network(s) 120.

In different contexts of content access networks 100, endpoint devices 106 and administrator devices 110 may correspond to different types of specialized devices. In some embodiments, endpoint devices 106 and administrator devices 110 may operate in the same physical location 107. In such cases, the devices may contain components that support direct communications with other nearby devices, such as wireless transceivers and wireless communications interfaces, Ethernet sockets or other Local Area Network (LAN) interfaces, etc. In other implementations, the endpoint devices 106 and administrator devices 110 need not be used at the same location 107, but may be used in remote geographic locations in which each endpoint device 106 and administrator device 110 may use security features and/or specialized hardware (e.g., hardware-accelerated SSL and HTTPS, WS-Security, firewalls, etc.) to communicate with the content management server 102 and/or other remotely located endpoint devices 106. Additionally, different endpoint devices 106 and administrator devices 110 may be assigned different designated particularized sets of access permissions and, in such cases, the different devices may be provided with additional hardware and/or software components to provide content and support endpoint capabilities not available to the other devices.

The content access network 100 also may include a privacy server 108 that maintains private endpoint data at the privacy server 108 while using applications or functionalities hosted on other servers. For example, the privacy server 108 may be used to maintain private data of an endpoint within one jurisdiction even though the endpoint is accessing an application hosted on a server (e.g., the content management server 102) located outside the jurisdiction. In such cases, the privacy server 108 may intercept communications between an endpoint device 106 or administrator device 110 and other devices that include private endpoint data. The privacy server 108 may create a token or identifier that does not disclose the private data and may use the token or identifier when communicating with the other servers and systems, instead of using the endpoint's private data.

As illustrated in FIG. 1, the content management server 102 may be in communication with one or more additional servers, such as a content server 112, an endpoint data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to endpoint devices 106 and other devices in the network 100. Content server 112 may include data storages of materials, reviews, diagnostics, interactive programs and simulations, models, outlines, and various interfaces that correspond to different materials and/or different types of endpoint devices 106. In content access networks 100 used for resource distribution, endpoint interactives, and the like, a content server 112 may include resource content files.

Endpoint data server 114 may include hardware and software components that store and process data for multiple particularized access instances relating to particularized endpoint accesses of the content access network 100. For example, the content management server 102 may record and track each endpoint's system usage, including their endpoint device 106, content resources accessed, and interactions with other endpoint devices 106. This data may be stored and processed by the endpoint data server 114, to support endpoint tracking and analysis features. For instance, the endpoint data server 114 may store and analyze each endpoint's access histories, attendances, completions, interactions, diagnostic results, and the like. The endpoint data server 114 may also include a repository for endpoint-created material, such as diagnostics and tests completed by endpoints, and documents and assignments prepared by endpoints. In the context of resource distribution and interactive gaming, the endpoint data server 114 may store and process resource access data for multiple endpoints (e.g., content titles accessed, access times, data usage amounts, interaction histories, endpoint devices and device types, etc.).

Administrator server 116 may include hardware and software components to initiate various administrative functions at the content management server 102 and other components within the content access network 100. For example, the administrator server 116 may monitor device status and performance for the various servers, data storages, and/or endpoint devices 106 in the content access network 100. When necessary, the administrator server 116 may add or remove devices from the network 100, and perform device maintenance such as providing software updates to the devices in the network 100. Various administrative tools on the administrator server 116 may allow authorized endpoints to set endpoint access permissions to various content resources, monitor resource usage by endpoints and devices 106, and perform analyses and generate reports on specific network endpoints and/or devices (e.g., resource usage tracking reports, development diagnostics, etc.).

The content access network 100 may include one or more communication networks 120. Although only a single network 120 is identified in FIG. 1, the content access network 100 may include any number of different communication networks between any of the computer servers and devices shown in FIG. 1 and/or other devices described herein. Communication networks 120 may enable communication between the various computing devices, servers, and other components of the content access network 100. As discussed below, various implementations of content access networks 100 may employ different types of networks 120, for example, computer networks, telecommunications networks, wireless networks, and/or any combination of these and/or other networks.

The content access network 100 may include one or several navigation systems or features including, for example, the Global Positioning System ("GPS"), GALILEO (e.g., Europe's global positioning system), or the like, or location systems or features including, for example, one or several transceivers that can determine location of the one or several components of the content access network 100 via, for example, triangulation. All of these are depicted as navigation system 122.

In some embodiments, navigation system 122 can include or several features that can communicate with one or several components of the content access network 100 including, for example, with one or several of the endpoint devices 106 and/or with one or several of the administrator devices 110. In some embodiments, this communication can include the transmission of a signal from the navigation system 122 which signal is received by one or several components of the content access network 100 and can be used to determine the location of the one or several components of the content access network 100.

The content access network 100 may correspond to an adaptive authentication system 100 that corresponds to, and includes, multiple technical improvements. The adaptive authentication system 100 may collect and store endpoint specification data from an endpoint that is alleged to be performing an authenticated operation. This endpoint is referred to as the provisional endpoint. The adaptive authentication system 100 likewise collects authentication data for use in identifying the endpoint performing the authenticated operation. This endpoint may be referred to as the actual endpoint. The adaptive authentication system 100 compares the collected authentication data with the stored endpoint specification data to determine whether the actual endpoint performing the authenticated operation is the provisional endpoint. In some embodiments, this determination can be performed at any point during the completion of the authenticated operation, and can be, for example, performed continuously and/or randomly during the completion of the authenticated operation. In some embodiments, the adaptive authentication system 100 can further determine if other applications are open and/or running during the time of the completion of the authenticated operation and/or determine the level of usage of other programs during the time of the completion of the authenticated operation.

In various embodiments, the present disclosure provides a method for protection of authentication integrity. This method can include, for example, providing an authenticated operation and receiving and/or collecting authentication data during the actual endpoint's performance of the authenticated operation. This received and/or collected authentication data can be compared to stored endpoint specification data for the provisional endpoint. This comparison of the stored endpoint specification data and the collected authentication data can be used to determine whether the actual endpoint is the provisional endpoint.

In some embodiments, for example, this comparison can result in the generation of an authentication score that can reflect the likelihood that the provisional endpoint is the actual endpoint. This score can be compared to an integrity criterion, and based on the comparison of the score to the integrity criteria, the actual endpoint can be identified as the provisional endpoint or as an endpoint other than the provisional endpoint.

The collected authentication data can comprise a variety of information relating to the actual endpoint. In some embodiments, for example, the collected authentication data can be one or more of an indicator of a physical attribute of the actual endpoint, an indicator of a performance attribute of the actual endpoint, and an indicator of an interaction attribute of the actual endpoint. In one embodiment, an indicator of a physical attribute of the actual endpoint can include, for example, a still image, a batch of still images, video data, or biometric data. Biometric data can be anything that is likely to be unique to the endpoint, for example, keystroke patterns, mouse movement patterns, interaction patterns like common misspellings, interaction patterns with software, etc. A performance attribute could include deviations from typical or expected grades, writing style, word choice, typing speed, etc. In some embodiments, the performance attribute can include a screen capture of the screen at an instant during the completion of the authenticated operation. In some embodiments, this screen capture can be provided to an administrator for review to determine if any unapproved activity or collaboration is indicated in the screen capture. Additionally, any provided identification such as password authentication, or government-issued ID can be additional authentication data in one embodiment.

In some embodiments, for example, a single type of authentication data can be collected and used to determine the identity of the actual endpoint, and in some embodiments, for example, a plurality of types of authentication data can be collected and used to determine the identity of the actual endpoint. In one embodiment, for example, a first type of authentication data is collected and a first authentication score is generated for the first type of authentication data, and an additional type of authentication data is collected and an additional authentication score is generated. The first authentication score and the additional authentication score can be combined to determine an overall authentication score for the endpoint performing the authenticated operation, which score can then be used to determine if the actual endpoint is the provisional endpoint.

In some embodiments, for example, authentication data can be collected at different points during the performance of the authenticated operation. Thus, in one embodiment, authentication data can be collected, for example, at a plurality of points during the performance of the authenticated operation such as, for example, at the beginning of the authenticated operation, at the end of the authenticated operation, or at one or several intermediate points during the authenticated operation. In some embodiments, the collection of authentication data at different points during the performance of the authenticated operation can be used to provide further verification that the actual endpoint is the provisional endpoint.

Figure 2:
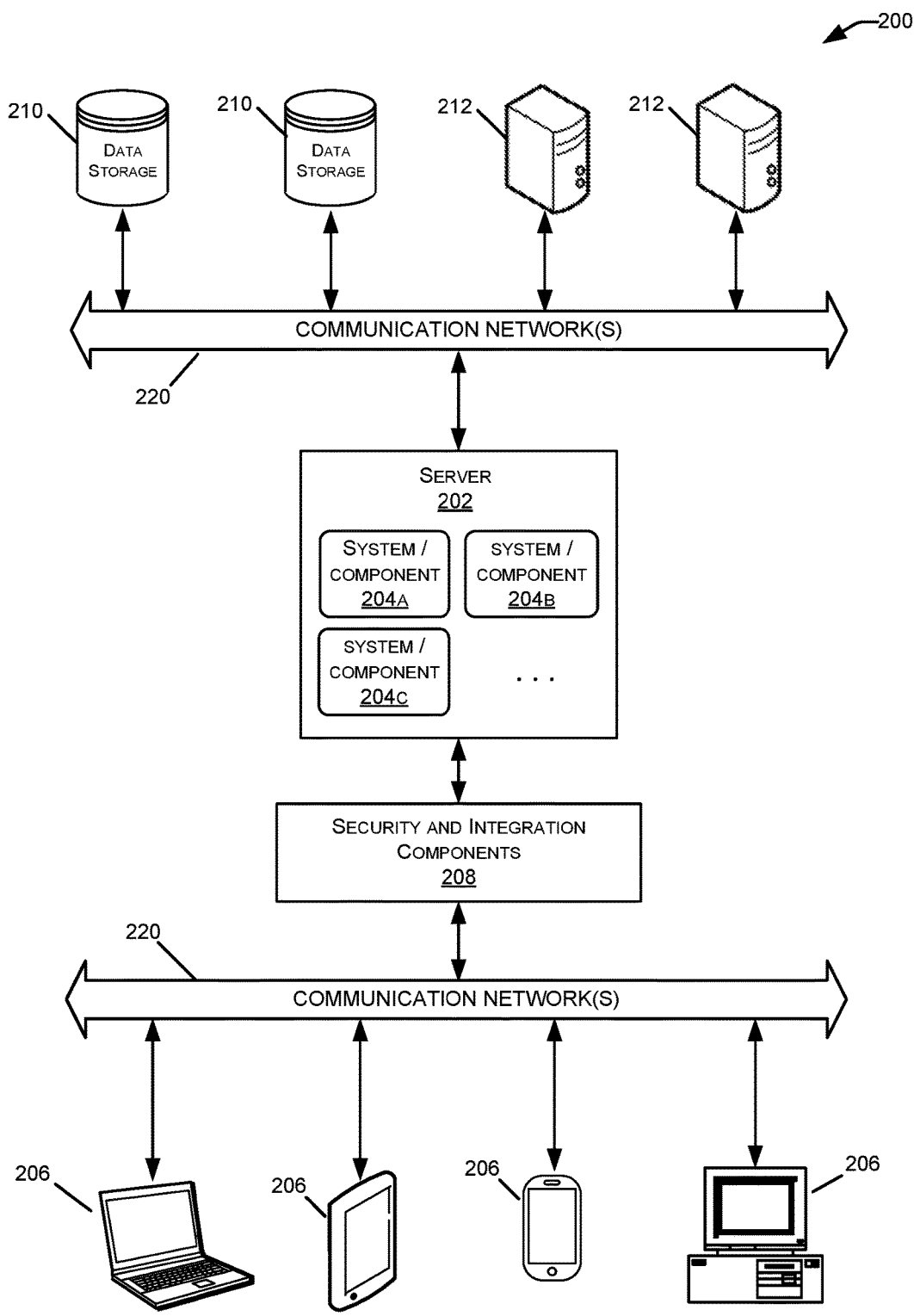
FIG. 2 is a block diagram illustrating a computer server and computing environment within a content access network, in accordance with embodiments of the present disclosure.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the endpoint devices 106 and devices 110. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or functionalities, for example, web-based or cloud-based, to support resource access and interaction with client devices 206. Endpoints operating client devices 206 may in turn utilize one or more client applications (e.g., virtual client applications) to interact with server 202 to utilize the functionalities provided by these components.

Various different subsystems and/or components 204 may be implemented on server 202. Endpoints operating the client devices 206 may initiate one or more client applications to use functionalities provided by these subsystems and components. The subsystems and components within the server 202 and client devices 206 may be implemented in hardware, firmware, software, or combinations thereof. Various different system configurations are possible in different distributed computing systems 200 and content access networks 100. The embodiment shown in FIG. 2 is thus one example of a distributed computing system and is not intended to be limiting. Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and endpoint devices 206 over one or more communication networks 220. In embodiments disclosed herein, the endpoint device 106 may include or otherwise correspond to endpoint device 206. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating endpoints and restricting access to unknown or unauthorized endpoints. In various implementations, security and integration components 208 may provide, for example, a file-based integration scheme or a webservice (WS) based integration scheme for transmitting data between the various devices in the content access network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more WSs may be implemented within the security and integration components 208 and/or elsewhere within the content access network 100. Such WSs, including cross-domain and/or cross-platform WSs, may be developed for enterprise use in accordance with various WS standards, such as RESTful WSs (i.e., those based on the Representation State Transfer (REST) architectural style and constraints), and/or WSs designed in accordance with the WS Interoperability (WS-I) guidelines. Some WSs may use the Secure Sockets Layer (SSL) or Transport Layer Security (TLS) protocol to provide secure connections between the server 202 and endpoint devices 206. SSL or TLS may use HTTP or HTTPS to provide authentication and confidentiality. In other examples, WSs may be implemented using REST over HTTPS with the OAuth open standard for authentication, or using the WS-Security standard which provides for secure SOAP (e.g., Simple Object Access Protocol) messages using Extensible Markup Language (XML) encryption. In other examples, the security and integration components 208 may include specialized hardware for providing secure WSs. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring, and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data storages 210 and/or back-end servers 212. In certain examples, the data storages 210 may correspond to data storage server(s) 104 discussed above in FIG. 1, and back-end servers 212 may correspond to the various back-end servers 112-116. Data storages 210 and servers 212 may reside in the same datacenter or may operate at a remote location from server 202. In some cases, one or more data storages 210 may reside on a non-transitory storage medium within the server 202. Other data storages 210 and back-end servers 212 may be remote from server 202 and configured to communicate with server 202 via one or more networks 220. In certain embodiments, data storages 210 and back-end servers 212 may reside in a storage-area network (SAN), or may use STorageasaService (STaaS) architectural model.

The adaptive authentication system 100 collects, receives, and stores endpoint specification data for the provisional endpoint and collects and stores authentication data for the actual endpoint. In some embodiments, the adaptive authentication system 100 can compare the endpoint specification data for the provisional endpoint with the authentication data for the actual endpoint to determine if the actual endpoint is the provisional endpoint. The adaptive authentication system 100 can provide an indicator to, for example, an provisional endpoint and/or an administrator indicating the result of the comparison of the endpoint specification data with the authentication data in the authenticated operation associated therewith.

The adaptive authentication system 100 can include one or more adaptive processing devices. The one or more adaptive processing devices can provide instructions to and receive information from the other components of the adaptive authentication system 100. The one or more adaptive processing devices can act according to stored instructions, which stored instructions can be located in memory associated with the one or more processors and/or in other components of the adaptive authentication system 100. In various embodiments, the one or more adaptive processing devices may correspond to one or more processors of one or a combination of the devices 106, 108, 102, 114, 206, 208, and/or 212 specially adapted to adaptively secure a set of access operations with respect to one or more electronic resources as disclosed herein.

Figure 2A:
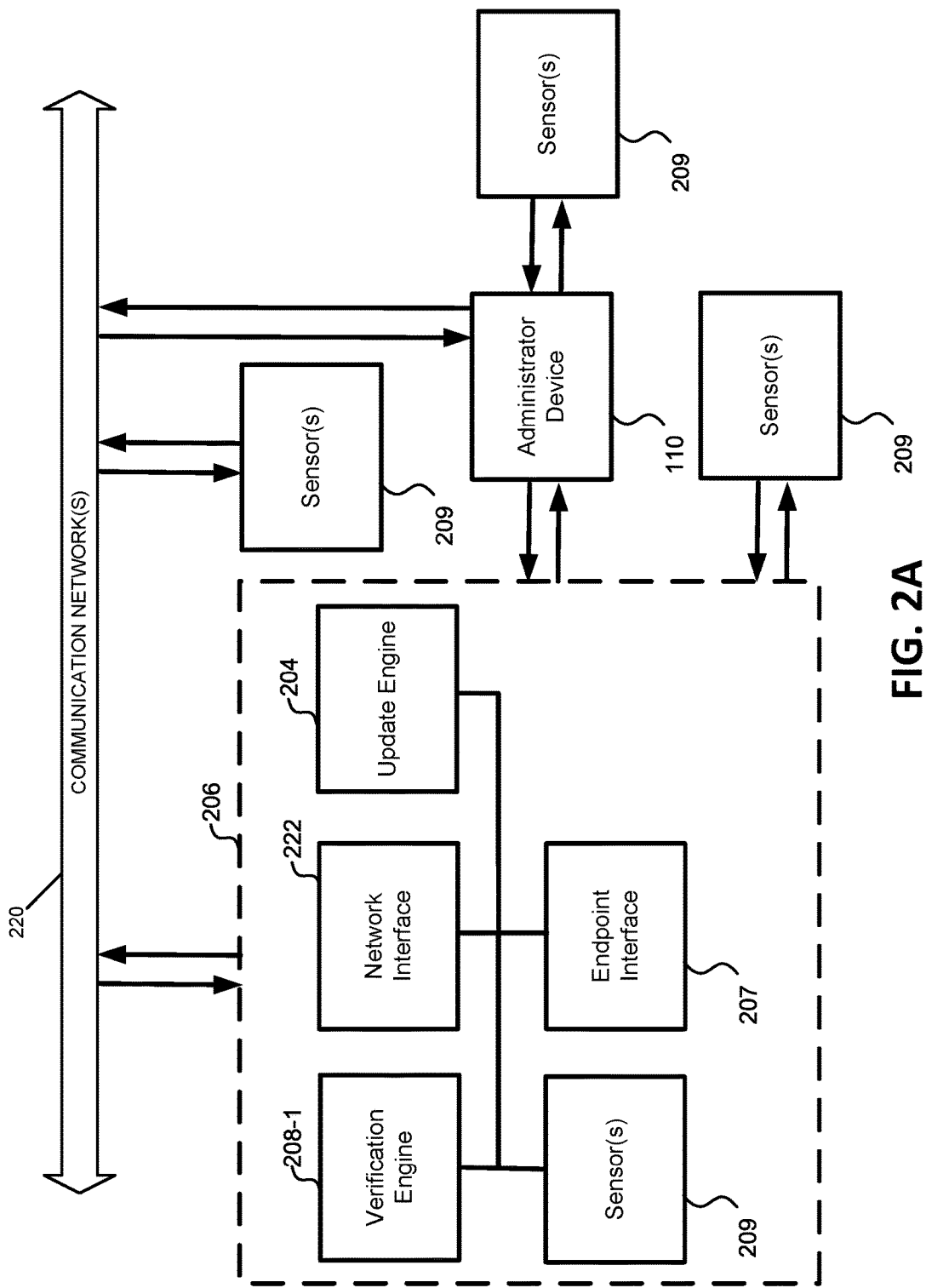
FIG. 2A is a block diagram illustrating an example of an endpoint device, in accordance with embodiments of the present disclosure.

With reference now to FIG. 2A, a block diagram of one embodiment of an endpoint device 206 is shown. As discussed above, the endpoint device 206 can be configured to provide information to and/or receive information from other components of the adaptive authentication system 100. The endpoint device can access the adaptive authentication system 100 through any desired means or technology, including, for example, a webpage such as, for example, a social network service page, or a web portal. As depicted, the endpoint device 206 can include a network interface 222. The network interface 222 allows the endpoint device 206 to access the other components of the adaptive authentication system 100, and specifically allows the endpoint device 206 to access the network of the adaptive authentication system 100. The network interface 222 can include features configured to send and receive information, including, for example, an antenna, a modem, a transmitter, receiver, or any other feature that can send and receive information. The network interface 222 can communicate via telephone, cable, fiber-optic, or any other wired communication network. In some embodiments, the network interface 222 can communicate via cellular networks, WLAN networks, or any other wireless network.

The endpoint device 206 can include, for example, verification engine 208-1. Verification engine 208-1 can identify and/or facilitate in identifying the actual endpoint. In some embodiments, for example, the verification engine 208-1 can cooperate with other components of the adaptive authentication system 100 to identify and/or facilitate in identifying the actual endpoint. In one embodiment, for example, the verification engine 208-1 can receive authentication data and endpoint specification data and compare the authentication data to the endpoint specification data, and identify the actual endpoint based on the comparison of the authentication data to the endpoint specification data.

The endpoint device 206 can include an update engine 204. The update engine 204 can facilitate updating any information within the adaptive authentication system 100. In some embodiments, for example, the update engine 204 can be used by an endpoint to provide provisional endpoint specification data. In some embodiments, for example, the update engine 204 can be used by an endpoint such as, for example, an administrator, to update provisional endpoint specification data and/or one or several authenticated operations.

The endpoint device 206 can include an endpoint interface 207 that communicates information to, and receives inputs from an endpoint. The endpoint interface 207 can include a screen, a speaker, a monitor, a keyboard, a microphone, a mouse, a touchpad, a keypad, or any other feature or features that can receive inputs from an endpoint and provide information to an endpoint.

The adaptive authentication system 100 can include one or more sensors 209. Various embodiments of the adaptive authentication system 100 can include multiple sets of one or more sensors 209, e.g., two, three, four, ten, or many more sets of one or more sensors. For example, several sets of one or more sensors 209 may be configured to capture phenomena at several endpoint devices 206 at one or more locations 107. Additionally or alternatively, several sets of one or more sensors may be configured to capture phenomena at a single endpoint device 206. One or more sets of one or more sensors 209 may be communicatively coupled to the endpoint device 206. Additionally or alternatively, one or more sets of one or more sensors may be communicatively coupled to the device 110 and/or the server 108.

An endpoint subsystem may include one or more endpoint devices 106, 206 and one or more sensors 209. In some embodiments, one or more sets of one or more sensors 209 may be integrated with the endpoint device 206. Additionally or alternatively, one or more sets of one or more sensors may be external to the endpoint device 206. A plurality of sensors 209 may include different types of sensors 209, each different type of sensor 209 configured to detect a different type of phenomena and/or generate a different type of data based on the detected phenomena. Thus, a multiplicity of integrated and non-integrated sensors may be configured to capture phenomena at a single endpoint device 206 in order to identify aspects of an endpoint, endpoint states, and/or the environment proximate to the endpoint, to facilitate any one or combination of facial recognition, optical recognition, infrared impressions, voice recognition, heat impressions, gestures, other endpoint movements, and/or the like. Data captured from such sensors may be used in identification processes disclosed herein. For example, data from various types of sensors 209 may be used for recognizing image (e.g., facial) baselines, sound (e.g., voices of the endpoint and others proximate to the endpoint) baselines, activity (e.g., changing locations, others at the location, performance, writing, and typing) baselines, and/or device location baselines, as well as deviations from the baselines.

The adaptive authentication system 100 (e.g., each of endpoint device 206, the device 110 and/or the server 108) may be configured to communicate with multiple sensors 209. Such communication may use different communication standards or protocols. In various embodiments, for example, the sensors 209 can be communicatively connected to and controllable by the adaptive authentication system 100, including, for example, the device 110 and/or backend devices such as devices 102, 116, and/or the like.

Sensors and control units may be coupled and the sensors 209 may be connected in a serial, parallel, star, hierarchical, and/or the like topologies and may communicate to the endpoint device 206, the device 110 and/or the server 108 via one or more serial, bus, or wireless protocols and technologies which may include, for example, WiFi, CAN bus, Bluetooth, I2C bus, ZigBee, Z-Wave and/or the like. For instance, one or more sensors 209 may use a ZigBee® communication protocol while one or more other sensors 209 communicate with endpoint device 206, the device 110 and/or the server 108 using a Z-Wave® communication protocol. Other forms of wireless communication may be used by sensors 209 and the endpoint device 206, the device 110 and/or the server 108. For instance, one or more sensors 209 and the endpoint device 206, the device 110 and/or the server 108 may be configured to communicate using a wireless local area network, which may use a communication protocol such as 802.11.

In some embodiments, a separate device may be connected with the endpoint device 206, the device 110 and/or the server 108 to enable communication with authentication control devices. For instance, a communication device may be attached to endpoint device 206, the device 110 and/or the server 108. The communication device may be in the form of a dongle. The communication device may be configured to allow for ZigBee®, Z-Wave®, and/or other forms of wireless communication.

The communication device and/or one or more sensors 209 may connect with the endpoint device 206, the device 110 and/or the server 108 via a USB port or via some other type of (wired) communication port. The communication device and/or one or more sensors 209 may be powered by the endpoint device 206, the device 110 and/or the server 108 or may be separately coupled with a power source. In some embodiments, the endpoint device 206, the device 110 and/or the server 108 may be enabled to communicate via a local wireless network and may use the communication device in order to communicate with sensors 209 that use a ZigBee® communication protocol, Z-Wave® communication protocol, and/or some other wireless communication protocols.

The one or more sensors 209 may include a fingerprint scanner and/or a different type of biometric scanner for biometric identification, such as a retina scanner that may be used for optical identification. Further, the one or more sensors 209 may include, for example, one or more cameras. The camera can be any device configured to generate image and/or audio data including, for example, still image data, video image data, and/or any sound data, corresponding to detected phenomena. The one or more sensors 209 of different types may include infrared sensors and/or heat sensors. In some embodiments, the camera(s) may include one or more infrared cameras. The camera(s) may, in some embodiments, include infrared sensors. The camera(s) may provide a video and, in some embodiments, an audio stream. The adaptive authentication system 100 may perform image analysis of image data captured with cameras to determine one or more image baselines for endpoints and areas proximate thereto. Captured endpoint image data may be correlated to reference images using any suitable facial trait qualifications for correlation. As disclosed herein, a matching engine 507 (depicted in FIG. 15) of the adaptive authentication system 100 may link particular endpoint image data to endpoint specifications with image data associated with endpoints, to identify a known endpoint or a new endpoint. The reference image data may be refined over time as an image baseline(s) for a particular endpoint is developed with additional data captures. Such reference images may be used by the system to identify inconsistencies/nonconformities with respect to particularized patterns. When such inconsistencies/nonconformities satisfy one or more thresholds, certain authentication control actions, such as security measures, may be caused.

The matching engine 507 may correspond to a learning engine that includes logic to implement and/or otherwise facilitate any taxonomy, classification, categorization, correlation, mapping, qualification, scoring, organization, and/or the like features disclosed herein. In various embodiments, the matching engine 507 may be configured to analyze, classify, categorize, characterize, tag, and/or annotate sensor-based data. The matching engine 507 may employ one or more artificial intelligence (machine learning or, more specifically, deep learning) algorithms to perform pattern matching to detect patterns of metrics of the sensor-based data. The visual characteristics of an object may be identified at least in part by formatting, rescaling, cropping, and/or otherwise preparing images (or portions of the images where the outer shapes are defined as boundaries) for further image processing. For example, as disclosed in further detail herein, the matching engine 507 may include an image analyzer and handling module, and may learn patterns of sensor-based data corresponding to visual characteristics of the sensor-based data gathered regarding the endpoint device such as one or a combination of colors and any visual metric based at least in part on light detection— e.g., aggregate color palette, color palette as a function of time, changes in light, background characteristics, objects recognized, static/moving objects, pixel identification, detecting color component values, detecting color codes, and/or the like. and/or the like. These different visual metric types may be bases for various visual metric categories. Ranges of visual metric values for these different visual metric types may be mapped to visual metric categories.

Additionally or alternatively, the adaptive authentication system 100 may perform infrared analysis of infrared data captured with infrared sensors to determine one or more infrared baselines for endpoints and areas proximate thereto. Some embodiments may perform infrared analysis of heat data captured with heat sensors to determine one or more heat baselines for endpoints and areas proximate thereto. Captured endpoint sourced infrared and/or heat data may be correlated to reference infrared and/or heat impressions. As disclosed herein, the matching engine 507 may link particular endpoint infrared and/or heat impressions to endpoint specifications with infrared and/or heat impressions associated with endpoints, to identify a known endpoint or a new endpoint. The reference infrared and/or heat impressions data may be refined over time as infrared and/or heat baseline(s) for a particular individual are developed with additional data captures. Such reference impressions may be used by the system to identify inconsistencies/nonconformities with respect to particularized patterns. When such inconsistencies/nonconformities satisfy one or more thresholds, certain authentication control actions, such as security measures, may be caused.

The one or more sensors 209 may include one or more microphones and/or another audio sensor (which may or may not be dedicated to capturing audio data for audio analysis). The adaptive authentication system 100 may perform audio analysis of audio data captured with audio sensor and/or microphones on one or more other authentication control devices to determine one or more sound baselines for the endpoint and the area proximate thereto. The matching engine 507 may learn patterns of sensor-based data metrics corresponding to audio characteristics disclosed herein, such as tonal, pitch, and volume characteristics; keywords and corresponding language used; cadence, pauses, and accents; ambient noise; and/or the like as distinctive markings. The matching engine 507 may include an audio analyzer and handling module to facilitate that detection, which may detect one or more audio characteristics by way of analyzing audio, applying voice recognition, acoustic spectrum analysis, and/or the like. For example, an acoustic analysis may include analyzing and identifying the sample for acoustic characteristics such as frequencies, intensities, tones, pitches, and/or the like audio metrics (such as those disclosed above) over time. The different audio metric types may be bases for various audio metric categories. Ranges of audio metric values for the different audio metric types may be mapped to audio metric categories. The matching engine 507 may select values of one or a combination of the acoustic metrics as distinctive markings and may compile the values as an acoustic impression for the purposes of characterizing a sample. The acoustic impression may include a spectrum of frequencies in various embodiments. In some cases, the matching engine 507 may correlate the acoustic impression to one or more audio metric categories for the similar acoustic impressions. In various embodiments, the correlation may be based at least in part on matching selected values of the acoustic metrics (e.g., distinctive values such as peaks, baselines, averages, etc.) to acoustic metric ranges of values specified for certain audio metric categories. Thus, the audio impressions may be used by the system to identify inconsistencies/nonconformities of real-time audio detection with respect to particularized patterns. When such inconsistencies/nonconformities satisfy one or more thresholds, certain authentication control actions, such as security measures, may be caused.

Additionally, the one or more sensors 209 may correspond to the device 206 input devices to enable recording of data pertaining to keystrokes, typing characteristics, such as typing speed, keystroke pressure, typing accuracy/inaccuracy, usage of input options, and/or the like. Some embodiments may perform analysis of such data to determine one or more sound baselines for the endpoint and the area proximate thereto. Such typing impressions may be used by the system to identify inconsistencies/nonconformities of real-time typing detection with respect to particularized patterns. When such inconsistencies/nonconformities satisfy one or more thresholds, certain authentication control actions, such as security measures, may be caused.

Sensor data from sensors 209 may be recorded by the device 206, device 110, a backend device such device 102, 104, 113, 114, 116, and/or storage on external storage devices, such as a network attached storage device. For example, video may be transmitted across the local and/or wide area network to other storage devices upon occurrence of a trigger event for later playback. Video and, in some embodiments, audio from sensors 209 may be available live for viewing via device 110 and/or a backend device. In some embodiments, video may only be presented upon occurrence of a trigger event. In various embodiments, such recording may or may not be constrained by the rolling window associated with a triggering event being detected. Also, sensor data may be recorded based upon a timer, remote command, and/or a randomized interval function.

Figure 3:
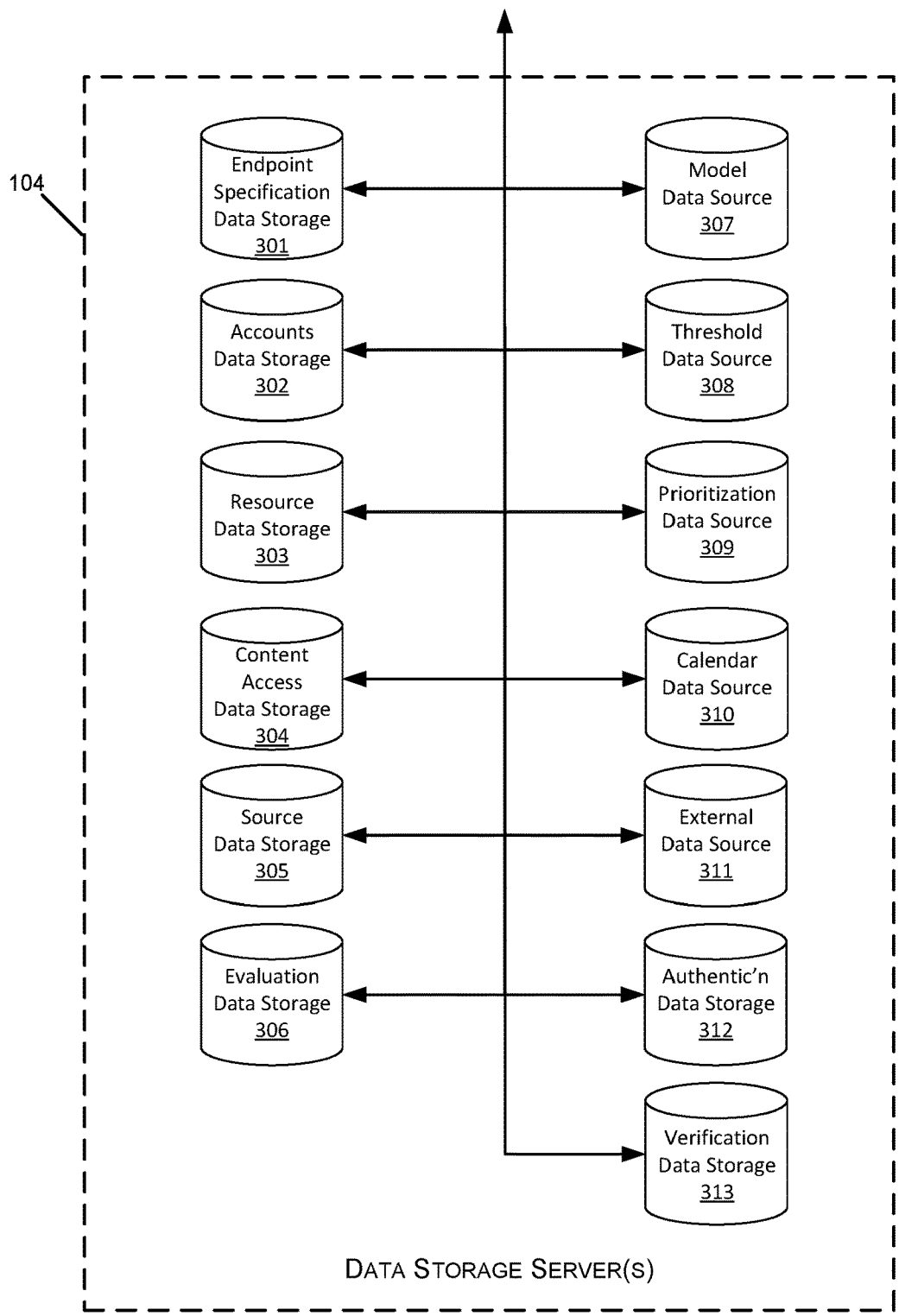
FIG. 3 is a block diagram illustrating an example of one or more data storage servers within a content access network, in accordance with embodiments of the present disclosure.

With reference to FIG. 3, an illustrative set of data storages and/or data storage servers is shown, corresponding to the data storage servers 104 of the content access network 100 discussed above in FIG. 1. One or more particular data storages 301-311 may reside in storage on a single computer server 104 (or a single server farm or cluster) under the control of a single entity, may be virtually implemented, or may reside on separate servers operated at different remote locations. In some embodiments, data storages 301-311 may be accessed by the content management server 102 and/or other devices and servers within the network 100 (e.g., endpoint devices 106, administrator devices 110, administrator servers 116, etc.). Access to one or more of the data storages 301-311 may be limited or denied based on the processes, endpoint credentials, and/or devices attempting to interact with the data storage.

The following description includes examples of specific data storages that may be implemented within some embodiments of a content access network 100. It should be understood that the below descriptions of data storages 301-311, including their functionality and types of data storage therein, are illustrative and non-limiting. Data storages server architecture, design, and the execution of specific data storages 301-311 may depend on the context, size, and functional requirements of a content access network 100. For example, in content access systems 100 used for development purposes, separate data storages or file-based storage systems may be implemented in data storage server(s) 104 to store development module, data development results, diagnostics data, and the like. In contrast, in content access systems 100 used for resource access from resource repositories, separate data storages may be implemented in data storages server(s) 104 to store available resource descriptors, access statistics, endpoint specifications, network statistics, etc.

An endpoint specification data storage 301 may include endpoint specification data relating to endpoint characteristics such as the endpoint identifiers, access credentials, endpoint preferences, and data relating to any previous endpoint interactions within the content access system 100 (e.g., requested resources, posted content, resource modules completed, development scores or diagnostics, other associated endpoints, etc.). In some embodiments, this data can relate to one or several particular endpoints such as, for example, one or several endpoints, administrator devices, or the like, and in some embodiments, this data can relate to one or several institutional endpoints. In some embodiments, this data can identify one or several endpoint memberships in one or several groups.

The endpoint specification data storage 301 can include data relating to an endpoint's status, location, or the like. This data can identify, for example, an endpoint device in use, the location of that device, or the like. In some embodiments, this data can be created based on any location detection technology including, for example, a location-detection system 122, or the like.

In some embodiments, the endpoint specification data can include any information relating to the provisional endpoint that is useful in identifying the provisional endpoint. In some embodiments, for example, the endpoint specification data can include data relating to one or more physical attributes of the provisional endpoint, data relating to one or more performance attributes of the provisional endpoint, and/or data relating to one or more interaction attributes of the provisional endpoint. In some embodiments, for example, the endpoint specification data can include the provisional endpoint's name and/or age.

In some embodiments, for example, data relating to one or more physical attributes of the provisional endpoint can include image data of the provisional endpoint including, for example, image data for one or several still images of the provisional endpoint and/or image data for video of the provisional endpoint. In some embodiments, for example, the data relating to one or more physical attributes of the provisional endpoint can include biometric information for the provisional endpoint. This information can include, for example, a fingerprint of the provisional endpoint, a retina scan of the provisional endpoint, a DNA sample of the provisional endpoint, or any other data relating to a physical attribute of the endpoint.

In some embodiments, for example, data relating to one or more performance attributes of the provisional endpoint can include, for example, data indicative of the provisional endpoint's past performance. This information can include, for example, data relating to courses of study that the provisional endpoint has completed and/or data relating to the provisional endpoint's performance in the completed courses. In some embodiments, for example, the data relating to one or more performance attributes of the provisional endpoint can include authenticated operations that the provisional endpoint has completed and/or the provisional endpoint's performance in the completed authenticated operations. In some embodiments, for example, the data relating to one or more performance attributes of the provisional endpoint can include an identification of information and/or topics that the provisional endpoint has mastered and/or identification of information and/or topics that the provisional endpoint has not mastered.

In some embodiments, for example, data relating to one or more interaction attributes of the provisional endpoint can include, for example, information relating to how the provisional endpoint interacts with components of the adaptive authentication system 100. This information can include, for example, the provisional endpoint's patterns for providing inputs to the adaptive authentication system 100. In some embodiments, for example, this information can include endpoint preferences such as the input device such as, for example, a keyboard, a number pad, a mouse, a joystick, track ball, and microphone, with which the provisional endpoint normally provides inputs to the adaptive authentication system 100. In some embodiments, for example, the provisional endpoint's patterns for providing inputs can include typing patterns, mouse click patterns, typing speed, words used by the endpoint, words not used by the endpoint, typing speed, which typing speed can be either a general typing speed or a typing speed for one or several words, synonym pairs that include a used and a non-used word, or any other input. In some embodiments, for example, the provisional endpoint's patterns for providing inputs can include data relating to the provisional endpoint's demonstrated vocabulary or relating to and/or identifying words that the provisional endpoint typically correctly and/or incorrectly spells.

In some embodiments, for example, the endpoint specification data storage 301 can comprise login information. This information can include, for example, information identifying an endpoint such as, for example, an endpoint name and password or an endpoint identification number. In some embodiments, for example, when an endpoint desires to access the adaptive authentication system 100, the endpoint can be prompted to enter identification information such as, for example, an endpoint name and password. After the endpoint provides the identification information, the adaptive authentication system 100 can verify the identification information, and specifically, the one or more adaptive processing devices can compare the endpoint-provided identification information to information stored within the endpoint specification data storage 301 to determine if the actual endpoint is an authorized endpoint.

In some embodiments, the endpoint specification data stored in the endpoint specification data storage 301 can be dynamically updated over time to reflect changes to the provisional endpoint. In some embodiments, these changes can be, for example, a change in appearance, a change in performance, a change in a preference and/or interaction, or the like. In some embodiments, these updates to the endpoint specification data storage 301 can be based on actual measured changes in the appearance, performance, preference and/or interaction, or the like, and in some embodiments these updates to the endpoint specification data storage 301 can be based on a predictive algorithm which can, for example, predict changes in appearance, performance, preference and/or interaction, or the like.

Data relating to the endpoint's status can identify, for example, logged-in status data that can indicate whether the endpoint device is presently logged-in to the content access network 100 and/or whether the log-in is active. In some embodiments, the data relating to the endpoint's status can identify whether the endpoint is currently accessing content and/or participating in an activity from the content access network 100.

In some embodiments, data relating to the endpoint's status can identify, for example, one or several attributes of the endpoint's interaction with the content access network 100, and/or content distributed by the content access network 100. This can include data identifying the endpoint's interactions with the content access network 100, the content processed by the endpoint through the content access network 100, or the like. In some embodiments, this can include data identifying the type of data accessed through the content access network 100 and/or the type of activity performed by the endpoint via the content access network 100, the lapsed time since the last time the endpoint accessed content and/or participated in an activity from the content access network 100, or the like. In some embodiments, this data can relate to a content program comprising an aggregate of data, content, and/or activities, and can identify, for example, progress through the content program, or through the aggregate of data, content, and/or activities forming the content program. In some embodiments, this data can track, for example, the amount of time since participation in and/or completion of one or several types of activities, the amount of time since communication with one or several administrators and/or administrator devices 110, or the like.

In some embodiments in which the one or several endpoints correspond to particular particulars, the endpoint specification data storage 301 can further include data relating to particular development records, statuses, and diagnostic metrics. In some embodiments, the development records can further include data identifying diagnostic metrics on one or several diagnostics and/or assignments. In some embodiments, this data can be stored in a tier of memory that is not the fastest memory in the content access network 100. In some embodiments, this can comprise response data such as, for example, data identifying one or several queries or pieces of content and responses provided to the same. In some embodiments, this response data can be formed into one or several matrices "D" containing data for n endpoints responding to p items, these one or several matrices D are also referred to herein as the matrix D, the D matrix, the endpoint matrix, and/or the response matrix. Thus, the matrix D can have n×p dimensions, and in some embodiments, the matrix D can identify whether endpoint responses to items were correct or incorrect. In some embodiments, for example, the matrix D can include an entry "1" for an item when an endpoint response to that item is correct and can otherwise include and entry "0".

The endpoint specification data storage 301 can include data relating to one or several particular processing modes. In some embodiments, for example, the endpoint, also referred to herein as the particular or the particular endpoint, may have one or several processing modes, one or several most effective processing modes, and/or the like. In some embodiments, the endpoint's processing modes can be any processing modes describing how the endpoint best adapts or how the endpoint tends to adapt. In one embodiment, these processing modes can include, for example, identification of the endpoint as an auditory adapter, as a visual adapter, and/or as a tactile adapter. In some embodiments, the data identifying one or several endpoint processing modes can include data identifying an adaptive approach based on the endpoint's development history such as, for example, identifying an endpoint as an auditory adapter when the endpoint has received significantly higher scores on assignments and/or in processes favorable to auditory adapters. In some embodiments, this data can be stored in a tier of memory that is not the fastest memory in the content access network 100.

In some embodiments, the endpoint specification data storage 301 can further include data identifying one or several endpoint performance levels. In some embodiments, these one or several endpoint performance levels can identify a performance level determined based on past performance by the endpoint interacting with the content access network 100, and in some embodiments, these one or several endpoint performance levels can identify a predicted performance level determined based on past performance by the endpoint interacting with the content access network 100 and one or several predictive models.

The endpoint specification data storage 301 can further include data relating to one or several administrators who are responsible for organizing presenting, and/or managing the presentation of data to the endpoint. In some embodiments, endpoint specification data storage 301 can include data identifying processes and/or process flows that have been executed by endpoint devices, data identifying processes and/or process flows currently being executed by endpoint devices, and/or data identifying processes and/or process flows that will be executed by endpoint device. In some embodiments, the endpoint specification data storage 301 can further include data indicating past diagnostics and/or diagnostic reports received by the administrator device. In some embodiments, the endpoint specification data storage 301 can further include data relating to improvement suggestions received by the administrator device, development received by the administrator device, continuing development received by the administrator device, and/or the like. In some embodiments, this data can be stored in a tier of memory that is not the fastest memory in the content access network 100.

A particularized records data storage 302 may generate and store particularized record data for different endpoints within the content access network 100. Particularized records may be created for particular endpoints, administrators, and the like. Particularized record data may include various particularized sets of access permissions, particularized record types, current particularized record status, particularized record characteristics, and any parameters and/or restrictions associated with the particularized records.

A content object data storage 303 may include data describing the particular content objects (or data packets) available via the content access network 100. In some embodiments, these data packets in the content object data storage 303 can be linked to from an object network, or specifically to form a Bayes Net content network or development graph. In some embodiments, these data packets can be linked in the object network according to one or several prerequisite relationships that can, for example, identify the relative hierarchy and/or difficulty of the data objects. In some embodiments, such a hierarchy of data objects can be created by the content access network 100 according to endpoint performance with the object network, and in some embodiments, this hierarchy of data objects can be created based on one or several existing and/or external hierarchies such as, for example, a process flow, an index, or the like. In some embodiments, for example, the object network can correspond to a process flow such that content objects for the process flow correspond to the object network.

In some embodiments, the content object data storage 303 can comprise a process flow, a scheduler output, or the like that identify one or several operations and/or events for the endpoint device. In some embodiments, for example, when the endpoint device is a member of a group of endpoint devices, these operations and/or events germane to the endpoint can identify one or several assignments, tests, or the like.

In some embodiments, the content object data storage 303 may include metadata, properties, and other characteristics associated with the content resources stored in the content server 112. Such data may identify one or more aspects or content attributes of the associated content resources, for example, subject matter, access level, or performance level of the content resources, rating attributes for the content resources (e.g., data indicating the diagnostic or effectiveness of the content resource), and the like. In some embodiments, the content object data storage 303 may be configured to allow updating of content metadata or properties, and to allow the addition and/or removal of data relating to the content resources. For example, content relationships may be implemented as graph structures, which may be stored in the content object data storage 303 or in an additional storage for use by selection algorithms along with the other metadata.

In some embodiments, the content object data storage 303 can contain data used in evaluating responses received from endpoints. In some embodiments, for example, an endpoint can receive content from the content access network 100 and can, subsequent to receiving that content, provide a response to the received content. In some embodiments, for example, the received content can comprise one or several queries, prompts, or the like, and the response to the received content can comprise an answer to those one or several queries, prompts, or the like. In some embodiments, data, referred to herein as "comparative data," from the content object data storage 303 can be used to determine whether the responses are the correct responses.

In some embodiments, the content object data storage 303 and/or the endpoint specification data storage 301 can comprise an aggregation network also referred to herein as a content object network. The aggregation network can comprise a plurality of content aggregations that can be linked together by, for example: creation by common endpoint; relation to a common subject, topic, performance, or the like; creation from a common set of source material such as source data packets; or the like. In some embodiments, the content aggregation can comprise a grouping of content comprising the presentation portion that can be provided to the endpoint in the form of for example, a query-response object and an extraction portion that can comprise the correct response to the presentation portion such as for example, an answer to a query-response object. In some embodiments, one or several content aggregations can be created by the content access network 100 and can be related to one or several data packets they can be, for example, organized in object network. In some embodiments, the one or several content aggregations can be each created from content stored in one or several of the data packets.

In some embodiments, the content aggregations located in the content object data storage 303 and/or the endpoint specification data storage 301 can be associated with an endpoint-creator of those content aggregations. In some embodiments, access to content aggregations can vary based on, for example, whether an endpoint created the content aggregations. In some embodiments, the content object data storage 303 and/or the endpoint specification data storage 301 can comprise a data storage of content aggregations associated with a specific endpoint, and in some embodiments, the content object data storage 303 and/or the endpoint specification data storage 301 can comprise a plurality of data storages of content aggregations that are each associated with a specific endpoint. In some embodiments, these data storages of content aggregations can include content aggregations created by their specific endpoint and in some embodiments, these data storages of content aggregations can further include content aggregations selected for inclusion by their specific endpoint and/or an administrator of that specific endpoint. In some embodiments, these content aggregations can be arranged and/or linked in a hierarchical relationship similar to the data packets in the object network and/or linked to the object network in the object network or the operations or performances associated with the data packets in the object network or the process flow or scheduler output.

In some embodiments, the content object network, and the content aggregations forming the content object network, can be organized according to the object network and/or the hierarchical relationships embodied in the object network. In some embodiments, the content object network, and/or the content aggregations forming the content object network, can be organized according to one or several operations identified in the process flow, scheduler output or the like.

A content access data storage 304 may include access permissions and security data for the content access network 100 and specific content resources. For example, the content access data storage 304 may include login data (e.g., endpoint identifiers, logins, passwords, etc.) that can be verified during endpoint login attempts to the network 100. The content access data storage 304 also may be used to store assigned endpoint particularized sets of access permissions and/or endpoint levels of access. For example, an endpoint's access level may correspond to the sets of content resources and/or the client or server applications that the endpoint is permitted to access. Certain endpoints may be permitted or denied access to certain applications and resources based on their development program, process/performance level, etc. Certain endpoints may have administratory access over one or more endpoints, allowing the administrator to access all or portions of the end endpoint's content, activities, diagnostics, etc. Additionally, certain endpoints may have administrative access over some endpoints and/or some applications in the content access network 100, allowing such endpoints to add and remove endpoint particularized records, modify endpoint access permissions, perform maintenance updates on software and servers, etc.

A source data storage 305 may include data relating to the source of the content resources available via the content access network. For example, a source data storage 305 may identify the authors and originating devices of content resources, previous pieces of data and/or groups of data originating from the same authors or originating devices and the like.

An diagnostic data storage 306 may include data used to direct the diagnostic of endpoints and content resources in the content access network 100. In some embodiments, the diagnostic data storage 306 may contain, for example, the analysis criteria and the analysis guidelines for evaluating endpoints and/or for evaluating the content resources in the network 100. The diagnostic data storage 306 also may include data relating to diagnostic processing operations, for example, the identification of endpoints and endpoint devices 106 that have received certain content resources or accessed certain applications, the status of diagnostics or diagnostic histories for content resources, endpoints, or applications, and the like. Diagnostic criteria may be stored in the diagnostic data storage 306 including data and/or instructions in the form of one or several electronic rubrics or scoring guides for use in the diagnostic of the content, endpoints, or applications. The diagnostic data storage 306 also may include past diagnostics and/or diagnostic analyses for endpoints, content, and applications, including relative rankings, characterizations, explanations, and the like.

A model data storage 307, also referred to herein as a model data storage 307 can store data relating to one or several predictive models. In some embodiments, these can include one or several evidence models, probability models, performance models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to an endpoint and/or to one or several content objects. Specifically, one or several inputs relating to the endpoint and/or to one or several content objects can be inserted into the evidence model. These inputs can include, for example, one or several measures of endpoint performance level, one or several measures of content object difficulty and/or performance level, or the like. The customized evidence model can then be used to predict the likelihood of the endpoint providing correct or incorrect responses to one or several of the content objects.

In some embodiments, the probability models can include one or several models that can be used to calculate one or several model function values. In some embodiments, these one or several model function values can be used to calculate a probability, which can characterize the probability of a particular endpoint device failing to achieve a correct outcome such as, for example, failing to correctly respond to one or several data packets, failure to achieve a correct level of completion of a program, for example in a pre-defined time period, failure to achieve a correct development outcome, or the like. In some embodiments, the probability can identify the probability of the particular-endpoint failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the correct level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any correct number of model functions can be associated with any correct number of completion statuses.

In some embodiments, a model function can be selected from the plurality of model functions based on an endpoint's progress through a program. In some embodiments, the endpoint's progress can be compared to one or several status trigger thresholds, each of which status trigger thresholds can be associated with one or more of the model functions. If one of the status triggers is triggered by the endpoint's progress, the corresponding one or several model functions can be selected.

The model functions can comprise a variety of types of models and/or functions. In some embodiments, each of the model functions outputs a function value that can be used in calculating a probability. This function value can be calculated by performing one or several mathematical operations on one or several values indicative of one or several endpoint attributes and/or endpoint parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a performance model can comprise a statistical model identifying a predictive performance level of one or several endpoints. In some embodiments, this model can identify a single performance level of an endpoint and/or a range of possible performance levels of an endpoint. In some embodiments, this statistical model can identify a performance level of a particular-endpoint and an error value or error range associated with that performance level. In some embodiments, the error value can be associated with a confidence interval determined based on a confidence level. Thus, in some embodiments, as the number of endpoint interactions with the content access network increases, the confidence level can increase and the error value can decrease such that the range identified by the error value about the predicted performance level is smaller.

A threshold data storage 308 can store one or several threshold values. These one or several threshold values can delineate between states or conditions. In one exemplary embodiment, for example, a threshold value can delineate between an acceptable endpoint performance and an unacceptable endpoint performance, between content appropriate for an endpoint and content that is inappropriate for an endpoint, between probability levels, or the like.

A prioritization data storage 309 can include data relating to one or several operations and the prioritization of those one or several operations with respect to each other. In some embodiments, the prioritization data storage 309 can be unique to a specific endpoint, and in some embodiments, the prioritization data storage 309 can be applicable to a plurality of endpoints. In some embodiments in which the prioritization data storage 309 is unique to a specific endpoint, the prioritization data storage 309 can be a sub-data storage of the endpoint specification data storage 301. In some embodiments, the prioritization data storage 309 can include data identifying a plurality of operations and a relative prioritization amongst that plurality of operations. In some embodiments, this prioritization can be static and in some embodiments, this prioritization can be dynamic in that the prioritization can change based on updates, for example, one or several of the operations, the endpoint specification data storage 301, or the like. In some embodiments, the prioritization data storage 309 can include data relating to operations associated with a single process, group, class, or the like, and in some embodiments, the prioritization data storage 309 can include data relating to operations associated with a plurality of processes, groups, classes, or the like.

An operation can define an objective and/or result and can be associated with one or several data packets that can, for example, contribute to endpoint attainment of the objective and/or result. In some embodiments, some or all of the data packets contained in the content object data storage 303 can be linked with one or several operations retained in the prioritization data storage 309 such that a single operation can be linked and/or associated with one or several data packets.

The prioritization data storage 309 can further include data germane to the prioritization of one or several operations and/or the prioritization data storage 309 can include data that can be used in determining the prioritization of one or several operations. In some embodiments, this can include weight data which can identify a relative and/or absolute weight of a operation. In some embodiments, for example, the weight data can identify the degree to which an operation contributes to an outcome such as, for example, a score or a grade. In some embodiments, this weight data can specify the portion and/or percent of a grade of a class, section, process, or study that results from, and/or that is associated with the operation.

The prioritization data storage 309 can further include data germane to the composition of the operation. In some embodiments, for example, this data, also referred to herein as a composition value, can identify one or several sub-operations and/or content categories forming the operations, as well as a contribution of each of those sub-operations and/or content categories to the operation. In some embodiments, the application of the weight data to the composition value can result in the identification of a contribution value for the operation and/or for the one or several sub-operations and/or content categories forming the operation. This contribution value can identify the contribution of one, some, or all of the sub-operations and/or content categories to the outcome such as, for example, the score or the grade.

The calendar data source 310, also referred to herein as the calendar data storage 310 can include timing data germane to the operations contained in the prioritization data storage 309. In some embodiments, this timing data can identify one or several dates by which the operations should be completed, one or several event dates associated with the operation such as, for example, one or several due dates, test dates, or the like, excluded day data, or the like. In some embodiments, the calendar data storage 310 can further include any data provided to the endpoint relating to other objectives, commitments, or the like.

In addition to the illustrative data storages described above, data storage server(s) 104 (e.g., data storage servers, file-based storage servers, etc.) may include one or more external data aggregators 311. External data aggregators 311 may include external data sources accessible to the content access network 100, but not maintained by the content access network 100. External data aggregators 311 may include any electronic data source relating to the endpoints, content resources, or applications of the content access network 100. For example, external data aggregators 311 may be external data storages containing development-related data and the like. Data retrieved from various external data aggregators 311 may be used to verify and update endpoint particularized record data, suggest endpoint content, and perform endpoint and content diagnostics.

An authentication data storage 312 can include authentication data collected during the performance of the authenticated operation. This authentication data can include any information collected and/or collectible during the authenticated operation and useful in identifying the actual endpoint. This information can, in some embodiments, correspond to information stored in the endpoint specification data storage 301.

A verification data storage 313 can include information used in determining and/or verifying the identity of the actual endpoint. In some embodiments, for example, this information can include algorithms and/or procedures for comparing endpoint specification data with authentication data and/or for processing results of the comparison of the endpoint specification data with the authentication data. In some embodiments, the verification data storage 313 can include, for example, criteria and/or thresholds useful in evaluating the results of the comparison of endpoint specification data with authentication data.

Figure 4:
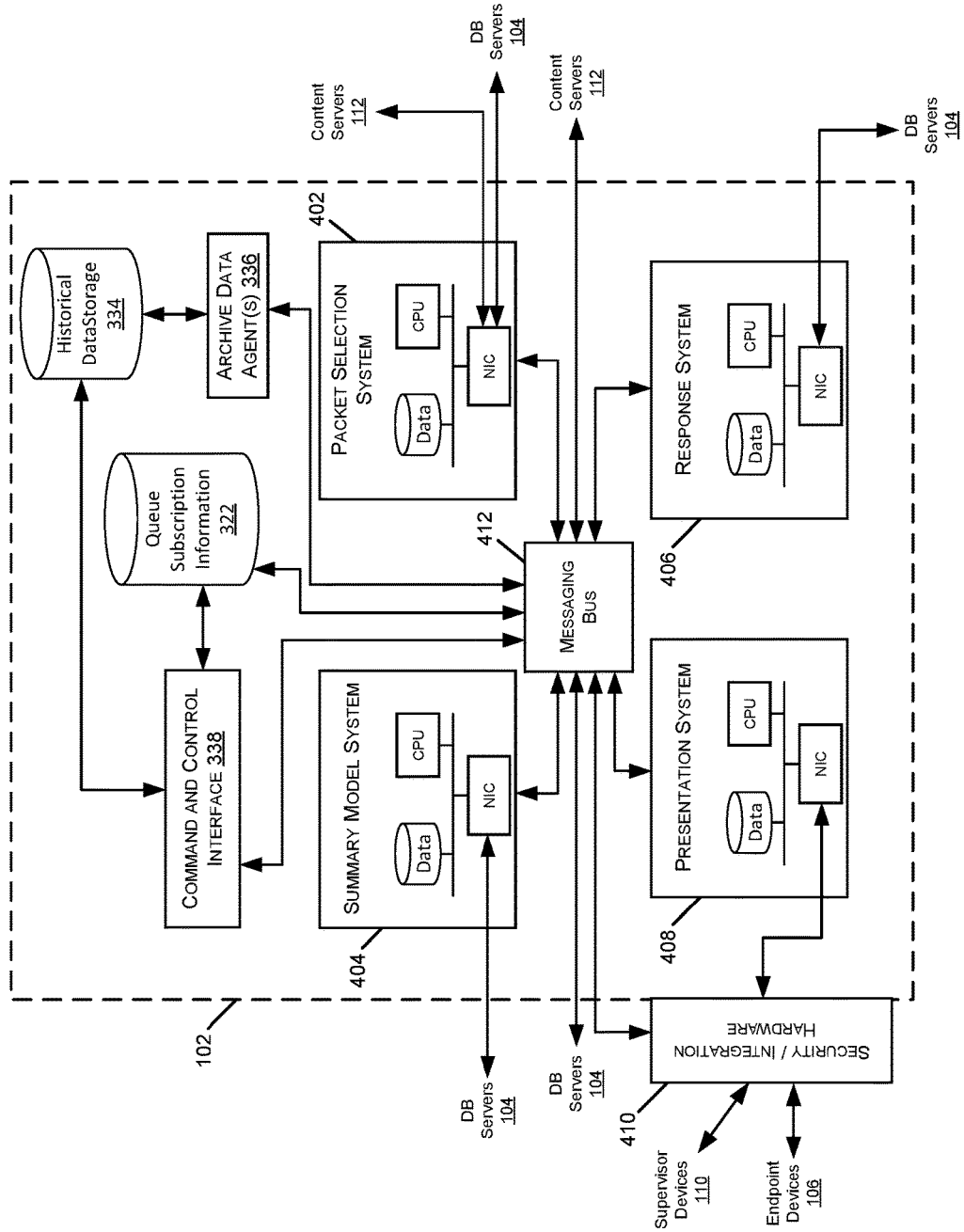
FIG. 4 is a block diagram illustrating an example of one or more content management servers within a content access network, in accordance with embodiments of the present disclosure.

With reference now to FIG. 4, a block diagram is shown illustrating an embodiment of one or more content management servers 102 within a content access network 100. In such an embodiment, content management server 102 performs internal data gathering and processing of streamed content along with external data gathering and processing. Other embodiments could have either all external or all internal data gathering. This embodiment allows reporting timely data that might be of interest to the reporting party or other parties. In this embodiment, the content management server 102 can monitor gathered data from several sources to allow it to make timely business and/or processing decisions based upon that data. For example, reports of endpoint actions and/or responses, as well as the status and/or results of one or several processing operations could be gathered and reported to the content management server 102 from a number of sources.

Internally, the content management server 102 gathers data from one or more internal components 402-408. The internal components 402-408 gather and/or process data relating to such things as: content provided to endpoints; content consumed by endpoints; responses provided by endpoints; endpoint performance levels; content difficulty levels; next content for providing to endpoints; etc. The internal components 402-408 can report the gathered and/or created data in real-time, near real-time or along another time line. To particularized record for any delay in reporting data, a time stamp or staleness indicator can inform others of how timely the data was sampled. The content management server 102 can opt to allow third parties to use internally or externally gathered data that is aggregated within the server 102 by subscription to the content access network 100.

A command and control (CC) interface 338 configures the gathered input data to an output of data streams, also referred to herein as content streams. APIs for accepting gathered data and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC data is passed to the internal components 402-408 and/or other components of the content access network 100 through a channel separate from the gathered data or data stream in this embodiment, but other embodiments could embed CC data in these communication channels. The CC data allows throttling data reporting frequency, specifying formats for data and data streams, deactivation of one or several internal components 402-408 and/or other components of the content access network 100, updating authentication and authorization, etc.

The various data streams that are available can be researched and explored through the CC interface 338. Those data stream selections for a particular subscriber, which can be one or several of the internal components 402-408 and/or other components of the content access network 100, are stored in the queue subscription data storage 322. The server 102 and/or the CC interface 338 then routes selected data streams to processing subscribers that have selected delivery of a given data stream. Additionally, the server 102 also supports historical queries of the various data streams that are stored in an historical data storage 334 as gathered by an archive data agent 336. Through the CC interface 338 various data streams can be selected for archiving into the historical data storage 334.

Components of the content access network 100 outside of the server 102 can also gather data that is reported to the server 102 in real-time, near real-time, or along another time line. There is a defined API between those components and the server 102. Each type of data or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content access network 100 outside of the server 102 may report an endpoint response, but define an identifier of that endpoint as a private variable that would not be passed to processing subscribers lacking access to that endpoint and/or authorization to receive that endpoint data. Processing subscribers having access to that endpoint and/or authorization to receive that endpoint data would receive the subscriber identifier along with the response reported to that component. Encryption and/or unique addressing of data streams or sub-streams can be used to hide the private variables within the messaging queues.

The endpoint devices 106 and/or administrator devices 110 communicate with the server 102 through security and/or integration hardware 410. The communication with security and/or integration hardware 410 can be encrypted or not. For example, a socket using a TCP connection could be used. In addition to TCP, other transport layer protocols like Control Transmission Protocol (SCTP) and Endpoint Datagram Protocol (UDP) could be used in some embodiments to intake the gathered data. A protocol such as SSL could be used to protect the data over the TCP connection. Authentication and authorization can be performed to any endpoint devices 106 and/or administrator device interfacing to the server 102. The security and/or integration hardware 410 receives the data from one or several of the endpoint devices 106 and/or the administrator devices 110 by providing the API and any encryption, authorization, and/or authentication. In some cases, the security and/or integration hardware 410 reformats or rearranges this received data The messaging bus 412, also referred to herein as a messaging queue or a messaging channel, can receive data from the internal components of the server 102 and/or components of the content access network 100 outside of the server 102 and distribute the gathered data as a data stream to any processing subscribers that have requested the data stream from the messaging queue 412. As indicated in FIG. 4, processing subscribers are indicated by a connector to the messaging bus 412, the connector having an arrow head pointing away from the messaging bus 412. In some examples, only data streams within the messaging queue 412 that a particular processing subscriber has subscribed to may be read by that processing subscriber if received at all. Gathered data sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP, and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the data and make a decision and/or feed the output from the processing as gathered data fed back into the messaging queue 412. Through the CC interface 338 a developer can search the available data streams or specify a new data stream and its API. The new data stream might be determined by processing a number of existing data streams with a processing subscriber.

The content access network 100 has internal processing subscribers 402-408 that process assigned data streams to perform functions within the server 102. Internal processing subscribers 402-408 could perform functions such as providing content to an endpoint, receiving a response from an endpoint, determining the correctness of the received response, updating one or several models based on the correctness of the response, recommending new content for providing to one or several endpoints, or the like. The internal processing subscribers 402-408 can decide filtering and weighting of records from the data stream. To the extent that decisions are made based upon analysis of the data stream, each data record is time stamped to reflect when the data was gathered such that additional credibility could be given to more recent results, for example. Other embodiments may filter out records in the data stream that are from an unreliable source or stale. For example, a particular contributor of data may prove to have less than optimal gathered data and that could be weighted very low or removed altogether.

Internal processing subscribers 402-408 may additionally process one or more data streams to provide different data to feed back into the messaging queue 412 to be part of a different data stream. For example, hundreds of endpoint devices 106 could provide responses that are put into a data stream on the messaging queue 412. An internal processing subscriber 402-408 could receive the data stream and process it to determine the difficulty of one or several data packets provided to one or several endpoints and supply this data back onto the messaging queue 412 for possible use by other internal and external processing subscribers.

As mentioned above, the CC interface 338 allows the network 100 to query historical messaging queue 412 data. An archive data agent 336 listens to the messaging queue 412 to store data streams in a historical data storage 334. The historical data storage 334 may store data streams for varying amounts of time and may not store all data streams. Different data streams may be stored for different amounts of time.

With regards to the components 402-408, the content management server(s) 102 may include various server hardware and software components that manage the content resources within the content access network 100 and provide interactive and adaptive content to endpoints on various endpoint devices 106. For example, content management server(s) 102 may provide instructions to and receive data from the other devices within the content access network 100, in order to manage and transmit content resources, endpoint data, and server or client applications executing within the network 100.

A content management server 102 may include a packet selection system 402. The packet selection system 402 may be implemented using dedicated hardware within the content access network 100 (e.g., a packet selection server 402), or using designated hardware and software resources within a shared content management server 102. In some embodiments, the packet selection system 402 may adjust the selection and adaptive capabilities of content resources to match the needs and desires of the endpoints receiving the content. For example, the packet selection system 402 may query various data storages and servers 104 to retrieve endpoint data, such as endpoint preferences and characteristics (e.g., from an endpoint specification data storage 301), endpoint access restrictions to content reprocesses (e.g., from a content access data storage 304), previous endpoint results and content diagnostics (e.g., from an diagnostic data storage 306), and the like. Based on the retrieved data from data storages 104 and other data sources, the packet selection system 402 may modify content resources for particular endpoints.

In some embodiments, the packet selection system 402 can include a recommendation engine, also referred to herein as an adaptive recommendation engine. In some embodiments, the recommendation engine can select one or several pieces of content, also referred to herein as data packets, for providing to an endpoint. These data packets can be selected based on, for example, the data retrieved from the data storage server 104 including, for example, the endpoint specification data storage 301, the content object data storage 303, the model data storage 307, or the like. In some embodiments, these one or several data packets can be adaptively selected and/or selected according to one or several selection rules. In one embodiment, for example, the recommendation engine can retrieve data from the endpoint specification data storage 301 identifying, for example, a performance level of the endpoint. The recommendation engine can further retrieve data from the content object data storage 303 identifying, for example, potential data packets for providing to the endpoint and the difficulty of those data packets and/or the performance level associated with those data packets.

The recommendation engine can identify one or several potential data packets for providing and/or one or several data packets for providing to the endpoint based on, for example, one or several rules, models, predictions, or the like. The recommendation engine can use the performance level of the endpoint to generate a prediction of the likelihood of one or several endpoints providing a correct response to some or all of the potential data packets. In some embodiments, the recommendation engine can pair one or several data packets with selection criteria that may be used to determine which packet should be delivered to an endpoint based on one or several received responses from that particular-endpoint. In some embodiments, one or several data packets can be eliminated from the pool of potential data packets if the prediction indicates either too high a likelihood of a correct response or too low a likelihood of a correct response. In some embodiments, the recommendation engine can then apply one or several selection criteria to the remaining potential data packets to select a data packet for providing to the endpoint. These one or several selection criteria can be based on, for example, criteria relating to a correct estimated time for receipt of response to the data packet, one or several content parameters, one or several assignment parameters, or the like.

A content management server 102 also may include a summary model system 404. The summary model system 404 may be implemented using dedicated hardware within the content access network 100 (e.g., a summary model server 404), or using designated hardware and software resources within a shared content management server 102. In some embodiments, the summary model system 404 may monitor the progress of endpoints through various types of content resources and groups, such as resource compilations, processes, or curriculums in development or development contexts, interactive gaming environments, and the like. For example, the summary model system 404 may query one or more data storages and/or data storage servers 104 to retrieve endpoint data such as associated content compilations or programs, content completion status, endpoint objectives, results, and the like.

A content management server 102 also may include a response system 406, which can include, in some embodiments, a response processor. The response system 406 may be implemented using dedicated hardware within the content access network 100 (e.g., a response server 406), or using designated hardware and software resources within a shared content management server 102. The response system 406 may be configured to receive and analyze data from endpoint devices 106. For example, various ratings of content resources submitted by endpoints may be compiled and analyzed, and then stored in a data storage (e.g., a content object data storage 303 and/or diagnostic data storage 306) associated with the content. In some embodiments, the response server 406 may analyze the data to determine the effectiveness or appropriateness of content resources with, for example, a subject matter, an age group, a performance level, or the like. In some embodiments, the response system 406 may provide updates to the packet selection system 402 or the summary model system 404, with the attributes of one or more content resources or groups of resources within the network 100. The response system 406 also may receive and analyze endpoint diagnostic data from endpoint devices 106, administrator devices 110, and administrator servers 116, etc. For instance, response system 406 may receive, aggregate, and analyze endpoint diagnostic data for different types of endpoints (e.g., endpoints, administrators, administrators, etc.) in different contexts (e.g., resource consumer ratings, develope or particular comprehension levels, administrator device effectiveness levels, gamer performance levels, etc.).

In some embodiments, the response system 406 can be further configured to receive one or several responses from the endpoint and analyze these one or several responses. In some embodiments, for example, the response system 406 can be configured to translate the one or several responses into one or several observables. As used herein, an observable is a characterization of a received response. In some embodiments, the translation of the one or several response into one or several observables can include determining whether the one or several response are correct responses, also referred to herein as correct responses, or are incorrect responses, also referred to herein as incorrect responses. In some embodiments, the translation of the one or several response into one or several observables can include characterizing the degree to which one or several response are correct responses and/or incorrect responses. In some embodiments, one or several values can be created by the response system 406 to reflect endpoint performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content access network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to endpoint devices 106. The presentation system 408 may determine the appropriate presentation format for the content resources based on the endpoint characteristics and preferences, and/or the device capabilities of endpoint devices 106. If needed, the presentation system 408 may convert the content resources to the appropriate presentation format and/or compress the content before transmission. In some embodiments, the presentation system 408 may also determine the appropriate transmission resource and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the endpoint devices 106, administrator devices 110, administrator servers 116, and other devices in the network 100.

Figure 5:
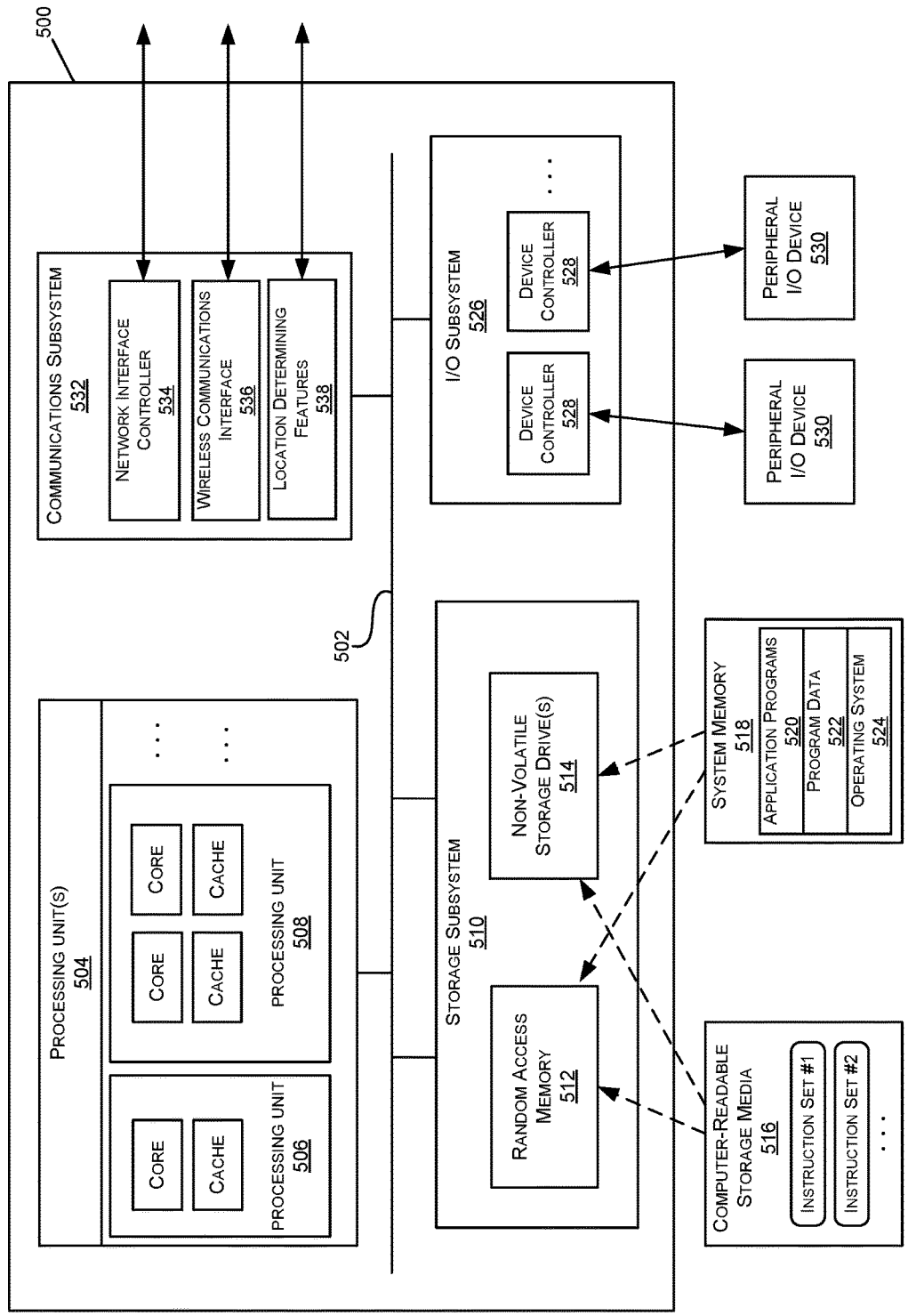
FIG. 5 is a block diagram illustrating the physical and logical components of a special-purpose computer device within a content access network, in accordance with embodiments of the present disclosure.

With reference now to FIG. 5, a block diagram of an illustrative computer system is shown. The system 500 may correspond to any of the computing devices or servers of the content access network 100 described above, or any other computing devices described herein, and specifically can include, for example, one or several of the endpoint devices 106, the administrator device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more endpoint interface input devices and/or endpoint interface output devices 530. Endpoint interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to an endpoint by converting one or several electrical signals to endpoint perceptible and/or interpretable form, and may receive one or several inputs from the endpoint by generating one or several electrical signals based on one or several endpoint-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable resource players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable endpoints to control and interact with an input device through a natural endpoint interface using gestures and spoken commands, eye gesture recognition devices that detect eye activity from endpoints and transform the eye gestures as input into an input device, voice recognition sensing devices that enable endpoints to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting data from computer system 500 to an endpoint or other computer. For example, output devices 530 may include, without limitation, a variety of display devices that visually convey text, graphics, and audio/video data such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage resource 516. The system memory 518 and/or computer-readable storage resource 516 may store program instructions that are loadable and executable on processing units 504, as well as data created during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are intermediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer data between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage resource 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present disclosure.

Storage subsystem 510 may also include a computer-readable storage resource reader that can further be connected to computer-readable storage resource 516. Together and, optionally, in combination with system memory 518, computer-readable storage resource 516 may comprehensively represent remote, local, fixed, and/or removable storage devices plus storage resource for temporarily and/or more permanently containing, storing, transmitting, and retrieving computer-readable data.

Computer-readable storage resource 516 containing program code, or portions of program code, may include any appropriate resource known or used in the art, including storage resource and communication resource, such as, but not limited to, volatile and non-volatile, removable and non-removable resource implemented in any method or technology for storage and/or transmission of data. This can include tangible computer-readable storage resource such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable resource. This can also include nontangible computer-readable resource, such as data signals, data transmissions, or any other medium which can be used to transmit the correct data and which can be accessed by computer system 500.

By way of example, computer-readable storage resource 516 may include a hard disk drive that reads from or writes to non-removable, nonvolatile magnetic resource, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical resource. Computer-readable storage resource 516 may include, but is not limited to, Zip® drives, flash memory cards, universal serial bus (USB) flash drives, secure digital (SD) cards, DVD disks, digital video tape, and the like. Computer-readable storage resource 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable resource may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WIFi (TFFF 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more endpoints who may use or access computer system 500. For example, communications subsystem 532 may be configured to receive data feeds in real-time from endpoints of social networks and/or other communication functionalities, web feeds such as Rich Site Summary (RSS) feeds, and/or real-time updates from one or more third party data sources (e.g., external data source 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data storages 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, an endpoint of ordinary performance in the art will appreciate other ways and/or methods to implement the various embodiments.

Figure 6:
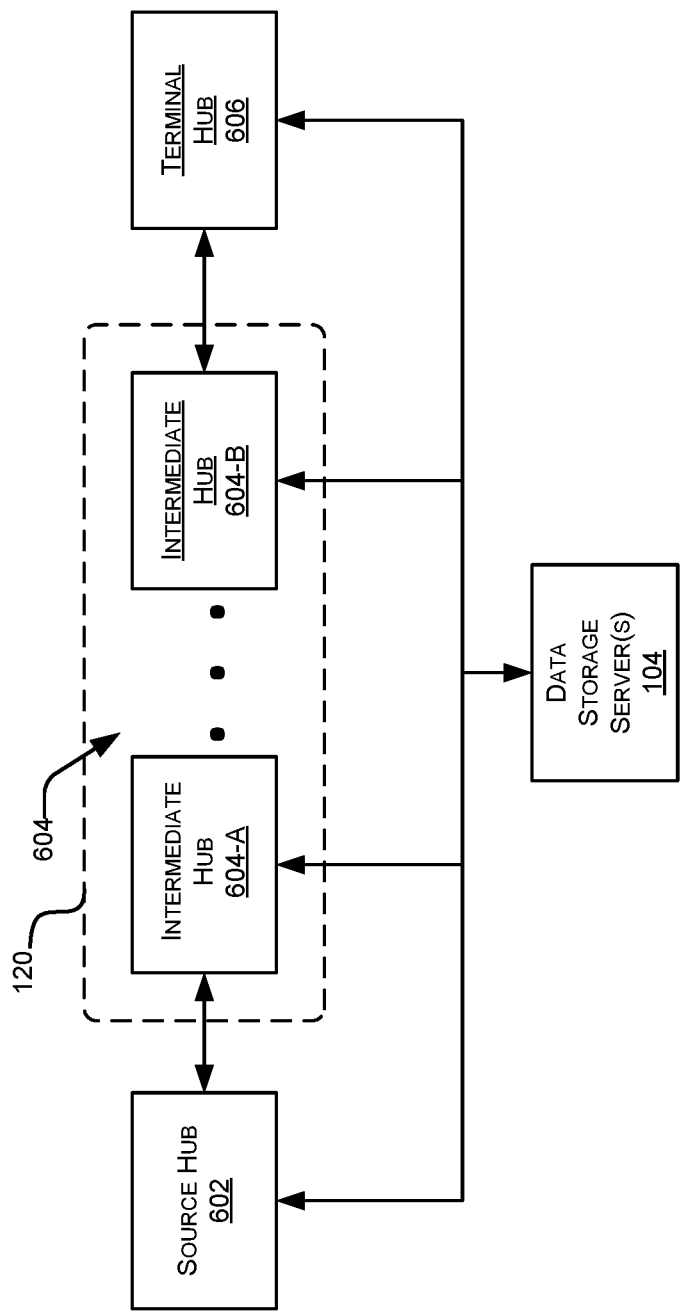
FIG. 6 is a block diagram illustrating one embodiment of the communication network, in accordance with embodiments of the present disclosure.

With reference now to FIG. 6, a block diagram illustrating one embodiment of the communication network is shown. Specifically, FIG. 6 depicts one hardware configuration in which messages are exchanged between a source hub 602 and a terminal hub 606 via the communication network 120 that can include one or several intermediate hubs 604. In some embodiments, the source hub 602 can be any one or several components of the content access network generating and initiating the sending of a message, and the terminal hub 606 can be any one or several components of the content access network 100 receiving and not re-sending the message. In some embodiments, for example, the source hub 602 can be one or several of the endpoint device 106, the administrator device 110, and/or the server 102, and the terminal hub 606 can likewise be one or several of the endpoint device 106, the administrator device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatively connected with the data storage 104. In such an embodiments, some or all of the hubs 602, 604, 606 can send data to the data storage 104 identifying a received message and/or any sent or resent message. This data can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
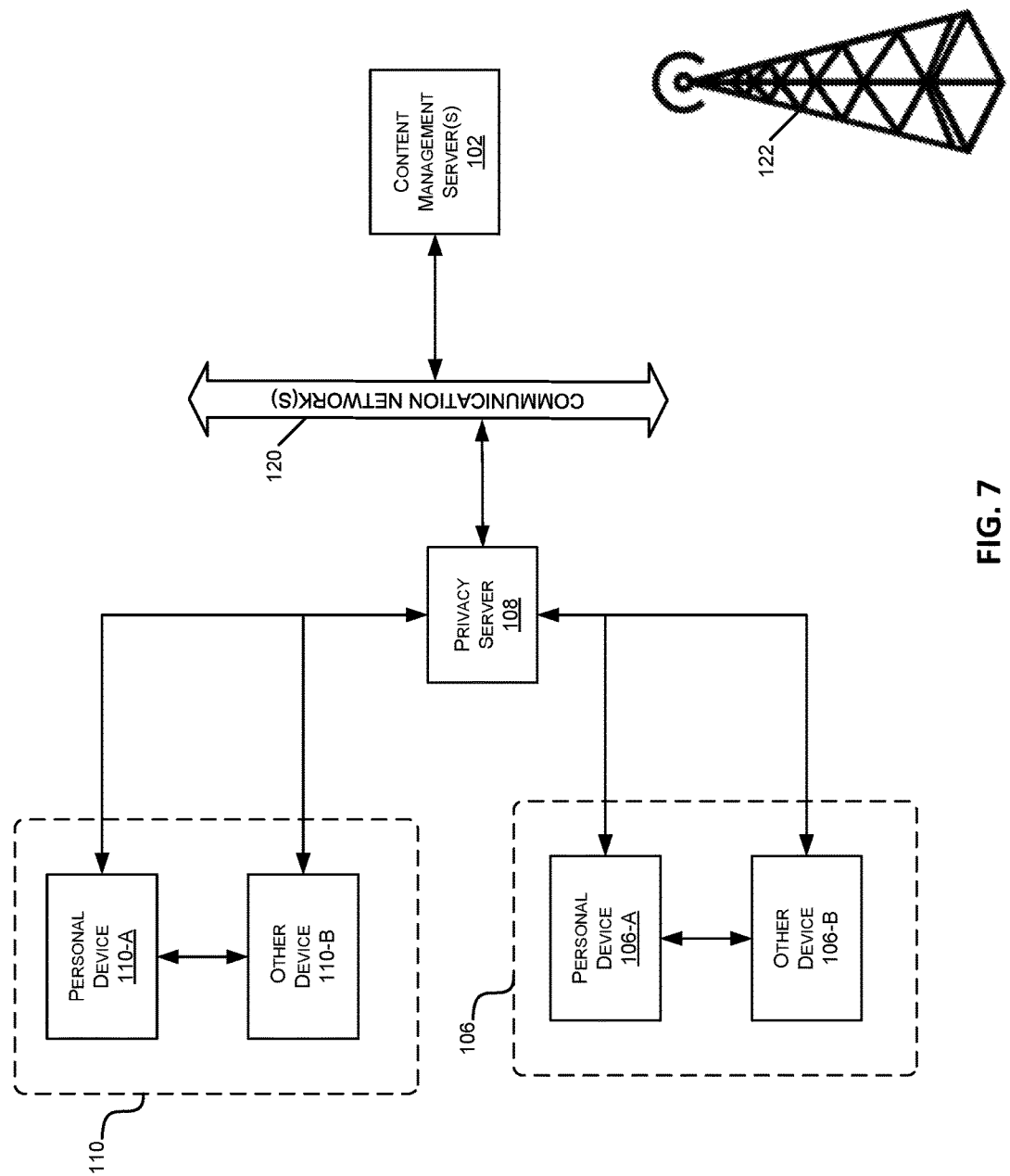
FIG. 7 is a block diagram illustrating one embodiment of endpoint device and administrator device communication, in accordance with embodiments of the present disclosure.

With reference now to FIG. 7, a block diagram illustrating one embodiment of endpoint device 106 and administrator device 110 communication is shown. In some embodiments, for example, an endpoint may have multiple devices that can connect with the content access network 100 to send or receive data. In some embodiments, for example, an endpoint may have a particular device such as a mobile device, a smartphone, a tablet, a smartwatch, a laptop, a PC, or the like. In some embodiments, the other device can be any computing device in addition to the particular device. This other device can include, for example, a laptop, a PC, a smartphone, a tablet, a smartwatch, or the like. In some embodiments, the other device differs from the particular device in that the particular device is registered as such within the content access network 100 and the other device is not registered as a particular device within the content access network 100.

Specifically with respect to FIG. 7 in view of the devices illustrated with FIG. 1, the endpoint device 106 can include a particular endpoint device 106-A and one or several other endpoint devices 106-B. In some embodiments, one or both of the particular endpoint device 106-A and the one or several other endpoint devices 106-B can be communicatively connected to the content management server 102 and/or to the navigation system 122. Similarly, the administrator device 110 can include a particular administrator device 110-A and one or several other administrator devices 110-B. In some embodiments, one or both of the particular administrator device 110-A and the one or several other administrator devices 110-B can be communicatively connected to the content management server 102 and/or to the navigation system 122.

In some embodiments, the content access network can send one or more alerts to one or more endpoint devices 106 and/or one or more administrator devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several endpoint devices 106 and/or particular-endpoint particularized records associated with the particular-endpoint and/or one or several administrator devices 110 and/or administrator-endpoint particularized records associated with the administrator-endpoint. After these one or several devices 106, 110 and/or particularized records have been identified, the providing of this alert can include determining an active device of the devices 106, 110 based on determining which of the devices 106, 110 and/or particularized records are actively being used, and then providing the alert to that active device.

Specifically, if the endpoint is actively using one of the devices 106, 110 such as the other endpoint device 106-B and the other administrator device 110-B, and/or particularized records, the alert can be provided to the endpoint via that other device 106-B, 110-B, and/or particularized record that is actively being used. If the endpoint is not actively using another device 106-B, 110-B, and/or particularized record, a particular device 106-A, 110-A device, such as a smart phone or tablet, can be identified and the alert can be provided to this particular device 106-A, 110-A. In some embodiments, the alert can include code to direct the default device to provide an indicator of the received alert such as, for example, an oral, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an oral, tactile, and/or visual indicator of the alert and/or of the receipt of the alert. In some embodiments, this can include controlling a screen of the administrator device 110 to display the alert, data contained in alert and/or an indicator of the alert.

Figure 8:
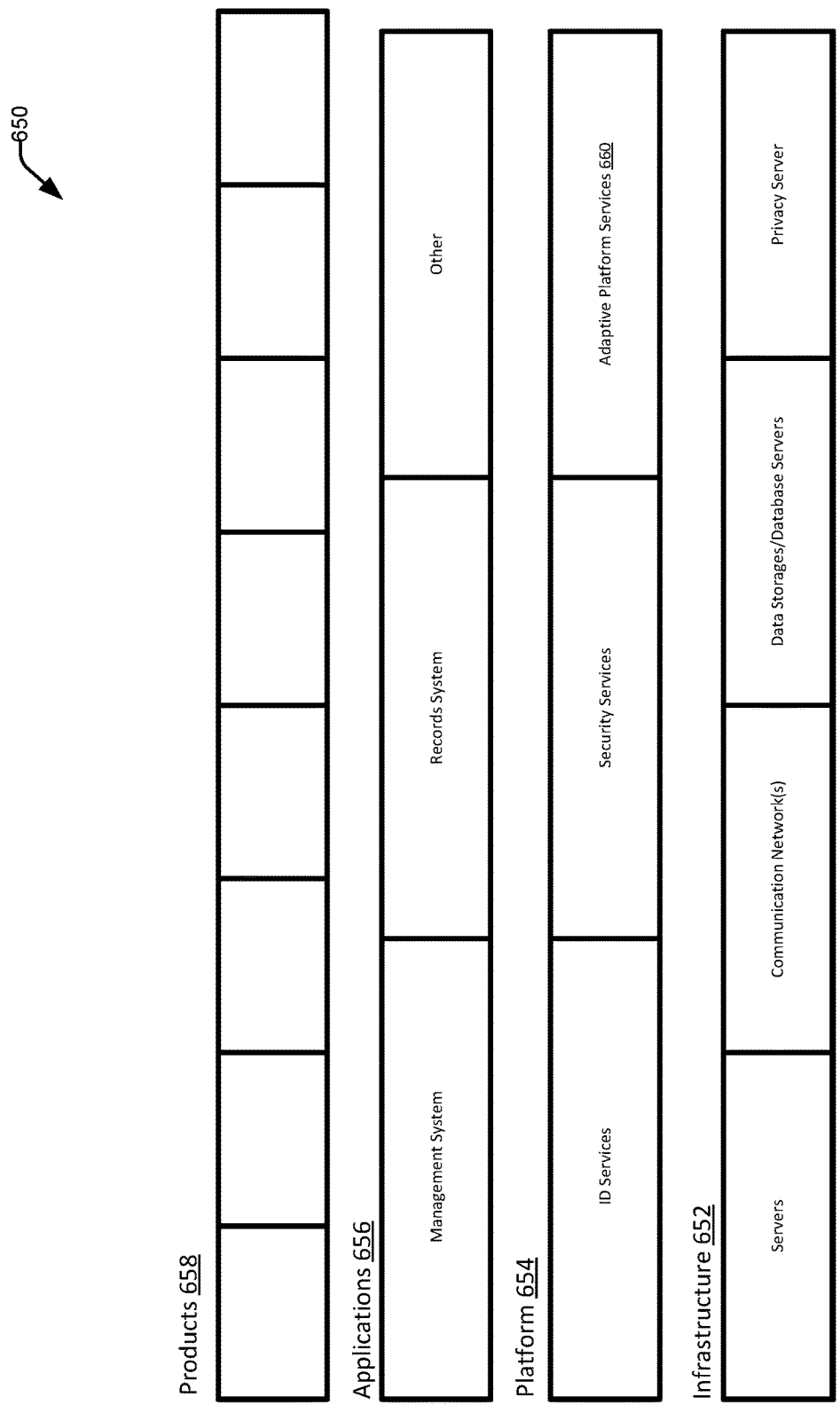
FIG. 8 is a schematic illustration of one embodiment of a computing stack, in accordance with embodiments of the present disclosure.

With reference now to FIG. 8, a schematic illustration of one embodiment of an application stack, and particularly of a stack 650 is shown. In some embodiments, the content access network 100 can comprise a portion of the stack 650 that can include an infrastructure layer 652, a platform layer 654, an applications layer 656, and a products layer 658. In some embodiments, the stack 650 can comprise some or all of the layers, hardware, and/or software to provide one or several correct functionalities and/or productions.

As depicted in FIG. 8, the infrastructure layer 652 can include one or several servers, communication networks, data storages, privacy servers, and the like. In some embodiments, the infrastructure layer can further include one or several endpoint devices 106 and/or devices 110 connected as part of the content access network.

The platform layer can include one or several platform software programs, modules, and/or capabilities. These can include, for example, identification functionalities, security functionalities, and/or adaptive platform functionalities 660. In some embodiments, the identification functionalities can, for example, identify one or several endpoints, components of the content access network 100, or the like. The security functionalities can monitor the content access network for one or several security threats, breaches, viruses, malware, or the like. The adaptive platform functionalities 660 can receive data from one or several components of the content access network 100 and can provide predictions, models, recommendations, or the like based on that received data. The adaptive platform functionalities 660 will be discussed in greater detail in FIGS. 9-11, below.

The applications layer 656 can include software or software modules upon or in which one or several product softwares or product software modules can operate. In some embodiments, the applications layer 656 can include, for example, a management system, record system, or the like. In some embodiments, the management system can include, for example, a Development Management System (L[earn-ing]MS), a Content Management System (CMS), or the like. The management system can be configured to control the delivery of one or several resources to an endpoint and/or to receive one or several responses from the endpoint. In some embodiments, the records system can include, for example, a virtual performance metric log, a virtual assistant, or the like.

The products layer can include one or several software products and/or software module products. These software products and/or software module products can provide one or several functionalities to one or several endpoints of the software products and/or software module products.

Figure 9:
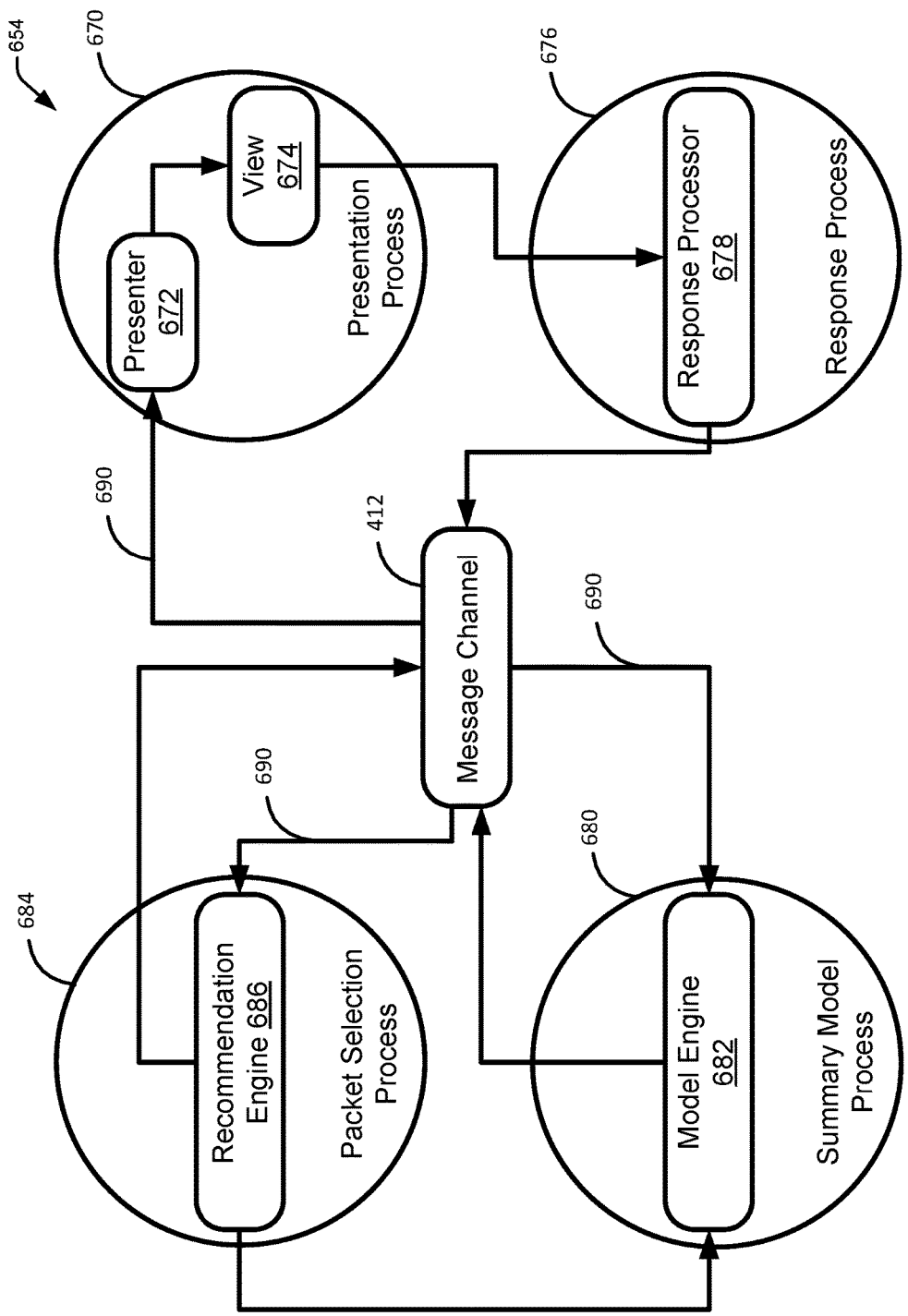
FIG. 9 is a schematic illustration of one embodiment of communication and processing flow of modules within the content access network, in accordance with embodiments of the present disclosure.
Figure 10:
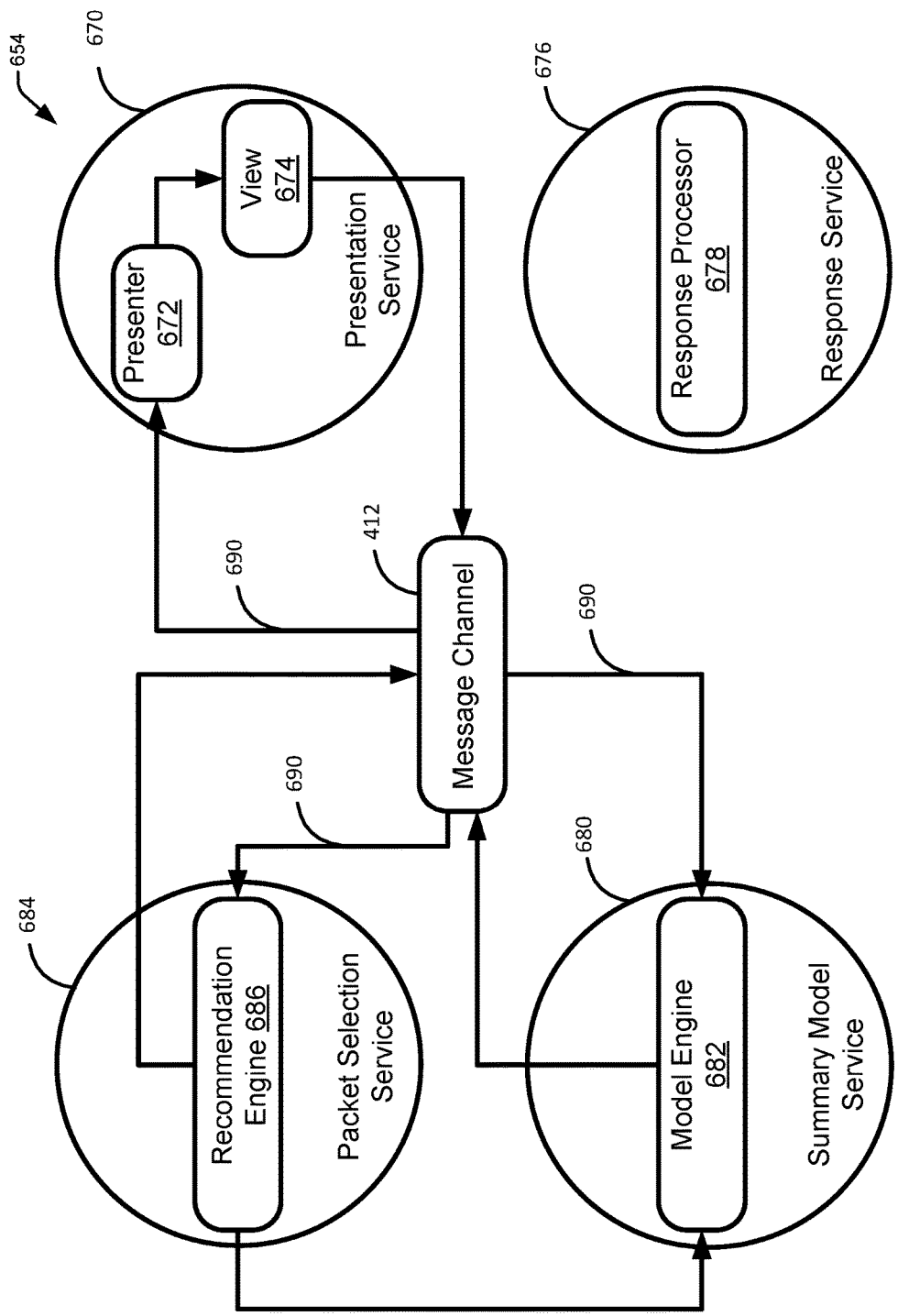
FIG. 10 is a schematic illustration of one embodiment of communication and processing flow of modules within the content access network, in accordance with embodiments of the present disclosure.
Figure 11:
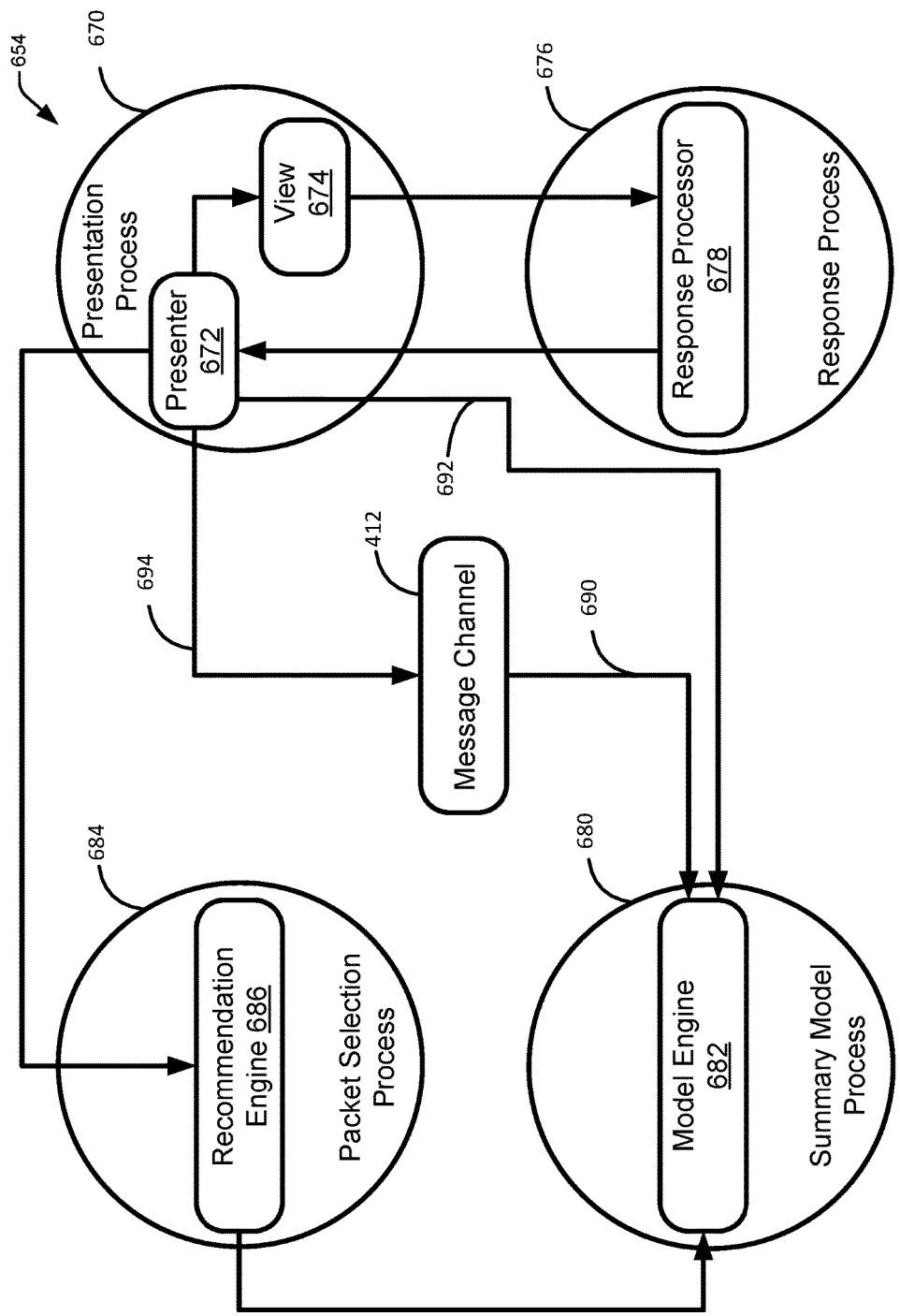
FIG. 11 is a schematic illustration of one embodiment of communication and processing flow of modules within the content access network, in accordance with embodiments of the present disclosure.

With reference now to FIG. 9-11, schematic illustrations of embodiments of communication and processing flow of modules within the content access network 100 are shown. In some embodiments, the communication and processing can be performed in portions of the platform layer 654 and/or applications layer 656. FIG. 9 depicts a first embodiment of such communications or processing that can be in the platform layer 654 and/or applications layer 656 via the message channel 412.

The platform layer 654 and/or applications layer 656 can include a plurality of modules that can be embodied in software or hardware. In some embodiments, some or all of the modules can be embodied in hardware and/or software at a single location, and in some embodiments, some or all of these modules can be embodied in hardware and/or software at multiple locations. These modules can perform one or several processes including, for example, a presentation process 670, a response process 676, a summary model process 680, and a packet selection process 684.

The presentation process 670 can, in some embodiments, include one or several method and/or steps to deliver content to one or several endpoint devices 106 and/or administrator devices 110. The presentation process 670 can be performed by a presenter module 672 and a view module 674. The presenter module 672 can be a hardware or software module of the content access network 100, and specifically of the server 102. In some embodiments, the presenter module 672 can include one or several portions, features, and/or functionalities that are located on the server 102 and/or one or several portions, features, and/or functionalities that are located on the endpoint device 106. In some embodiments, the presenter module 672 can be embodied in the presentation system 408.

The presenter module 672 can control the providing of content to one or several endpoint devices 106 and/or administrator devices 110. Specifically, the presenter module 672 can control the generation of one or several messages to provide content to one or several correct endpoint devices 106 and/or administrator devices 110. The presenter module 672 can further control the providing of these one or several messages to the correct one or several correct endpoint devices 106 and/or administrator devices 110. Thus, in some embodiments, the presenter module 672 can control one or several features of the communications subsystem 532 to generate and send one or several electrical signals comprising content to one or several endpoint devices 106 and/or administrator devices 110.

In some embodiments, the presenter module 672 can control and/or manage a portion of the presentation functions of the presentation process 670, and can specifically manage an "outer loop" of presentation functions. As used herein, the outer loop refers to operations relating to the tracking of an endpoint's progress through all or a portion of a group of data packets. In some embodiments, this can include the identification of one or several completed data packets or nodes and/or the non-adaptive selection of one or several next data packets or nodes according to, for example, one or several fixed rules. Such non-adaptive selection does not rely on the use of predictive models, but rather on rules identifying next data packets based on data relating to the completion of one or several previously completed data packets or assessments and/or whether one or several previously completed data packets were successfully completed.

In some embodiments, and due to the management of the outer loop of presentation functions including the non-adaptive selection of one or several next data packets, nodes, or operations by the presenter module, the presenter module can function as a recommendation engine referred to herein as a first recommendation engine or a rules-based recommendation engine. In some embodiments, the first recommendation engine can be configured to select a next node for an endpoint based on one or all of the endpoint's current location in the content network; potential next nodes; the endpoint's history including the endpoint's previous responses; and one or several guard conditions associated with the potential next nodes. In some embodiments, a guard condition defines one or several prerequisites for entry into, or exit from, a node.

In some embodiments, the presenter module 672 can include a portion located on the server 102 and/or a portion located on the endpoint device 106. In some embodiments, the portion of the presenter module 672 located on the server 102 can receive data packet data and provide a subset of the received data packet data to the portion of the presenter module 672 located on the endpoint device 106. In some embodiments, this segregation of functions and/or capabilities can prevent solution data from being located on the endpoint device 106 and from being potentially accessible by the endpoint of the endpoint device 106.

In some embodiments, the portion of the presenter module 672 located on the endpoint device 106 can be further configured to receive the subset of the data packet data from the portion of the presenter module 672 located on the server 102 and provide that subset of the data packet data to the view module 674. In some embodiments, the portion of the presenter module 672 located on the endpoint device 106 can be further configured to receive a content request from the view module 674 and to provide that content request to the portion of the presenter module 674 located on the server 102.

The view module 674 can be a hardware or software module of some or all of the endpoint devices 106 and/or administrator devices 110 of the content access network 100. The view module 674 can receive one or several electrical signals and/or communications from the presenter module 672 and can provide the content received in those one or several electrical signals and/or communications to the endpoint of the endpoint device 106 and/or administrator device 110 via, for example, the I/O subsystem 526.

In some embodiments, the view module 674 can control and/or monitor an "inner loop" of presentation functions. As used herein, the inner loop refers to operations relating to the tracking and/or management of an endpoint's progress through a data packet. This can specifically relate to the tracking and/or management of an endpoint's progression through one or several pieces of content, queries, assessments, and/or the like of a data packet. In some embodiments, this can further include the selection of one or several next pieces of content, next queries, next assessments, and/or the like of the data packet for presentation and/or providing to the endpoint of the endpoint device 106.

In some embodiments, one or both of the presenter module 672 and the view module 674 can comprise one or several presentation engines. In some embodiments, these one or several presentation engines can comprise different capabilities and/or functions. In some embodiments, one of the presentation engines can be configured to track the progress of an endpoint through a single data packet, operation, content object, or the like, and in some embodiments, one of the presentation engines can track the progress of an endpoint through a series of data packets, operations, content objects, or the like.

The response process 676 can comprise one or several methods and/or steps to analyze a response. In some embodiments, this can include, for example, determining whether the response comprises a correct response and/or an incorrect response. In some embodiments, the response process 676 can include one or several methods and/or steps to determine the correctness and/or incorrectness of one or several received responses. In some embodiments, this can include, for example, determining the correctness and/or incorrectness of a multiple choice response, a true/false response, a short answer response, an essay response, or the like. In some embodiments, the response processor can employ, for example, natural language processing, semantic analysis, or the like in determining the correctness or incorrectness of the received responses.

In some embodiments, the response process 676 can be performed by a response processor 678. The response processor 678 can be a hardware or software module of the content access network 100, and specifically of the server 102. In some embodiments, the response processor 678 can be embodied in the response system 406. In some embodiments, the response processor 678 can be communicatively connected to one or more of the modules of the presentation process 670 such as, for example, the presenter module 672 and/or the view module 674. In some embodiments, the response processor 678 can be communicatively connected with, for example, the message channel 412 and/or other components and/or modules of the content access network 100.

The summary model process 680 can comprise one or several methods and/or steps to generate and/or update one or several models. In some embodiments, this can include, for example, implementing data received either directly or indirectly from the response processor 678 to update one or several models. In some embodiments, the summary model process 680 can include the update of a model relating to one or several endpoint attributes such as, for example, an endpoint performance model, an endpoint knowledge model, a development style model, or the like. In some embodiments, the summary model process 680 can include the update of a model relating to one or several content attributes including attributes relating to a single content object and/or data packet and/or attributes relating to a plurality of content objects and/or data packets. In some embodiments, these models can relate to an attribute of the one or several data packets such as, for example, difficulty, discrimination, required time, or the like.

In some embodiments, the summary model process 680 can be performed by the model engine 682. In some embodiments, the model engine 682 can be a hardware or software module of the content access network 100, and specifically of the server 102. In some embodiments, the model engine 682 can be embodied in the summary model system 404.

In some embodiments, the model engine 682 can be communicatively connected to one or more of the modules of the presentation process 760 such as, for example, the presenter module 672 and/or the view module 674, can be connected to the response processor 678 and/or the recommendation. In some embodiments, the model engine 682 can be communicatively connected to the message channel 412 and/or other components and/or modules of the content access network 100.

The packet selection process 684 can comprise one or several steps and/or methods to identify and/or select a data packet for presentation to an endpoint. In some embodiments, this data packet can comprise a plurality of data packets. In some embodiments, this data packet can be selected according to one or several models updated as part of the summary model process 680. In some embodiments, this data packet can be selected according to one or several rules, probabilities, models, or the like. In some embodiments, the one or several data packets can be selected by the combination of a plurality of models updated in the summary model process 680 by the model engine 682. In some embodiments, these one or several data packets can be selected by a recommendation engine 686. The recommendation engine 686 can be a hardware or software module of the content access network 100, and specifically of the server 102. In some embodiments, the recommendation engine 686 can be embodied in the packet selection system 402. In some embodiments, the recommendation engine 686 can be communicatively connected to one or more of the modules of the presentation process 670, the response process 676, and/or the summary model process 680 either directly and/or indirectly via, for example, the message channel.

In some embodiments, and as depicted in FIG. 9, a presenter module 672 can receive a data packet for presentation to an endpoint device 106. This data packet can be received, either directly or indirectly, from a recommendation engine 686. In some embodiments, for example, the presenter module 672 can receive a data packet for providing to an endpoint device 106 from the recommendation engine 686, and in some embodiments, the presenter module 672 can receive an identifier of a data packet for providing to an endpoint device 106 via a view module 674. This can be received from the recommendation engine 686 via a message channel 412. Specifically, in some embodiments, the recommendation engine 686 can provide data to the message channel 412 indicating the identification and/or selection of a data packet for providing to an endpoint via an endpoint device 106. In some embodiments, this data indicating the identification and/or selection of the data packet can identify the data packet and/or can identify the intended recipient of the data packet.

The message channel 412 can output this received data in the form of a data stream 690 which can be received by, for example, the presenter module 672, the model engine 682, and/or the recommendation engine 686. In some embodiments, some or all of the presenter module 672, the model engine 682, and/or the recommendation engine 686 can be configured to parse and/or filter the data stream 690 to identify data and/or events germane to their operation. Thus, for example, the presenter module 672 can be configured to parse the data stream for data and/or events germane to the operation of the presenter module 672.

In some embodiments, the presenter module 672 can, extract the data packet from the data stream 690 and/or extract data identifying the data packet and/or indicating the selecting of a data packet from the data stream. In the event that data identifying the data packet is extracted from the data stream 690, the presenter module 672 can request and receive the data packet from the data storage server 104, and specifically from the content object data storage 303. In embodiments in which data indicating the selection of a data packet is extracted from the data stream 690, the presenter module 672 can request and receive identification of the data packet from the recommendation engine 686 and then request and receive the data packet from the data storage server 104, and specifically from the content object data storage 303, and in some embodiments in which data indicating the selection of a data packet is extracted from the data stream 690, the presenter module 672 can request and receive the data packet from the recommendation engine 686.

The presenter module can then, provide the data packet and/or portions of the data packet to the view module 674. In some embodiments, for example, the presenter module 672 can retrieve one or several rules and/or conditions that can be, for example, associated with the data packet and/or stored in the data storage server 104. In some embodiments, these rules and/or conditions can identify portions of a data packet for providing to the view module 674 and/or portions of a data packet to not provide to the view module 674. In some embodiments, for example, sensitive portions of a data packet, such as, for example, solution data to any queries associated with a data packet, is not provided to the view module 674 to prevent the possibility of incorrect access to those sensitive portions of the data packet. Thus, in some embodiments, the one or several rules and/or conditions can identify portions of the data packet for providing to the view module 674 and/or portions of the data packet for not providing to the view module.

In some embodiments, the presenter module 672 can, according to the one or more rules and/or conditions, generate and transmit an electronic message containing all or portions of the data packet to the view module 674. The view module 674 can receive these all or portions of the data packet and can provide all or portions of this data to the endpoint of the endpoint device 106 associated with the view module 674 via, for example, the I/O subsystem 526. In some embodiments, as part of the providing of all or portions of the data packet to the endpoint of the view module 674, one or several endpoint responses can be received by the view module 674. In some embodiments, these one or several endpoint responses can be received via the I/O subsystem 526 of the endpoint device 106.

After one or several endpoint responses have been received, the view module 674 can provide the one or several endpoint responses to the response processor 678. In some embodiments, these one or several responses can be directly provided to the response processor 678, and in some embodiments, these one or several responses can be provided indirectly to the response processor 678 via the message channel 412.

After the response processor 678 receives the one or several responses, the response processor 678 can determine whether the responses are correct responses and/or the degree to which the received responses are correct responses. In some embodiments, the response processor can make this determination via, for example, use of one or several techniques, including, for example, natural language processing (NLP), semantic analysis, or the like.

In some embodiments, the response processor can determine whether a response is a correct response and/or the degree to which a response is a correct response with comparative data which can be associated with the data packet. In some embodiments, this comparative data can comprise, for example, an indication of a correct response and/or an indication of one or several incorrect responses, a response key, a response rubric comprising one or several criterion for determining the degree to which a response is a correct response, or the like. In some embodiments, the comparative data can be received as a portion of and/or associated with a data packet. In some embodiments, the comparative data can be received by the response processor 678 from the presenter module 672 and/or from the message channel 412. In some embodiments, the response data received from the view module 674 can comprise data identifying the endpoint and/or the data packet or portion of the data packet with which the response is associated. In some embodiments in which the response processor 678 merely receives data identifying the data packet and/or portion of the data packet associated with the one or several responses, the response processor 678 can request and/or receive comparative data from the data storage server 104, and specifically from the content object data storage 303 of the data storage server 104.

After the comparative data has been received, the response processor 678 determines whether the one or several responses comprise correct responses and/or the degree to which the one or several responses comprise correct responses. The response processor can then provide the data characterizing whether the one or several responses comprises correct responses and/or the degree to which the one or several responses comprise correct responses to the message channel 412. The message channel can, as discussed above, include the output of the response processor 678 in the data stream 690 which can be constantly output by the message channel 412.

In some embodiments, the model engine 682 can subscribe to the data stream 690 of the message channel 412 and can thus receive the data stream 690 of the message channel 412 as indicated in FIG. 9. The model engine 682 can monitor the data stream 690 to identify data and/or events germane to the operation of the model engine. In some embodiments, the model engine 682 can monitor the data stream 690 to identify data and/or events germane to the determination of whether a response is a correct response and/or the degree to which a response is a correct response.

When a germane event and/or germane data is identified by the model engine, the model engine 682 can take the identified germane event and/or germane data and modify one or several models. In some embodiments, this can include updating and/or modifying one or several models germane to the endpoint who provided the responses, updating and/or modifying one or several models germane to the data packet associated with the responses, and/or the like. In some embodiments, these models can be retrieved from the data storage server 104, and in some embodiments, can be retrieved from the model data source 307 of the data storage server 104.

After the models have been updated, the updated models can be stored in the data storage server 104. In some embodiments, the model engine 682 can send data indicative of the event of the completion of the model update to the message channel 412. The message channel 412 can incorporate this data into the data stream 690 which can be received by the recommendation engine 686. The recommendation engine 686 can monitor the data stream 690 to identify data and/or events germane to the operation of the recommendation engine 686. In some embodiments, the recommendation engine 686 can monitor the data stream 690 to identify data and/or events germane to the updating of one or several models by the model engine 682.

When the recommendation engine 686 identifies data in the data stream 690 indicating the completion of the summary model process 680 for models germane to the endpoint providing the response and/or for models germane to the data packet provided to the endpoint, the recommendation engine 686 can identify and/or select a next data packet for providing to the endpoint and/or to the presentation process 470. In some embodiments, this selection of the next data packet can be performed according to one or several rules and/or conditions. After the next data packet has been selected, the recommendation engine 686 can provide data to the model engine 682 identifying the next selected data packet and/or to the message channel 412 indicating the event of the selection of the next content object. After the message channel 412 receives data identifying the selection of the next content object and/or receives the next content object, the message channel 412 can include this data in the data stream 690 and the process discussed with respect to FIG. 9 can be repeated.

With reference now to FIG. 10, a schematic illustration of a second embodiment of communication or processing that can be in the platform layer 654 and/or applications layer 656 via the message channel 412 is shown. In the embodiment depicted in FIG. 10, the data packet provided to the presenter module 672 and then to the view module 674 does not include a prompt for an endpoint response and/or does not result in the receipt of an endpoint response. As no response is received, when the data packet is completed, nothing is provided to the response processor 678, but rather data indicating the completion of the data packet is provided from one of the view module 674 and/or the presenter module 672 to the message channel 412. The data is then included in the data stream 690 and is received by the model engine 682 which uses the data to update one or several models. After the model engine 682 has updated the one or several models, the model engine 682 provides data indicating the completion of the model updates to the message channel 412. The message channel 412 then includes the data indicating the completion of the model updates in the data stream 690 and the recommendation engine 686, which can subscribe to the data stream 690, can extract the data indicating the completion of the model updates from the data stream 690. The recommendation engine 686 can then identify a next one or several data packets for providing to the presenter module 672, and the recommendation engine 686 can then, either directly or indirectly, provide the next one or several data packets to the presenter module 672.

With reference now to FIG. 11, a schematic illustration of an embodiment of dual communication, or hybrid communication, in the platform layer 654 and/or applications layer 656 is shown. Specifically, in this embodiment, some communication is synchronous with the completion of one or several operations and some communication is asynchronous. Thus, in the embodiment depicted in FIG. 11, the presenter module 672 communicates synchronously with the model engine 682 via a direct communication 692 and communicates asynchronously with the model engine 682 via the message channel 412.

Specifically, and with reference to FIG. 11, the presenter module 672 can receive and/or select a data packet for presentation to the endpoint device 106 via the view module 674. In some embodiments, the presenter module 672 can identify all or portions of the data packet that can be provided to the view module 674 and portions of the data packet for retaining form the view module 674. In some embodiments, the presenter module can provide all or portions of the data packet to the view module 674. In some embodiments, and in response to the receipt of all or portions of the data packet, the view module 674 can provide a confirmation of receipt of the all or portions of the data packet and can provide those all or portions of the data packet to the endpoint via the endpoint device 106. In some embodiments, the view module 674 can provide those all or portions of the data packet to the endpoint device 106 while controlling the inner loop of the presentation of the data packet to the endpoint via the endpoint device 106.

After those all or portions of the data packet have been provided to the endpoint device 106, a response indicative of the completion of one or several operations associated with the data packet can be received by the view module 674 from the endpoint device 106, and specifically from the I/O subsystem 526 of the endpoint device 106. In response to this receive, the view module 674 can provide an indication of this completion status to the presenter module 672 and/or can provide the response to the response processor 678.

After the response has been received by the response processor 678, the response processor 678 can determine whether the received response is a correct response. In some embodiments, this can include, for example, determining whether the response comprises a correct answer and/or the degree to which the response comprises a correct answer.

After the response processor has determined whether the received response is a correct response, the response processor 678 can provide an indicator of the result of the determination of whether the received response is a correct response to the presenter module 672. In response to the receipt of the indicator of whether the result of the determination of whether the received response is a correct response, the presenter module 672 can synchronously communicate with the model engine 682 via a direct communication 692 and can asynchronously communicate with model engine 682 via the message channel 412. In some embodiments, the synchronous communication can advantageously include two-way communication between the model engine 682 and the presenter module 672 such that the model engine 682 can provide an indication to the presenter module 672 when model updating is completed by the model engine.

After the model engine 682 has received one or both of the synchronous and asynchronous communications, the model engine 682 can update one or several models relating to, for example, the endpoint, the data packet, or the like. After the model engine 682 has completed the updating of the one or several models, the model engine 682 can send a communication to the presenter module 672 indicating the completion of the updated one or several modules.

After the presenter module 672 receives the communication indicating the completion of the updating of the one or several models, the presenter module 672 can send a communication to the recommendation engine 686 requesting identification of a next data packet. As discussed above, the recommendation engine 686 can then retrieve the updated model and retrieve the endpoint data. With the updated models and the endpoint data, the recommendation engine can identify a next data packet for providing to the endpoint, and can provide the data packet to the presenter module 672. In some embodiments, the recommendation engine 686 can further provide an indication of the next data packet to the model engine 682, which can use this data relating to the next data packet to update one or several models, either intermediately, or after receiving a communication from the presenter module 672 subsequent to the determination of whether a received response for that data packet is a correct response.

Figure 12:
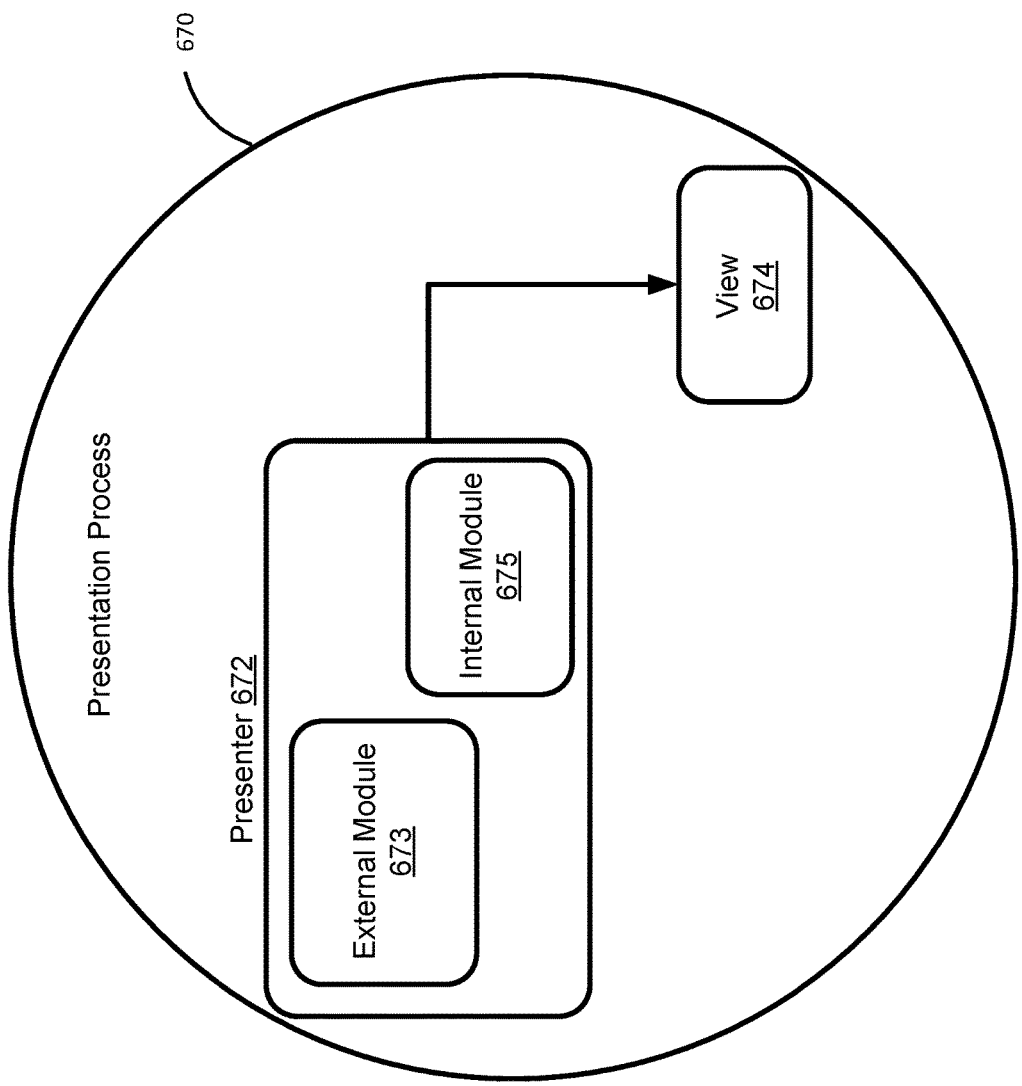
FIG. 12 is a schematic illustration of one embodiment of communication and processing flow of modules within the content access network, in accordance with embodiments of the present disclosure.

With reference now to FIG. 12, a schematic illustration of one embodiment of the presentation process 670 is shown. Specifically, FIG. 12 depicts multiple portions of the presenter module 672, namely, the external portion 673 and the internal portion 675. In some embodiments, the external portion 673 of the presenter module 672 can be located in the server, and in some embodiments, the internal portion 675 of the presenter module 672 can be located in the endpoint device 106. In some embodiments, the external portion 673 of the presenter module can be configured to communicate and/or exchange data with the internal portion 675 of the presenter module 672 as discussed herein. In some embodiments, for example, the external portion 673 of the presenter module 672 can receive a data packet and can parse the data packet into portions for providing to the internal portion 675 of the presenter module 672 and portions for not providing to the internal portion 675 of the presenter module 672. In some embodiments, the external portion 673 of the presenter module 672 can receive a request for additional data and/or an additional data packet from the internal portion 675 of the presenter module 672. In such an embodiment, the external portion 673 of the presenter module 672 can identify and retrieve the requested data and/or the additional data packet from, for example, the data storage server 104 and more specifically from the content access data storage 304.

Figure 13:
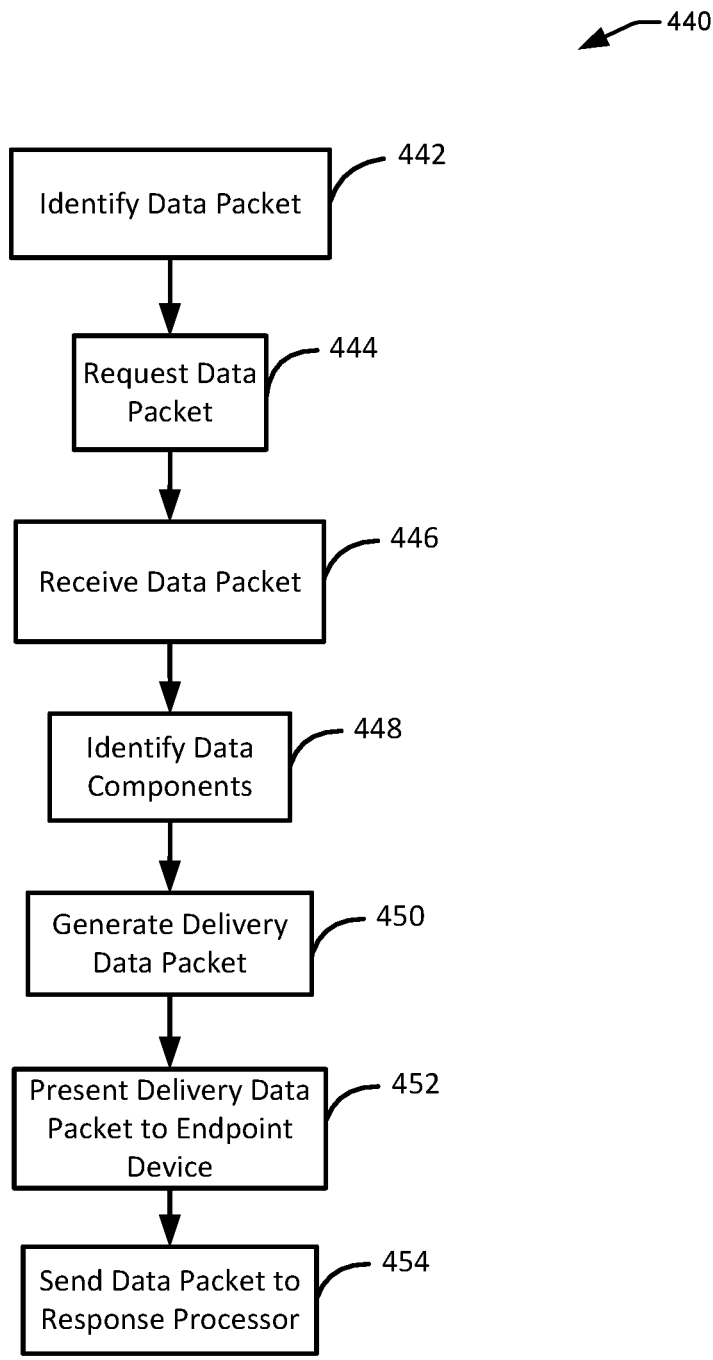
FIG. 13 is a flowchart illustrating one embodiment of a process for data management, in accordance with embodiments of the present disclosure.

With reference now to FIG. 13, a flowchart illustrating one embodiment of a process 440 for data management is shown. In some embodiments, the process 440 can be performed by the content management server 102, and more specifically by the presentation system 408 and/or by the presentation module or presentation engine. In some embodiments, the process 440 can be performed as part of the presentation process 670.

The process 440 begins at block 442, wherein a data packet is identified. In some embodiments, the data packet can be a data packet for providing to a particular-endpoint. In some embodiments, the data packet can be identified based on a communication received either directly or indirectly from the recommendation engine 686.

After the data packet has been identified, the process 440 may proceed to block 444, wherein the data packet is requested. In some embodiments, this can include the requesting of data relating to the data packet such as the data forming the data packet. In some embodiments, this data can be requested from, for example, the content object data storage 303. After the data packet has been requested, the process 440 may proceed to block 446, wherein the data packet is received. In some embodiments, the data packet can be received by the presentation system 408 from, for example, the content object data storage 303.

After the data packet has been received, the process 440 may proceed to block 448, wherein one or several data components are identified. In some embodiments, for example, the data packet can include one or several data components which can, for example, contain different data. In some embodiments, one of these data components, referred to herein as a presentation component, can include content for providing to the endpoint, which content can include one or several requests and/or queries and/or the like. In some embodiments, one of these data components, referred to herein as a response component, can include data used in evaluating one or several responses received from the endpoint device 106 in response to the data packet, and specifically in response to the presentation component and/or the one or several requests and/or queries of the presentation component. Thus, in some embodiments, the response component of the data packet can be used to ascertain whether the endpoint has provided a correct response or an incorrect response.

After the data components have been identified, the process 440 may proceed to block 450, wherein a delivery data packet is identified. In some embodiments, the delivery data packet can include the one or several data components of the data packets for delivery to an endpoint such as the endpoint via the endpoint device 106. In some embodiments, the delivery packet can include the presentation component, and in some embodiments, the delivery packet can exclude the response packet. After the delivery data packet has been created, the process 440 may proceed to block 452, wherein the delivery data packet is provided to the endpoint device 106 and more specifically to the view module 674. In some embodiments, this can include providing the delivery data packet to the endpoint device 106 via, for example, the communication network 120.

After the delivery data packet has been provided to the endpoint device 106, the process 440 may proceed to block 454, wherein the data packet and/or one or several components thereof is sent to and/or provided to the response processor 678. In some embodiments, this sending of the data packet and/or one or several components thereof to the response processor can include receiving a response from the endpoint, and sending the response to the endpoint to the response processor simultaneous with the sending of the data packet and/or one or several components thereof to the response processor. In some embodiments, for example, this can include providing the response component to the response processor. In some embodiments, the response component can be provided to the response processor from the presentation system 408.

Figure 14:
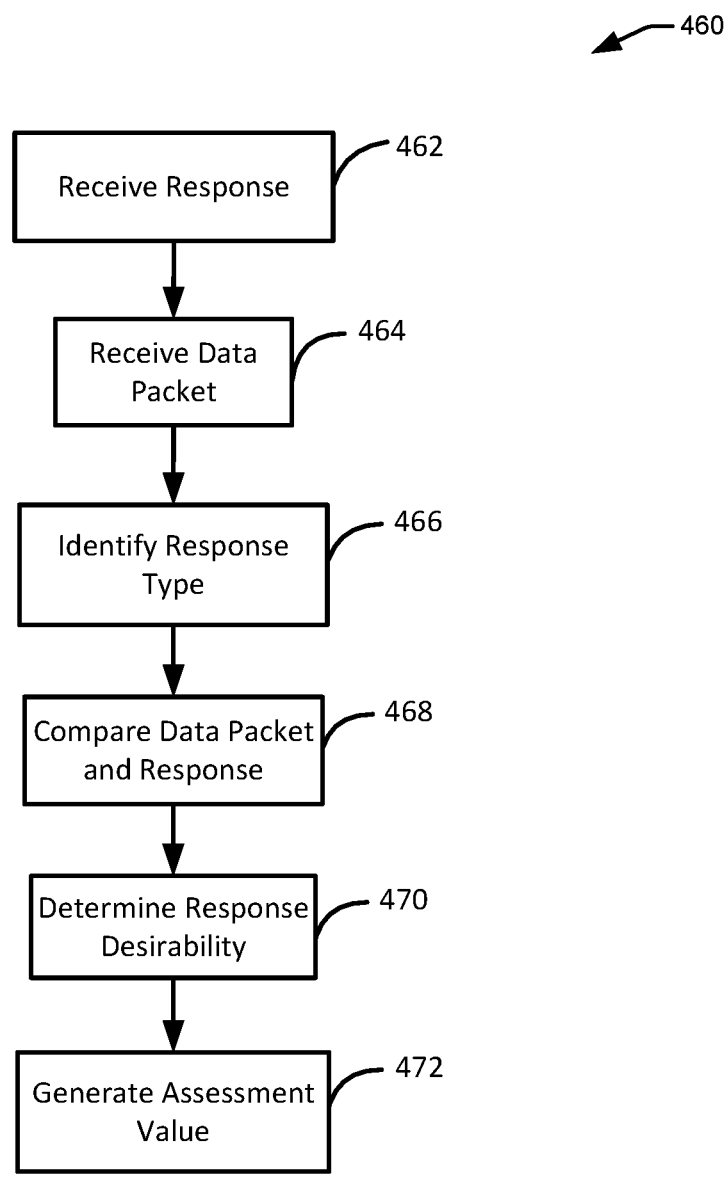
FIG. 14 is a flowchart illustrating one embodiment of a process for evaluating a response, in accordance with embodiments of the present disclosure.

With reference now to FIG. 14, a flowchart illustrating one embodiment of a process 460 for evaluating a response is shown. In some embodiments, the process can be performed as a part of the response process 676 and can be performed by, for example, the response system 406 and/or by the response processor 678. In some embodiments, the process 460 can be performed by the response system 406 in response to the receipt of a response, either directly or indirectly, from the endpoint device 106 or from the view module 674.

The process 460 begins at block 462, wherein a response is received from, for example, the endpoint device 106 via, for example, the communication network 120. After the response has been received, the process 460 may proceed to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 may proceed to block 466, wherein the response type is identified. In some embodiments, this identification can be performed based on data, such as metadata associated with the response. In other embodiments, this identification can be performed based on data packet data such as the response component.

In some embodiments, the response type can identify one or several attributes of the one or several requests and/or queries of the data packet such as, for example, the request and/or query type. In some embodiments, this can include identifying some or all of the one or several requests and/or queries as true/false, multiple choice, short answer, essay, or the like.

After the response type has been identified, the process 460 may proceed to block 468, wherein the data packet and the response are compared to determine whether the response comprises a correct response and/or an incorrect response. In some embodiments, this can include comparing the received response and the data packet to determine if the received response matches all or portions of the response component of the data packet, to determine the degree to which the received response matches all or portions of the response component, to determine the degree to which the received response embodies one or several qualities identified in the response component of the data packet, or the like. In some embodiments, this can include classifying the response according to one or several rules. In some embodiments, these rules can be used to classify the response as either correct or incorrect. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 may proceed to block 470 wherein response desirability is determined. In some embodiments this can include, based on the result of the comparison of the data packet and the response, whether the response is a correct response or is an incorrect response. In some embodiments, this can further include quantifying the degree to which the response is a correct response. This determination can include, for example, determining if the response is a correct response, an incorrect response, a partially correct response, or the like. In some embodiments, the determination of response desirability can include the generation of a value characterizing the response desirability and the storing of this value in one of the data storages 104 such as, for example, the endpoint specification data storage 301. After the response desirability has been determined, the process 460 may proceed to block 472, wherein an assessment value is created. In some embodiments, the assessment value can be an aggregate value characterizing response desirability for one or more of a plurality of responses. This assessment value can be stored in one of the data storages 104 such as the endpoint specification data storage 301.

In some embodiments, content provisioning performed in accordance with the processes of FIGS. 11 through 14 can provide significant benefits over current content provisioning with a computer, especially over current content provisioning with a computer in an development environment. In some embodiments, content provisioning as described in FIGS. 11 through 14 can be based on real-time and dynamic prioritization that can be based on models of one or several endpoint attributes such as endpoint performance level, models of one or several operation attributes, such as operation difficulty levels, or the like. This provides the significant benefit of accurately selecting content most suited for delivery which increases the efficiency with which content is provided to the endpoint.

As disclosed herein, embodiments according to the present disclosure provide technological solutions to multiple problems existing with conventional systems and approaches. Conventional systems and approaches are deficient in providing access to system resources and performance testing and development resources. Conventional systems and approaches may provide access with insufficient or no protection of authentication integrity and insufficient or no measures to address or remediate a lack of authentication integrity. The technical improvements provided by disclosed embodiments include improvements in accuracy of authentication, speed, timeliness, adaptability, sensitivity, and responsiveness in authentication by way of adaptive authentication that is based at least in part on a learned endpoint patterns and causing real-time activation adjustments and enhanced authentication measures when endpoint attributes detected in real-time do not conform to the patterns, in order to capture additional data to identify fraud, develop the learned pattern, lock down or otherwise prohibit access to resources, alert administratory devices, and/or the like disclosed herein. Further, among other things, the technical improvements provided by disclosed embodiments solve problems associated with adaptive systems and multiplicities of sensor data being extremely computing-resource intensive—which is especially problematic at scale when simultaneously hosting services for many user devices. While processing sensor-based data from a multiplicity of sensors is extremely computing-resource intense, disclosed embodiments with selective, multi-stage authentication can require significantly fewer computing resources than otherwise, reduce latency, and increase operational speed to provide faster access at scale to manifold endpoint devices. Such selective use of various sensor-based means of authentication can require significantly fewer resources to traverse user devices through a network of nodes while performing adaptive authentication operations as disclosed herein. As such, the disclosed solutions will more quickly and smoothly perform the specific operations, while the system will, especially from the perspective of multiple endpoints, operate significantly faster than otherwise. Various embodiments disclosed herein perform adaptive authentication based at least in part on a learned pattern of activity of the endpoint and sensor throttling/adjustment when detected endpoint activity does not conform to the pattern, in order to capture additional data to identify fraud and/or develop the learned pattern. Various embodiments disclosed herein perform adaptive authentication based at least in part on intelligent risk/authentication scoring of a particular endpoint that takes into account different detected phenomena and situations and weights those factors differently in order to accurately characterize the risk and need for enhanced authentication. Various embodiments disclosed herein perform adaptive authentication that is a function of a risk/authentication score and that performs appropriate multi-stage, multi-modal authentication depending on the authentication score. Various embodiments disclosed herein perform adaptive authentication at scale with multiplicities of endpoints, where multi-endpoint-based adaptive authentication detects a colocation situation of multiple endpoints and handles authentication based on the multiplicity. Such embodiments are described further in the following.

Figure 15:
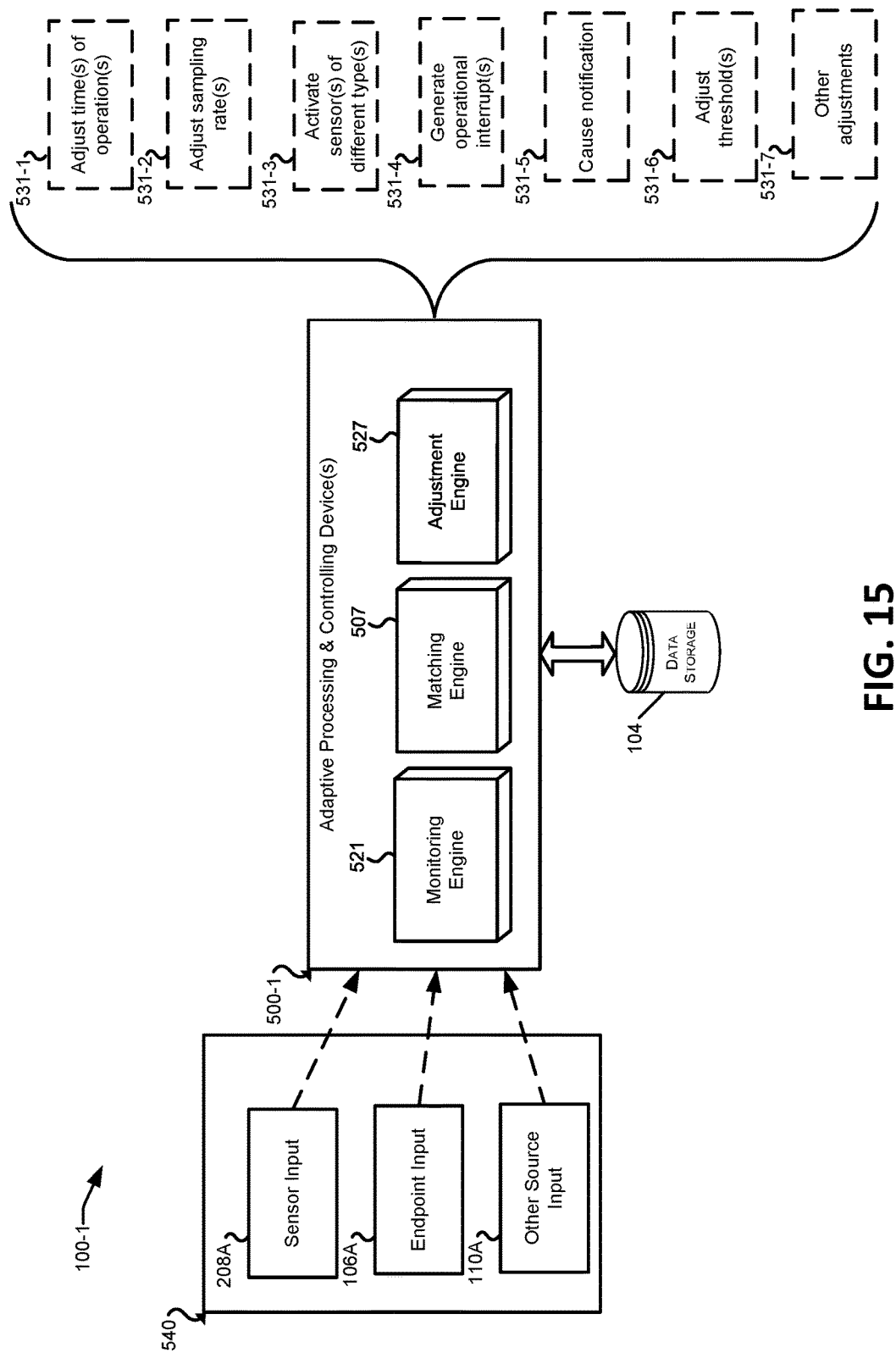
FIG. 15 illustrates a subsystem to facilitate adaptively securing a set of access operations with respect to one or more electronic resources, in accordance with embodiments of the present disclosure.

FIG. 15 illustrates a subsystem 100-1 to facilitate adaptively securing a set of access operations with respect to one or more electronic resources, in accordance with various embodiments of the present disclosure. While the subsystem 100-1 is illustrated as being composed of multiple components, it should be understood that the subsystem 100-1 may be broken into a greater number of components or collapsed into fewer components. Each component may include any one or combination of computerized hardware, software, and/or firmware. In various embodiments, the subsystem 100-1 includes one or more adaptive processing and controlling devices 500-1, which may be implemented with one or a combination of devices 102, 114, 116, 104, 106, 108, and/or 110 in various embodiments.

The one or more adaptive processing and controlling devices 500-1 (often referenced herein as one or more adaptive processing devices 500-1) may be configured to cause a number of adjustments in the subsystem 100-1 as disclosed herein. The one or more adaptive processing devices 500-1 may be communicatively coupled with interface components and communication channels (which may take various forms in various embodiments as disclosed herein) configured to receive authentication input 540. The authentication input 540 may include input from a plurality of different data sources. The technical improvements provided by the subsystem 100-1 over prior technologies include improvements in authentication accuracy and adaptability at least in part by machine-intelligent handling input from multiple different sources, including sensors, endpoints, and other source input in order to adapt to various particular technical environments in various distinct endpoints, as is disclosed further herein.

As depicted, the authentication input 540 may include sensor data 208A. The subsystem 100-1 may process sensor data 208A and analyze the sensor data 208A to provide for features disclosed further herein. The sensor data 208A may be captured by any or combination of the sensors/detectors 208 disclosed herein. The authentication input 540 may include endpoint device input 106A that may include input from one or more endpoint devices 106. The authentication input 540 may include other source input 110A, which could correspond to input from one or more other sources that may include input from an administrator device 110 and/or any suitable data source, which could be network-accessible. The one or more adaptive processing devices 500-1 may include a monitoring engine 521. The monitoring engine 521 may be configured to monitor the authentication input 540 for any suitable aspects pertaining to endpoints to facilitate improvements with individualization adaptation features disclosed herein. For example, the monitoring engine 521 may process information enabling identification of endpoints and individual states.

Figure 15A:
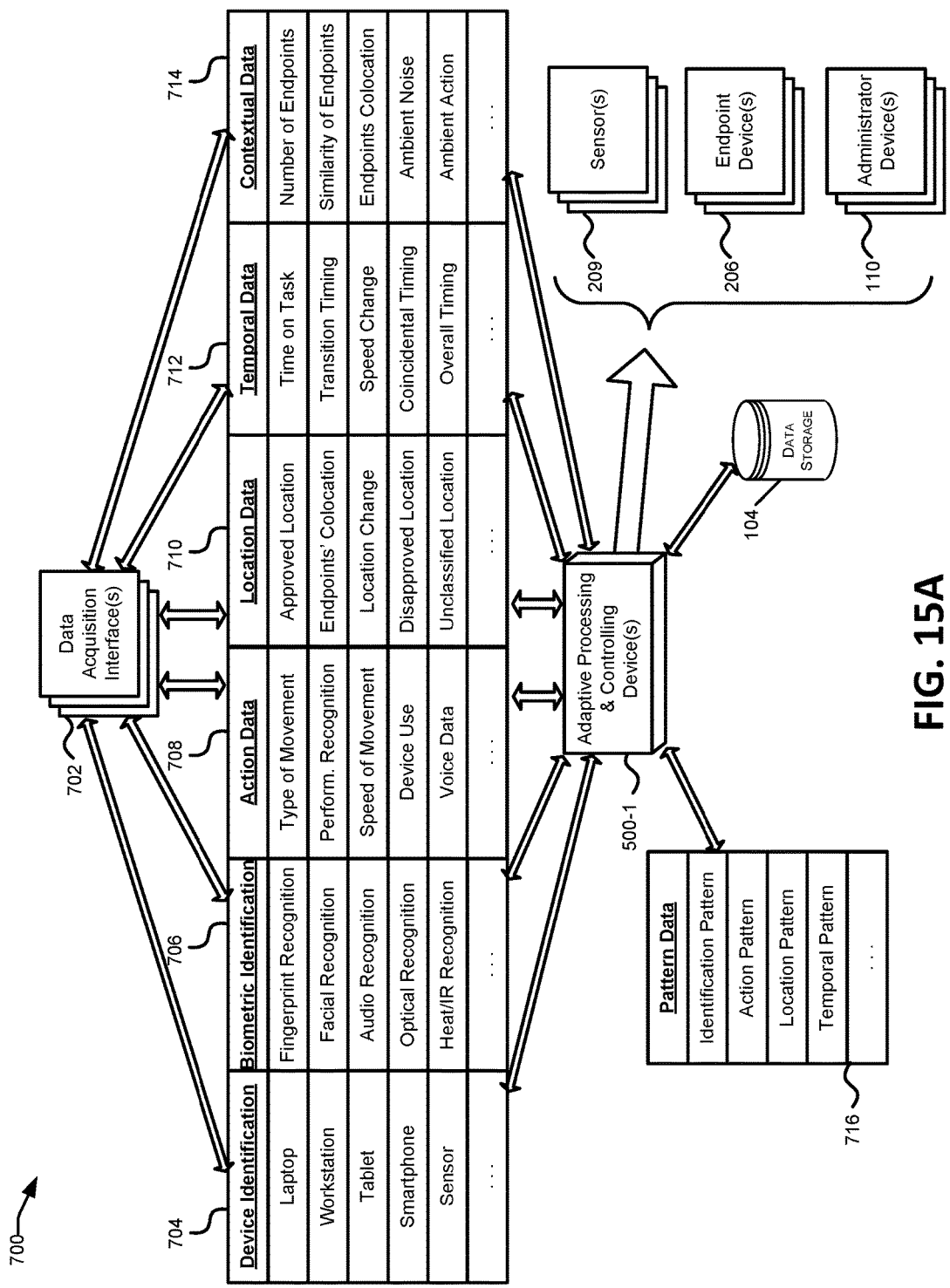
FIG. 15A illustrates certain aspects of adaptive data processing and control flow, in accordance with embodiments of the present disclosure.

FIG. 15A illustrates certain aspects of adaptive data processing and control flow 700, in accordance with various embodiments of the present disclosure. The one or more adaptive processing devices 500-1 may be configured to gather authentication input 540 as disclosed herein, and may gather the authentication input 540 via data acquisition interface(s) 702. In various embodiments, the authentication input 540 from the one or more data sources may be retrieved and/or received by the one or more adaptive processing devices 500-1 via the one or more data acquisition interface(s) 702, which may include interfaces of the one or more adaptive processing devices 500-1, components of the subsystem 100-1 and the system 100, and/or the like—through network(s) 120, through any suitable means for direct communication, and/or through any other suitable means of transferring data. According to disclosed embodiments, data pulled and/or pushed from the one or more data sources may be transformed and the transformed data and/or other data generated based thereon may be made available by the one or more adaptive processing devices 500-1.

In some embodiments, the one or more data acquisition interface(s) 702 may include one or more application programming interfaces (APIs) that define protocols and routines for interfacing with the data sources (e.g., sensors, computing devices, communication devices, wearable devices, remote data sources, and/or the like). The APIs may specify application programming interface (API) calls to/from data source components and/or systems. In some embodiments, the APIs may include a plug-in to integrate with an application of a data components and/or systems. The one or more data acquisition interfaces 702, in some embodiments, could use a number of API translation profiles configured to allow interface with the one or more additional applications of the data sources to access data (e.g., a database or other data store) of the data sources. The API translation profiles may translate the protocols and routines of the data source component and/or system to integrate at least temporarily with the system and allow communication with the system (one-way communication to the system and/or two-way communication with system in various embodiments) by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

The authentication input 540 may include device identification data 704, such as data to facilitate detection, recognition, and differentiation of any one or combination of types of endpoint devices and components. For instance, the device identification data 704 may include indicia of smart phones, tablets, wearable computing/communication devices, other computing devices, electronic wallets, electronic tokens, authentication codes (e.g., key codes entered with an input device), and/or the like. The authentication input 540 may include biometric identification data 706, such as any data to facilitate one or combination of fingerprint recognition, facial recognition, audio recognition, optical recognition, heat recognition, infrared recognition, and/or the like. The authentication input 540 may include action data 708, such as any data to facilitate detection, recognition, and differentiation of one or combination of types of movements, directions of movements, speeds of movements, device use, voice data, performance recognition, explicit user input, and/or the like. The authentication input 540 may include location data 710, such as any data to facilitate detection, recognition, and differentiation of one or combination of locations. For instance, the location data 710 may include data about approved locations of endpoint devices, colocations of endpoint devices, changes in locations of endpoint devices, and/or the like. The authentication input 540 may include temporal data 712, such as any data to facilitate detection, recognition, and differentiation of one or combination of temporal factors that may bear on, and enhance, authentication features disclosed herein. For instance, the temporal data 712 may include time of day data, time of week data, time of year data, time on task data, state-based timing data, transition timing data, and/or the like. The authentication input 540 may include contextual data 714, such as any data to facilitate detection, recognition, and differentiation of one or combination of contextual factors that may bear on, and enhance, authentication features disclosed herein. For instance, the contextual data 714 may include data about numbers of endpoint devices corresponding to a certain location and/or a certain set of operations, types of endpoint devices, endpoint colocations, ambient or baseline audio data, ambient or baseline video data, and/or the like.

The monitoring engine 521 of FIG. 15 may be configured to monitor device identification data 704, biometric identification data 706, action data 708, location data 710, temporal data 712, contextual data 714, and/or the like. The one or more adaptive processing devices 500-1 may include a matching engine 507 that may be an analysis engine. The matching engine 507 may be configured to perform any one or combination of features directed to matching or otherwise correlating information about endpoints, device identification data 704, biometric identification data 706, action data 708, location data 710, temporal data 712, contextual data 714, and/or the like. In some embodiments, the monitoring engine 521 and/or the matching engine 507 may facilitate one or more learning/training modes disclosed herein.

The monitoring engine 521 may gather and process authentication input 540 to facilitate creation, development, and/or use of endpoint specifications, including activity endpoint specifications, categories, and/or rules. The data may include any suitable data that may be captured to indicate, infer, and/or determine endpoint identification, actions, locations, temporal factors, contexts, and patterns for an endpoint. The captured data may be aggregated, consolidated, and transformed into endpoint specifications. For example, in some embodiments, the matching engine 507 may determine endpoint characteristics based at least in part on authentication input 540 received and processed by the monitoring engine 521. The matching engine 507 may define attributes of an endpoint sensed based at least in part on the individual characteristics. The technical improvements provided by the subsystem 100-1 include improvements in accuracy, speed, timeliness, adaptability, sensitivity, and responsiveness in authentication by way of adaptive authentication that is based at least in part on a learned endpoint patterns and causing real-time activation adjustments and enhanced authentication measures when endpoint attributes detected in real-time do not conform to the patterns, in order to capture additional data to identify fraud and/or develop the learned pattern, as disclosed further herein.

In various embodiments, the matching engine 507 may generate, develop, and/or otherwise use endpoint specifications, activity endpoint specifications, categories, and/or rules for endpoints sensed and/or for locations based at least in part on authentication input 540. The matching engine 507 may, for example, correlate items of device identification data 704, biometric identification data 706, action data 708, location data 710, temporal data 712, contextual data 714, and/or the like. The monitoring engine 521 may compile any one or combination of such data to create, based at least in part on machine-learning, pattern data that may include pattern particulars to facilitate detection, recognition, and differentiation of endpoint patterns based at least in part on device identification data 704, biometric identification data 706, action data 708, location data 710, temporal data 712, contextual data 714, and/or the like. The matching engine 507 may include a reasoning module to make logical inferences from a set of the detected and differentiated data to infer one or more patterns of activity for particular endpoints and/or for aspects in the proximity of the endpoint devices. For instance, the pattern data may include information about any one or combination of identification histories, action histories, location histories, temporal histories, and/or the like, any set of which may be used to derive one or more patterns of activity for particular endpoints and/or for aspects in the proximity of the endpoint devices. A pattern-based reasoner could be employed to use various statistical techniques in analyzing the data in order to make inferences based on the analysis of the different types of sensor data and performance data, both current and historical. A transitive reasoner may be employed to infer relationships from a set of relationships related to different types of sensor data and performance data.

The monitoring engine 521 and/or the matching engine 507 may employ an ongoing learning mode to confirm, correct, and/or refine determinations made for the endpoint specifications, including activity endpoint specifications, categories, and/or rules, for endpoints and proximate conditions sensed. For example, having come to one or more conclusions about endpoints and/or conditions sensed, the one or more adaptive processing devices 500-1 may confirm and/or correct the determinations with feedback loop features. Certain embodiments may provide the device 110 with feedback options to facilitate the ongoing learning mode. User-selectable options (e.g., via a device interface, voice recognition with a microphone communicatively coupled with the device 110, etc.) provided with notifications (e.g., push notifications to device 110 and/or the like) could be provided to allow administrative confirmation or correction of conditions detected. The feedback could be used for training the system to heuristically adapt conclusions, endpoint specifications, correlations, attributes, triggers, patterns, and/or the like.

Each endpoint specification may be unique and may include baseline attributes for activity endpoint specifications, categories, and/or rules attributed to a particular endpoint. Subsequently detected data may be used, in conjunction with previously detected data, to adjust an endpoint specification for the particular endpoint. For example, baseline detected biometric data, action data, location data, temporal data, and/or contextual data may be attributed to, and/or used to refine attributes for, the endpoint with an initialization process, and one or more subsequent detections may be compared to the baseline readings and/or attributes to determine changes between the baselines and the subsequent readings and/or attributes. Such differences may be used to develop the endpoint specification for the particular endpoint.

Having endpoint specification which include distinctive characteristics and attributes of each endpoint, the matching engine 507 may individually distinguish each endpoint, actions of the endpoint, locations corresponding to the actions, temporal aspects corresponding to the actions, and contexts corresponding to the action of the endpoint when the monitoring engine 521 receives and processes data corresponding to the endpoint. The matching engine 507 may correlate captured device identification data and/or biometric identification data to previously captured and stored device identification data and/or biometric identification data in order to identify an endpoint. The matching engine 507 may be configured to match information for an endpoint captured via the monitoring engine 521 to one or more patterns from a set of patterns. In some embodiments, the matching engine 507 can receive sensor data corresponding to one or more endpoints, identify attributes of the one or more endpoints based at least in part on the sensor data, and match the one or more endpoints to one or more patterns from a patterns information repository. Any suitable category may be employed to facilitate adjustment features in accordance various embodiments. Certain patterns disclosed herein may correspond to characterizations of endpoints.

The matching engine 507 could use facial recognition to match data for an endpoint to image data retained by the system (e.g., in the endpoint specifications) to determine whether a sensed endpoint is known or a new endpoint. Captured endpoint image data may be correlated to reference images using any suitable facial trait qualifications for correlation. The matching engine 507 may link particular endpoint image data to endpoint specifications with image data associated with endpoints, to identify a known endpoint or a new endpoint (e.g., based at least in part on satisfying one or more thresholds that may correspond to a tolerance range of the extent of matching characteristics, in some embodiments). In various embodiments, the matching engine 507 may match (e.g., based at least in part on satisfying one or more thresholds that may correspond to a tolerance range of the extent of matching characteristics, in some embodiments) any one or combination of types of device identification data, biometric identification data, action data, location data, temporal data, contextual data, and/or pattern data to determine and identify a status of an endpoint and/or to cause authentication control in view of a particular endpoint.

The matching engine 507 may be configured to match information for input 540 captured via the monitoring engine 521 to one or more categories from a set of categories. Some embodiments may qualify captured data according to a graduated identification scale. Any suitable authentication scale may be used in various embodiments. In some embodiments, an authentication scale could entail a categorization scheme, with categories such as strong authentication of a particular endpoint, possible authentication of a particular endpoint, weak authentication of a particular endpoint, and an unknown endpoint, or any suitable categories such as other categories disclosed herein.

The rules may include authentication criteria for matching a set of indicia of endpoint state to a set of one or more categories. In some embodiments, the rules may include criteria for matching captured data corresponding to a detected endpoint to one or more operational settings of one or more sensors. In some embodiments, the rules may include one or more arbitration rules for handling situations of multiple endpoints.

The technical improvements provided by the subsystem 100-1 include improvements in accuracy, speed, timeliness, adaptability, sensitivity, and responsiveness in machine authentication based at least in part on adaptive authentication that is a function of machine-generated authentication scores and that performs appropriate multi-stage, multi-modal authentication in real-time depending on the authentication scores. This can include multi-stage, multi-modal authentication where multiple stages of authentication with different types of sensors (e.g., image-based, audio, keystroke) are intelligently triggered in different ways as a function of the authentication score. The one or more adaptive processing devices 500-1 may include an adjustment engine 527 which may be configured to cause one or more adjustments of authentication control components. The adjustment engine 527 may analyze input monitored by the monitoring engine 521, determinations of the matching engine 507, and/or information stored in the one or more data storages 104 to make adjustment determinations. Based at least in part on one or more adjustment determinations, the adjustment engine 527 may cause activation of one or more adjustment actions of the authentication control components. As disclosed further herein, activation adjustments 531 may include adjusting one or more times of one or more operations of one or more sensors 209, adjusting one or more sampling rates of one or more sensors 209, activating one or more sensors 209 of one or more different types, generating one or more operational interrupts to interrupt operations of an endpoint device, cause one or more notifications to an administrative device, adjust one or more thresholds for endpoint characterization and/or triggering authentication adjustments, and other adjustments disclosed herein.

Figure 15B:
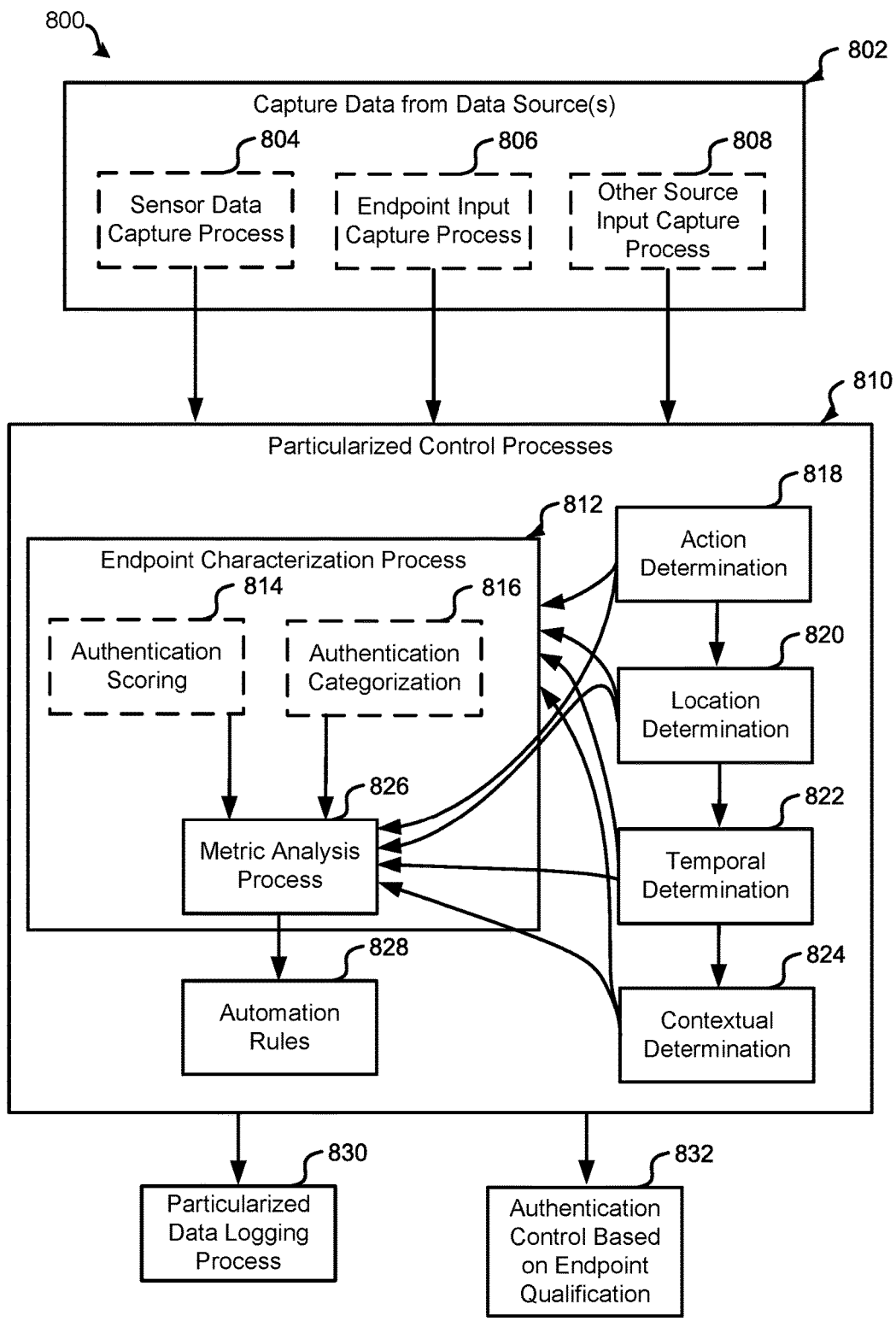
FIG. 15B depicts certain aspects of a method to adaptively secure a set of access operations with respect to one or more electronic resources via authentication control based at least in part on individualized authentication protocol, in accordance with embodiments of the present disclosure.

FIG. 15B depicts certain aspects of a method 800 to adaptively secure a set of access operations with respect to one or more electronic resources via authentication control based at least in part on individualized authentication protocol, in accordance with embodiments of the present disclosure. FIG. 15B and the subsequent figures depict various aspects of methods to adaptively secure a set of access operations with respect to one or more electronic resources (e.g., as part of machine-facilitated development and/or testing), in accordance with embodiments of the present disclosure. In various embodiments, one or a combination of the aspects of the methods may be performed in whole or in part by the adaptive authentication system 100. For example, the subsystem 100-1, with the one or more adaptive processing devices 500-1, may be configured to perform one or a combination of the aspects of the methods. One or more non-transitory, computer-readable storage media may store instructions which, when executed by the one or more adaptive processing devices 500-1, cause the one or more adaptive processing devices 500-1 to perform any one or combination of operations of the methods. It is noted that the methods may include additional operations, and that one or more of the operations disclosed herein may be rearranged, omitted, and/or modified to include other operations and/or features described in this disclosure.

The technical improvements provided by the subsystem 100-1 include improvements in accuracy, speed, and adaptability in authentication by way of adaptive authentication that is based at least in part on machine-intelligent authentication scoring of particular endpoints that takes into account different detected phenomena and situations (e.g., multiple endpoints, a different endpoints, multiple voices, a different voice, static images, drastic change in performance, performance style, low-quality sensor data, non-functional sensor, etc.) and weights those factors differently in order to accurately characterize authentication integrity and need the for enhanced authentication. As indicated by block 802, one or more sets of data may be captured from one or more data sources. In disclosed embodiments, different types of data may be captured from a variety of different data sources. As indicated by block 804, sensor data may be captured from one or more sensors 209. The sensors 209 could be disposed in and/or about the location 107, as disclosed herein. For example, the one or more sensors 209 may include any one or combination of sensors, detectors, controllers, and/or other devices associated with any one or combination of components disclosed herein. In disclosed embodiments, the sensor data may correspond to endpoint input. As indicated by block 806, endpoint input may be captured. As indicated by block 808, other input from one or more other data sources may be captured.

As indicated by block 810, one or more particularized control processes may be based at least in part on the one or more sets of data may be captured from one or more data sources. The particularized control processes 810 may include one or more endpoint authentication processes 812. The particularized control processes may include processes for action determination 818, location determination 820, temporal determination 822, and/or contextual determination 824. In some embodiments, any one or combination of such determinations may be utilized in the particular authentication process 812 to assess an endpoint sensed. For example, determined actions 708, locations 710, temporal factors 712, and/or contextual factors 714 of an endpoint may be compared to corresponding patterns 716 that may have been previously determined for particular endpoints to determine to what extent the detected indicia match the patterns. In some embodiments, such pattern-based analysis may be implemented as a supplement to identification process 812.

As indicated by block 812, having captured data, the control system may implement one or more endpoint characterization processes. The one or more endpoint characterization processes 812 may include one or more metric analysis processes 826 to determine an identity of an endpoint sensed and assess an integrity of the endpoint and a level of certainty with which the endpoint is authenticated. Further, the one or more endpoint characterization processes 812 may include one or more metric analysis processes 826 to determine one or more authentication rules 828 based at least in part on one or more sets of captured data 802. The one or more endpoint authentication processes 812 may determine the one or more authentication rules 828 based at least in part on determined actions 708, locations 710, temporal factors 712, contextual factors 714 and/or corresponding patterns 716 attributed to an identified endpoint. Such factors may be taken into account with results from current processes (i.e., in real time along with an endpoint currently being sensed) and past processes (i.e., the results of which have been previously logged 830 and stored in an authentication data store 104 in association with the endpoint's specification) of action determination 818, location determination 820, temporal determination 822, and/or contextual determination 824. Accordingly, in various instances, authentication processes 812 may yield an authentication score of an endpoint sensed and/or automation rules 828 for handling an insufficiently authenticated endpoint and/or a sufficiently authenticated endpoint, and, consequently, the subsystem may cause authentication control operations based at least in part on the endpoint qualification. The authentication control operations as a function of the authentication score may include one or combination of the activation adjustments 531 disclosed further herein.

Authentication data can be consolidated and processed to yield an authentication score. Any one or combination of types of authentication data may be captured and qualified. Some embodiments may qualify an endpoint according to a graduated authentication scale. Any suitable authentication scale may be used in various embodiments. In some embodiments, an authentication scale could entail a categorization scheme 816, with categories such as strong authentication of a particular endpoint, possible authentication of a particular endpoint, weak authentication of a particular endpoint, and an unknown endpoint, or any suitable categories such as other categories disclosed herein.

In disclosed embodiments, an authentication scale could entail an authentication scoring system 814. The authentication scoring system 814 could be correlated to the category scheme in some embodiments, such that certain scores correspond to certain categories. Some embodiments may score an endpoint with a numerical expression, for example, an authentication score. For example, in some embodiments, an authentication score may be an assessment of a certainty with which the system identifies an endpoint, characterizes integrity of the endpoint, and authenticates the endpoint, taking into account a number of factors, each of which may be weighted differently. By way of example without limitation, an authentication scale could include a range of authentication scores from 0 to 100, or from 0 to 1,000, with the high end of the scale indicating greater probability. Some embodiments may use methods of statistical analysis to derive an authentication score. Various embodiments may determine an authentication score based on any one or more suitable quantifiers. An authentication score may be based at least in part on the extent to which detected characteristics of the captured data match previously determined characteristics stored in the endpoint specifications. In some embodiments, an authentication score may be cumulative of endpoint scores based on matching each type of the characteristics. With an authentication score determined, categorizations may be made based on the score. By way of example without limitation, a score correlated to a 75-100% band may be deemed a positive authentication of an endpoint; a score correlated to a 70-75% band may be deemed a possible authentication of an endpoint with some indicia of questionable physical, behavioral, and/or interaction attributes; a score correlated to a 25-50% band may be deemed a weak authentication of an endpoint with more indicia of questionable or suspicious physical, behavioral, and/or interaction attributes; a score below a 25% minimum threshold may be deemed a weak/insufficient authentication of an endpoint with even more indicia of questionable or suspicious physical, behavioral, and/or interaction attributes; and score of zero may correspond to an unknown, unauthenticated, and/or highly suspicious endpoint.

In some embodiments, a similar scoring scheme may be used to derive patterns of activity and corresponding automation rules. For example, a similar scoring scheme may be used to determine one or more extents to which monitored sets of actions, locations, times, and/or contexts match other sets of actions, locations, times, and/or contexts for an endpoint. By way of example without limitation, a score correlated to a 75-100% band may be deemed a positive match; a score correlated to a 50-75% band may be deemed a possible match with possible deviation; a score correlated to a 25-50% band may be deemed a weak match with significant deviation; a score below a 25% minimum threshold may be deemed a weak/insufficient match with substantial deviation; and score of zero may be deemed to have no correspondence.

Video data and/or other types of sensor data (e.g., heat/IR, etc.) may be analyzed to recognize patterns and thereby establish baselines with respect to the endpoint device and to further identify deviations with respect to the endpoint device. For example, video data may be analyzed to recognize the particular endpoint and to further identify deviations with respect to the recognized endpoint. When facial recognition is used to authenticate an endpoint via one authentication stage, subsequent stages of authentication may be implemented to confirm no deviations from the recognized endpoint. One deviation may correspond to a changed or additional endpoint such that a different endpoint is detected at the endpoint device. The different endpoint may or may not be recognized, but the lack of correspondence to the previously authenticated endpoint may be determined with the one or more subsequent stages of authentication and may correspond to a complete mismatch, which may be scored accordingly. Consequently, the subsystem may cause authentication control 832 to initiate activation adjustments 531 such as one or more additional authentication stages, prohibit access via the endpoint device, and/or to otherwise cause notification of the deviation, depending on the authentication score, the score thresholds that are satisfied by the authentication score, and the authentication control 832 triggered by the respective threshold being satisfied.

As another example, video and/or other types of sensor data (e.g., heat/IR, etc.) may be analyzed to recognize the general form and/or patterns of movement of an endpoint. With such patterns created, subsequent stages of authentication may be implemented to confirm no deviations from the recognized general endpoint form and/or patterns of endpoint movement, which may be distinguished from ambient action (e.g., baselines for movement of others and objects in the background). Such deviations may correspond to types of movements, such as an endpoint moving away from an endpoint device (e.g., leaving an approved location in the proximate area about the endpoint device to a disapproved or unclassified location, leaning away from the endpoint device, moving out of a range of a sensor, etc.), a changed endpoint such that a different endpoint is detected at the endpoint device, deviations in gaze (e.g., repetitively gazing downward or to the side), recognition of an additional device, a static image inserted in front of a camera, a repetitive video loop, other lack of variability in captured images, a static image in front of a changing background, and/or the like. Such deviations may lower authentication scores to varying extents, based on which, the subsystem may cause authentication control 832 to initiate activation adjustments 531 such as one or more additional authentication stages, prohibit access via the endpoint device, and/or to otherwise cause notification of the deviations.

Another related deviation may correspond to the detection of multiple endpoints at the single endpoint device. For example, while the initially authenticated endpoint may be detected as continuing access via the endpoint device, an additional endpoint may also be detected. The recognition of the additional endpoint, not having been authenticated with respect to the particular endpoint device, may be determined with the one or more subsequent stages of authentication and may correspond to a lower authentication score. Again, as a consequence, the subsystem may cause authentication control 832 to initiate activation adjustments 531 such as one or more additional authentication stages, prohibit access via the endpoint device, and/or to otherwise cause notification of the deviation, depending on the authentication score and score thresholds.

Similarly, audio data may be analyzed to recognize audio patterns and thereby establish audio baselines with respect to the endpoint device and to further identify deviations with respect to the endpoint device. The audio pattern analysis may identify tonal, pitch, and volume characteristics; keywords and corresponding language used; cadence, pauses, and accents; ambient noise; and/or the like as distinctive markings and could compile the audio pattern characteristics for the purposes of endpoint characterization. When such audio pattern recognition is used as at least part of one authentication stage, subsequent stages of authentication may be implemented to confirm no deviations from the audio pattern with respect to one or more of the audio characteristics of the audio pattern. Again, one deviation may correspond to a changed endpoint such that one or more different endpoints are detected at the endpoint device via audio detection of one or more different voices. The different endpoint may or may not be recognized, but the lack of correspondence to the previously detected audio pattern may be determined with the one or more subsequent stages of authentication and may correspond to a complete mismatch or a partial mismatch that may correspond to an additional endpoint being potentially detected at the endpoint device. In some embodiments, audio recognition may not be used to authenticate an endpoint via a first-stage authentication process, where other types of sensor input is used for authentication in the first-stage authentication process. However, audio recognition may be used with subsequent stages of authentication to recognize audio patterns and detect deviations therefrom, lower authentication scores, and then cause authentication control 832 to initiate activation adjustments 531 as disclosed herein.

Further, other types of action data in conjunction with temporal data may be analyzed to recognize patterns and subsequent deviations for providing inputs, such as typing patterns, mouse click patterns, typing speed, words used, words not used by the endpoint, typing speed, which typing speed can be either a general typing speed or a typing speed for one or several words, synonym pairs that include a used and a non-used word, vocabulary, omitted words, correctly spelled words, misspellings, other performance attributes, time on task, overall speed completing a set of tasks, and/or the like. As with other deviations detected, when one or more of the various deviations from action data patterns are detected, authentication scores may be lowered depending on the various weights according to the various factors and extents of deviations and authentication control 832 to initiate activation adjustments 531 may be triggered when score thresholds are met.

In like manner, other types of temporal data in conjunction with contextual data may be analyzed to recognize patterns with respect to a plurality of colocated endpoint devices. Location data for the endpoint devices may be gathered using GPS coordinates, cellular tower triangulation techniques, Wi-Fi-based location information, carrier-provided location information, and/or other location determination systems to identify a location of the endpoint devices. Such data may be analyzed to recognize colocation of endpoint devices and movement of endpoint devices (e.g., within an approved location, from approved location to a disapproved or unclassified location, etc.). With the identification of colocated endpoint devices, time on task, timing of transitions between tasks, and/or the like and be analyzed to detect patterns of coincidental timing with respect to such temporal metrics. The patterns of coincidental timing may be deemed questionable or suspicious activity, thereby lowering authentication scores to an extent. In addition, similarity of the colocated endpoint devices may be taken into account. For example, if the operations of the colocated endpoint devices are similar or the same, greater weight may be according to the coincidental timing detected so that the authentication scores are lowered to a greater extent. In some such cases is these, it is not a deviation detected but rather a detected correlation that may lower authentication scores according to various weights according to the various factors and extents of correlations, with authentication control 832 to initiate activation adjustments 531 being triggered when score thresholds are met.

The criteria for qualifying endpoints may specify rules and thresholds for various types of authentication data. For example, criteria for qualifying endpoints may specify rules and thresholds based at least in part on any one or combination of device authentication data 704, biometric authentication data 706, action data 708, location data 710, temporal data 712, contextual data 714, and/or pattern data 716. For example, device authentication data 704 and/or biometric authentication data 706 of an endpoint may be compared to previously stored device authentication data and/or biometric authentication data to determine to what extent the device authentication data 704 and/or biometric authentication data 706 can be authenticated. For example, biometric data 706 may be considered as more reliable authentication data than device authentication data 704, and, as such, detected biometric data 706 may increase the authentication score more than detected device authentication data 704 would increase the authentication score. Various endpoints may be associated with various collections of devices, device identifiers, and other device authentication data 704. When the system detects device authentication data, say a MAC address of computing device associated with a particular endpoint or a device having a valid WiFi password, the system may take that data as an indication of identity of the endpoint having that device data stored in the endpoint's specification. However, in some embodiments, the system may not deem an authentication of the device alone as dispositive of endpoint's identity and may seek further evidence of the identity of the endpoint.

Even within a category of authentication input 540, the various means of authentication may be correlated to different probabilities and may be weighted differently to affect authentication scores differently. For example, with respect to biometric data 706, fingerprint authentication data, received via a fingerprint scanner of the system, matching previously recorded fingerprint data for an endpoint could be weighted more heavily to lead to very high authentication score (absent other factors decreasing the score), whereas a heat recognition data, received via a heat sensor of the system, could be weighted less heavily to be correlated to a comparatively lower authentication score. Likewise, with respect to action data 708, voice recognition could be weighted more heavily to contribute to a higher authentication score than performance attribute pattern recognition (absent other factors affecting the score).

Accordingly, in various embodiments, the authentication process 812 may be based at least in part on any one or combination of action determination 818, location determination 820, temporal determination 822, and/or contextual determination 824. The authentication process 812 may employ a protocol order, such as a decision tree, checklist, workflow, and/or the like to capture various aspects of data and assess those aspects to infer endpoint integrity qualification. Such a decision tree, checklist, and/or workflow may incorporate any one or combination of the depicted aspects and/or similar aspects in any desired order, according to various embodiments. For example, biometric data 706 may be considered as more reliable authentication data than some action data 708. As a consequence, the protocol order may include first checking for and processing any available biometric data 706 in one stage of authentication before checking for and processing any available action data 708 in a subsequent stage of authentication.

In some embodiments, pattern-based analysis may be implemented as a check on the authentication process 812 in one or more subsequent stages of authentication that serves to confirm that the endpoint acts in conformity with what is expected for the endpoint identified with one or more previous stage of authentication of the authentication process 812. For example, for a weakly identified endpoint, the subsystem may prompt further authentication via a different type of sensor data. In some cases, the subsystem may cause one or more endpoint notifications (push notifications, automated system voice announcements, pop-ups on an endpoint interface communicatively coupled with the system, emails, automated phone calls, alarms, etc.) to be directed to one or more authenticated endpoints, devices, and/or accounts based at least in part on data retained in the endpoint specification, and the subsystem may require additional authentication, which could be captured consequent to the one or more endpoint notifications. In addition or in alternative, the subsystem may monitor an initially authenticated endpoint for consistencies and/or inconsistencies with pre-determined pattern(s) associated with that endpoint, where inconsistencies may trigger one or more additional authentication adjustments.

Figure 16:
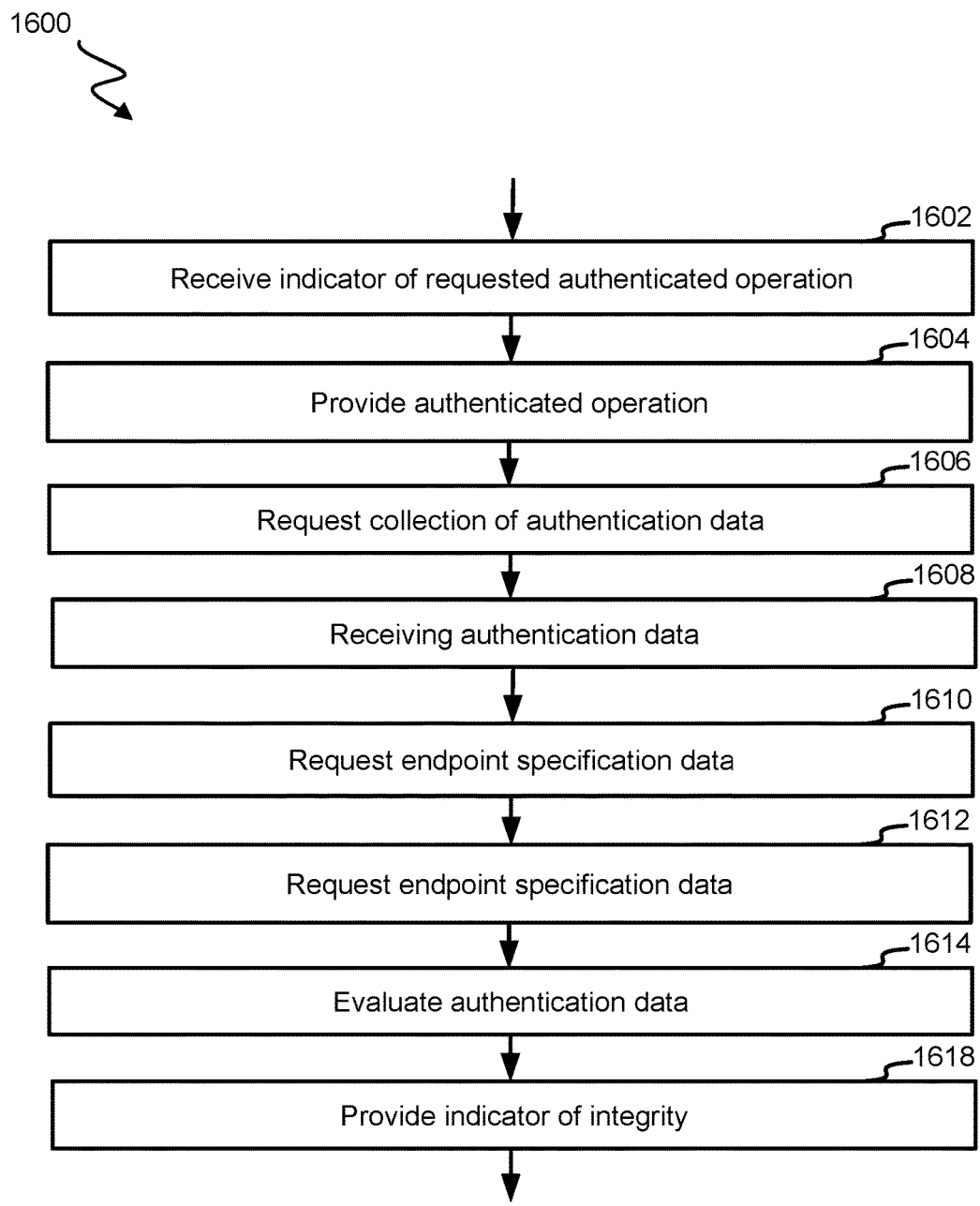
FIG. 16 depicts certain aspects of a method for protection of authentication integrity, in accordance with embodiments of the present disclosure.

With reference now to FIG. 16, a flowchart illustrating an embodiment of a process 1600 for protection of authentication integrity is shown. The process 1600 may begin at block 1602 wherein an indicator of a requested authenticated operation is received. In some embodiments, for example, the indicator of the requested authenticated operation can be received by the one or more adaptive processing devices 500-1 of the adaptive authentication system 100. In some embodiments, for example, the indicator of the request authenticated operation can be received from one of the endpoint devices 106. In some embodiments, for example, the indicator of the requested authenticated operation can be received from one or more of the servers of system 100.

After the indicator of the requested authenticated operation has been received, the process 1600 may proceed to block 1604 wherein the authenticated operation is provided. In some embodiments, for example, the authenticated operation can be provided to one of the endpoint devices 106, and the authenticated operation can be provided by one of the components of the adaptive authentication system 100 such as, for example, one or more of the servers of system 100.

After the authenticated operation has been provided, the process 1600 may proceed to block 1606 wherein the capture of authentication data is requested. In some embodiments, for example, authentication integrity verification can be provided in connection with an authenticated operation. In some embodiments, for example, an authenticated operation may be associated with the request for authentication integrity verification. Thus, in one embodiment, an authenticated operation can be associated with an indicator of requested authentication integrity verification. If authentication integrity verification is requested, then the adaptive authentication system requests the capture of the authentication data. In some embodiments, for example, the authentication data can be collected by the components of the adaptive authentication system 100 such as, for example, one of the endpoint devices 106 and/or a camera 209 of the one or more sensors 209. In some embodiments, for example, the request for the capture of authentication data can include, for example, a request for the camera 209 to collect image data of the actual endpoint performing the authenticated operation.

After the request for the capture of authentication data, the process 1600 may proceed to block 1608 wherein the authentication data is received. In some embodiments, for example, authentication data can be received by one or more of the components of the adaptive authentication system 100 such as, for example, the one or more adaptive processing devices 500-1, one or more of the endpoint devices 106, or one of the data storages 104, and in some embodiments, the authentication data can be received by the verification engine 208-1 of the endpoint device 106.

After the authentication data has been received, the process 1600 may proceed to block 1610 wherein the endpoint specification data is requested. In some embodiments, for example, the endpoint specification data can be requested by one of the components of the adaptive authentication system 100 such as, for example, one or more adaptive processing devices 500-1 and/or one or more of the endpoint devices 106. In some embodiments, for example, the endpoint specification data can be requested by the verification engine 208-1 of one or more of the endpoint devices 106. In some embodiments, the endpoint specification data can be requested from one of the data storages 104, such as the endpoint specification data storage 301.

After the endpoint specification data has been requested, the process 1600 may proceed to block 1612 wherein the endpoint specification data is received. In some embodiments, for example, the endpoint specification data can be received by a component of the adaptive authentication system 100 such as, for example, the one or more adaptive processing devices 500-1, one or more of the endpoint devices, and/or one of the components of one or more of the endpoint devices 106 such as, for example, the verification engine 208-1.

After the endpoint specification data has been received, the process 1600 may proceed to block 1614 wherein the authentication data is evaluated. In some embodiments, for example, the authentication data can be evaluated by comparing the received authentication data to receive endpoint specification data. In some embodiments, for example, the comparison of the authentication data to the endpoint specification data can include determining the likelihood that the actual endpoint is the provisional endpoint. In some embodiments, in which the authentication data includes one or several photographs, the evaluation of the authentication data can include an evaluation of clothing worn by the actual endpoint, the location surrounding the actual endpoint, or the like. In one embodiment, for example, a discrepancy in the clothing style or location between the authentication data and the endpoint specification data may indicate that the actual endpoint is not the provisional endpoint. In some embodiments, for example, the evaluation of the authentication data can be performed by a component of the adaptive authentication system 100 such as, for example, the one or more adaptive processing devices 500-1, one or more of the endpoint devices 106, and/or a component of one or more of the endpoint devices 106 such as, for example, the verification engine 208-1.

After the authentication data has been evaluated, the process 1600 may proceed to block 1616 wherein an indicator of authentication integrity is provided. In some embodiments, for example, an indicator of authentication integrity can be provided to one of the data storages 104, such as the endpoint specification data storage 301, authentication data storage 312, and/or verification data storage 313. In some embodiments, for example, the indicator of authentication integrity can be provided to an endpoint via the endpoint device 106 and/or to one or more of the servers of system 100.

Figure 17:
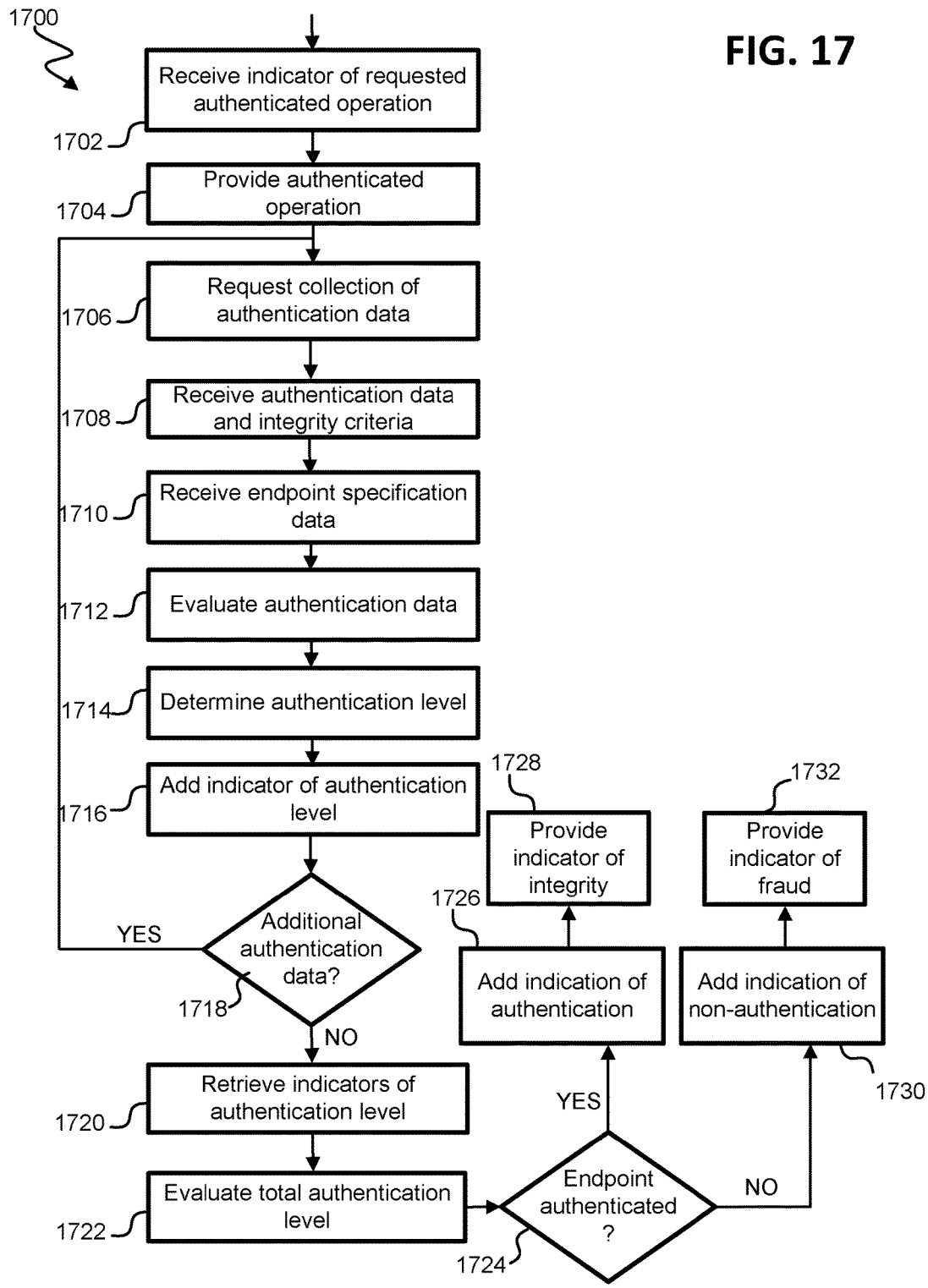
FIG. 17 depicts certain aspects of a method for authenticating an endpoint, in accordance with embodiments of the present disclosure.

With reference now to FIG. 17, a flowchart illustrating an embodiment of a process 1700 for authenticating an endpoint is provided. The process 1700 may begin at block 1702 wherein an indicator of a requested authenticated operation is received. In some embodiments, for example, the indicator the requested authenticated operation can be received by the one or more adaptive processing devices 500-1 of the adaptive authentication system 100. In some embodiments, for example, the indicator of the request authenticated operation can be received from one of the endpoint devices 106. In some embodiments, for example, the indicator of the requested authenticated operation can be received from one or more of the servers of system 100.

After the indicator of the requested authenticated operation has been received, the process 1700 may proceed to block 1704 wherein the authenticated operation is provided. In some embodiments, for example, the authenticated operation can be provided to one of the endpoint devices 106, and the authenticated operation can be provided by one of the components of the adaptive authentication system 100 such as, for example, one or more of the servers of system 100.

After the authenticated operation has been provided, the process 1700 may proceed to block 1706 wherein the capture of authentication data is requested. In some embodiments, for example, authentication integrity verification can be provided in connection with an authenticated operation. In some embodiments, for example, an authenticated operation may be associated with the request for authentication integrity verification. Thus, in one embodiment, an authenticated operation can be associated with an indicator of desired authentication integrity verification. If authentication integrity verification is requested, then the adaptive authentication system requests the capture of the authentication data. In some embodiments, for example, the authentication data can be collected by the components of the adaptive authentication system 100 such as, for example, one of the endpoint devices 106 and/or the camera 209. In some embodiments, for example, the request for the capture of authentication data can include, for example, a request for the camera 209 to collect image data of the actual endpoint performing the authenticated operation.

After the request for the capture of authentication data, the process 1700 may proceed to block 1708 wherein the authentication data and integrity criteria are received. In some embodiments, for example, the authentication data and integrity criteria can be received by one or more of the components of the adaptive authentication system 100 such as, for example, the one or more adaptive processing devices 500-1, one or more of the endpoint devices 106, or one of the data storages 104, and in some embodiments, the authentication data can be received by the verification engine 208-1 of the endpoint device 106. In some embodiments, for example, the authentication data can be received from, for example, a component of the adaptive authentication system 100 such as, for example, the endpoint interface 207 of the endpoint device 106 and/or the camera 209. In some embodiments, for example, the integrity criteria can be received from one of the databases such as, for example, the verification database. In some embodiments, for example, the integrity criteria can comprise one or several thresholds. These thresholds can delineate the circumstances in which an actual endpoint is identified as being the provisional endpoint and in which an actual endpoint is identified as not being the provisional endpoint.

After the authentication data and integrity criteria are received, the process 1700 may proceed to block 1710 wherein the endpoint specification data is received. In some embodiments, for example, block 1710 can include the request for endpoint specification data as well as the receipt of endpoint specification data. In some embodiments, for example, the endpoint specification data can be requested from one or more of the components of the adaptive authentication system 100 such as, for example, the endpoint specification data storage 301. In some embodiments, for example, endpoint specification data can be received by a component of the adaptive authentication system 100 such as, for example, the one or more adaptive processing devices 500-1, one or more of the endpoint devices, and/or one of the components of one or more of the endpoint devices 106 such as, for example, the verification engine 208-1.

After the endpoint specification data has been received, the process 1700 may proceed to block 1712 wherein the authentication data is evaluated. In some embodiments, for example, the authentication data can be evaluated by comparing the received authentication data to received endpoint specification data. In some embodiments, for example, the comparison of the authentication data to the endpoint specification data can include determining the likelihood that the actual endpoint is the provisional endpoint. In some embodiments, for example, the evaluation of the authentication data can be performed by a component of the adaptive authentication system 100 such as, for example, the one or more adaptive processing devices 500-1, one or more of the endpoint devices 106, and/or a component of one or more of the endpoint devices 106 such as, for example, the verification engine 208-1.

After the authentication data has been evaluated, the process 1700 may proceed to block 1714 wherein an authentication level is determined. In some embodiments, for example, the determination of the authentication level can include the generation of an authentication score. As disclosed herein, this score can reflect the likelihood that an provisional endpoint is the actual endpoint. In some embodiments, for example, this score can be based on the similarities and differences between the endpoint specification data and the authentication data. The score can be generated and the authentication level can be determined by a component of the integrity system such as, for example, the one or more adaptive processing devices 500-1, one or more of the endpoint devices 106, and/or the verification engine 208-1 of one or more of the endpoint devices 106.

After the authentication level has been determined, the process 1700 may proceed to block 1716 wherein an indicator of the authentication level is added. In some embodiments, for example, the indicator of the authentication level can be added to, for example, one of the data storages 104 such as, for example, the endpoint specification data storage 301, the authentication data storage 312, and/or the verification data storage 313. After the indicator of the authentication level has been added, the process 1700 may proceed to decision state 1718 wherein it is determined if there is additional authentication data. The determination of whether there is additional authentication data can be made to determine how many types of authentication data to use in authenticating the actual endpoint.

The authentication data and endpoint specification data can be of one or several types. In some embodiments, for example, these types can be defined by the aspect of the actual and/or provisional endpoint that they characterize. Thus, for example, in some embodiments, these types may include data relating to a physical attribute, data relating to a performance attribute, and/or data relating to an interaction. Similarly, each of these types can be further divided into subtypes. In some embodiments, for example, the data type can correspond to one or several grouped data aspects that are useful in identifying the actual endpoint. In some embodiments, these types can be associated with a value indicative of a likelihood of the type of authentication data being used to successfully identify the actual endpoint.

In some embodiments, the identification and/or authentication of the actual endpoint can be based on one or more of these types. Thus, for example, in some embodiments the identity of the actual endpoint can be determined by comparing a physical characteristic of the actual endpoint with physical characteristics of the provisional endpoint stored in the endpoint specification data, and in some embodiments the identity of the actual endpoint can be determined by comparing nonphysical characteristics such as, for example, the performance attribute of the actual endpoint with performance attributes of the provisional endpoint stored in the endpoint specification data. Thus, the identity of the actual endpoint can be determined, using different types of authentication data. In some embodiments, for example, multiple types of authentication data can be used in identifying the actual endpoint. In such an embodiment, for example a physical attribute and a performance attribute of the actual endpoint can be compared with the physical attribute and a performance attribute of the provisional endpoint stored in the endpoint specification data. In some embodiments, the authentication data can be used to determine if another, in addition to the actual endpoint, is involved in and/or present during the completion of the authenticated operation. In some embodiments, this can be determined by the presence of another in one or several photographs or video segments, by the detection of a second voice or sounds from another via a microphone, and/or the detection of one or several behaviors indicative of communication such as, for example, repeated looking in a certain direction, hand gestures, facial expressions, body language, the combination of repeated looking in a certain direction and one or more of hand gestures, facial expressions, and body language, or the like.

In some embodiments, one or more of the components of the adaptive authentication system 100 can be used to determine if there is an additional authentication data. In some embodiments, this determination can include identifying received un-evaluated authentication data. In some embodiments, for example, this identification can be performed by the one or more adaptive processing devices 500-1, by one or more of the endpoint devices 106, and/or by the verification engine 208-1 of one or more of the endpoint devices 106. If it is determined that there is additional authentication data, the process can return to block 1706.

If it is determined that there is no additional authentication data, the process 1700 may proceed to block 1720 wherein indicators of the authentication level are retrieved. In some embodiments, for example, the indicator of the authentication level can be retrieved from, for example, one of the data storages 104 such as, for example, the endpoint specification data storage 301, the authentication data storage 312, and/or the verification data storage 313.

After the indicators of the authentication level are retrieved, the process 1700 may proceed to block 1722 wherein the total authentication level is evaluated. In some embodiments, for example, the evaluation the total authentication level can include the comparison of a single indicator of the authentication level and/or the comparison of a combination of a plurality of indicators of the authentication level to the integrity criteria. In some embodiments, for example, this comparison can be performed according to a Boolean function, wherein an authentication level defined as authenticated by the integrity criteria can be assigned a first Boolean value and an authentication level defined as unauthenticated by the integrity criteria can be assigned a second Boolean value. In some embodiments, for example, this comparison can be made by a component of the adaptive authentication system 100 such as, for example, the one or more adaptive processing devices 500-1, one or more of the endpoint devices 106, and/or the verification engine 208-1 of one or more of the endpoint devices 106.

After the total authentication level has been evaluated, the process 1700 may proceed to decision state 1724 wherein it is determined if the endpoint is authenticated. In some embodiments, for example, this determination can be made by a component of the adaptive authentication system 100 such as, for example, the one or more adaptive processing devices 500-1 and/or one or more of the endpoint devices 106 or components thereof. In some embodiments, this determination can include retrieving the assigned Boolean value and determining whether the Boolean value is indicative of the identification of the actual endpoint as the provisional endpoint or of the identification of the actual endpoint as different from the actual endpoint.

If the endpoint is authenticated in that the actual endpoint is identified as the provisional endpoint, then the process 1700 may proceed to block 1726 wherein an indication of authentication is added. In some embodiments, for example, the indication of authentication can be added to one of the data storages 104 of the adaptive authentication system 100 such as, for example, the endpoint specification data storage 301.

After the indication of authentication has been added, the process may proceed to block 1728 wherein an indicator of integrity is provided. In some embodiments, for example, the indicator of integrity can be provided to the endpoint specification data stored in the endpoint specification data storage 301. In some embodiments, for example, the indicator of authentication integrity can be provided to an endpoint via the endpoint device 106 and/or to one or more of the servers of system 100.

Returning again to decision state 1724, if it is determined that the endpoint is not authenticated, then the process 1700 may proceed to block 1730 wherein an indication of non-Authentication is added. In some embodiments, for example, the indication of non-Authentication can be added to one of the data storages 104 of the adaptive authentication system 100 such as, for example, the endpoint specification data storage 301.

After the indication of non-authentication has been added, the process may proceed to block 1732 wherein an indicator of fraud is provided. In some embodiments, for example, the indicator of fraud can be provided to the endpoint specification data stored in the endpoint specification data storage 301. In some embodiments, for example, the indicator of fraud can be provided to an endpoint via the endpoint device 106 and/or to one or more of the servers of system 100.

Figure 18:
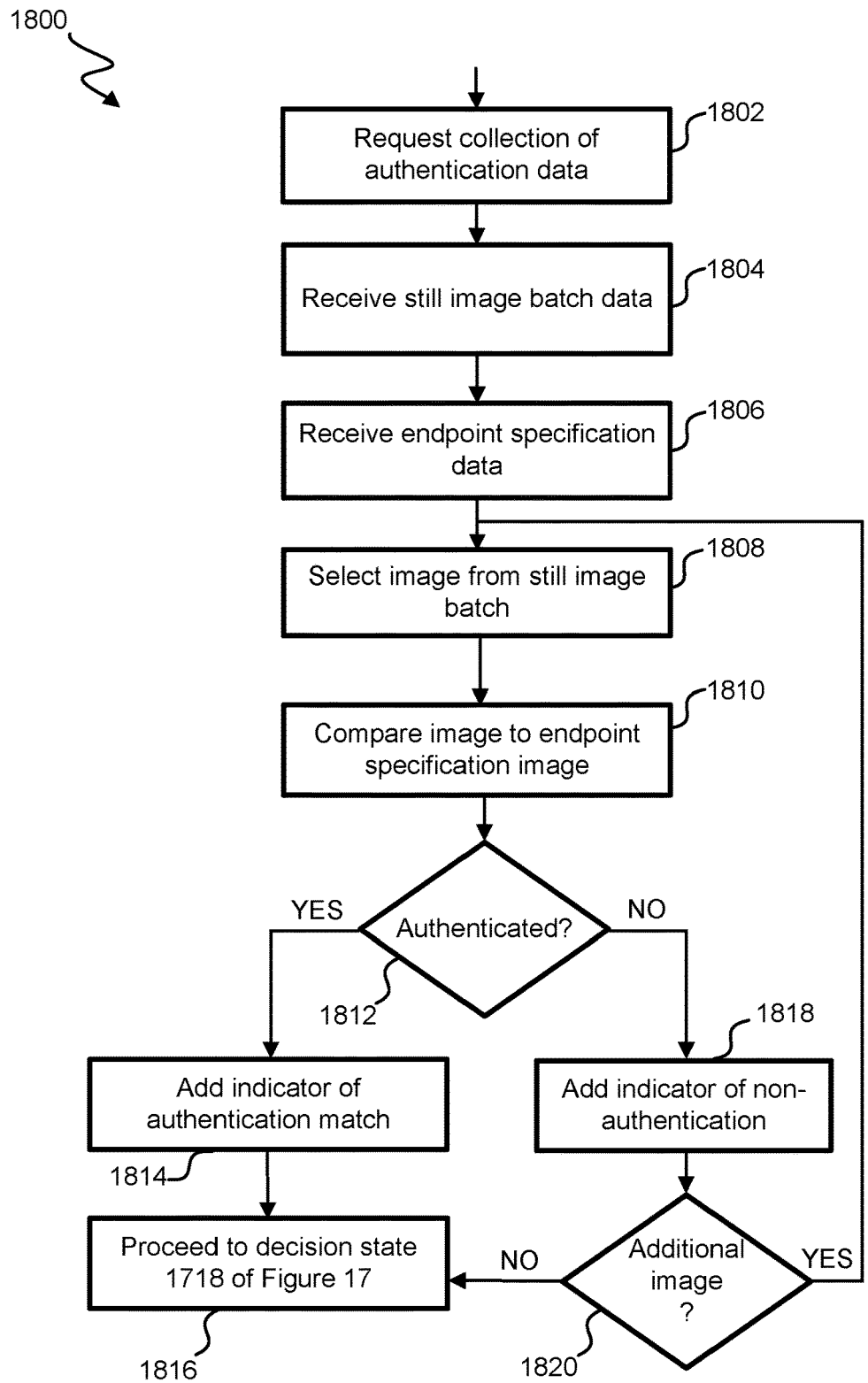
FIG. 18 depicts certain aspects of a method for authentication integrity protection with image batches, in accordance with embodiments of the present disclosure.

With reference now to FIG. 18, a flowchart depicting an embodiment of a process 1800 for protection of authentication integrity with image batches is provided. The process 1800 may begin at block 1802 wherein the capture of authentication data is requested. In some embodiments, for example, verification of authentication integrity (which may be referenced herein as academic integrity) can be provided in connection with an authenticated operation. In some embodiments, for example, an authenticated operation may be associated with the request for authentication integrity verification. Thus, in one embodiment, an authenticated operation can be associated with an indicator of desired authentication integrity verification. If authentication integrity verification is requested, then the adaptive authentication system requests the capture of the authentication data.

After the capture of authentication data has been requested, the process 1800 may proceed to block 1804 wherein still image batch data is received. In some embodiments, for example, the still image batch data can be received from, for example, the camera 209. In some embodiments, the still image batch data can comprise a batch of still images. This batch can include, for example, 2, 3, 4, 5, 6, 7, 8, 9, 10, 20, 50, 100, or any other or intermediate number of still images. Advantageously, for example, the capture of the batch of still images can increase the accuracy of the adaptive authentication system 100 by decreasing the likelihood of a false positive and/or false-negative due to a non-ideal image.

After the still image batch data has been received, the process 1800 may proceed to block 1806 wherein endpoint specification data is received. The endpoint specification data can include, for example, one or several endpoint specification images. These images can be image data of the provisional endpoint. In some embodiments, for example, endpoint specification data can be received by a component of the adaptive authentication system 100 such as, for example, the one or more adaptive processing devices 500-1, one or more of the endpoint devices, and/or one of the components of one or more of the endpoint devices 106 such as, for example, the verification engine 208-1.

After the endpoint specification data has been received, the process may proceed to block 1808 wherein an image is selected from the still image batch. In some embodiments, for example, the image can be selected by a component of the adaptive authentication system 100 such as, for example, the one or more adaptive processing devices 500-1 and/or one or more of the endpoint devices 106 or component thereof.

After the image has been selected, the process 1800 may proceed to block 1810 wherein the selected image is compared to the endpoint specification image. In some embodiments, for example, the selected image can be compared to the endpoint specification image by a component of the adaptive authentication system 100 such as, for example, the one or more adaptive processing devices 500-1 and/or one or more of the endpoint devices 106 or a component thereof. In some embodiments, for example, a value representing the authentication level can be generated based on the comparison of the selected image and the endpoint specification image. This value can reflect the likelihood that the actual endpoint depicted in the selected image is the provisional endpoint depicted in the endpoint specification image.

In some embodiments, for example, this comparison of the selected image and the endpoint specification image can further include the comparison of the authentication level with the integrity criteria. This comparison can be performed according to a Boolean function, wherein an authentication level defined as authenticated by the integrity criteria can be assigned a first Boolean value and an authentication level defined as unauthenticated by the integrity criteria can be assigned a second Boolean value. In some embodiments, for example, this comparison can be made by a component of the adaptive authentication system 100 such as, for example, the one or more adaptive processing devices 500-1, one or more of the endpoint devices 106, and/or the verification engine 208-1 of one or more of the endpoint devices 106.

After the selected images are compared to the endpoint specification image, the process may proceed to decision state 1812 wherein it is determined if the actual endpoint is authenticated. In some embodiments, for example, this determination can be made by a component of the adaptive authentication system 100 such as, for example, the one or more adaptive processing devices 500-1 and/or one or more of the endpoint devices 106 or components thereof. In some embodiments, this determination can include retrieving the assigned Boolean value and determining whether the Boolean value is indicative of the identification of the actual endpoint as the provisional endpoint or of the identification of the actual endpoint as different than the actual endpoint.

If the actual endpoint is authenticated, the process may proceed to block 1814 wherein an indicator of the image match is added. In some embodiments, for example, the indicator of the image match can be added to one of the data storages 104 such as, for example, the endpoint specification data storage 301. After the indicator of image match has been added, the process 1800 may proceed to block 1816 and returns to decision state 1718 of FIG. 17.

Returning again to decision state 1812, if it is determined that the actual endpoint is not authenticated, the process may proceed to block 1818 wherein an indicator of the non-Authentication of the actual endpoint is added. In some embodiments, for example, the indicator of the image non-match can be added to one of the data storages 104 such as, for example, the endpoint specification data storage 301.

After the indicator of the non-authentication is added, the process 1800 may proceed to decision state 1820 wherein it is determined if there is an additional image in the image batch. In some embodiments, for example, this determination can be made by a component of the adaptive authentication system 100 such as, for example, the one or more adaptive processing devices 500-1 and/or one or more of the endpoint devices 106 or components thereof. If it is determined that there is an additional image, the process returns to block 1808. If it is determined that there is no additional image, then the process may proceed to block 1816 and returns to decision state 1718 of FIG. 17.

Figure 19:
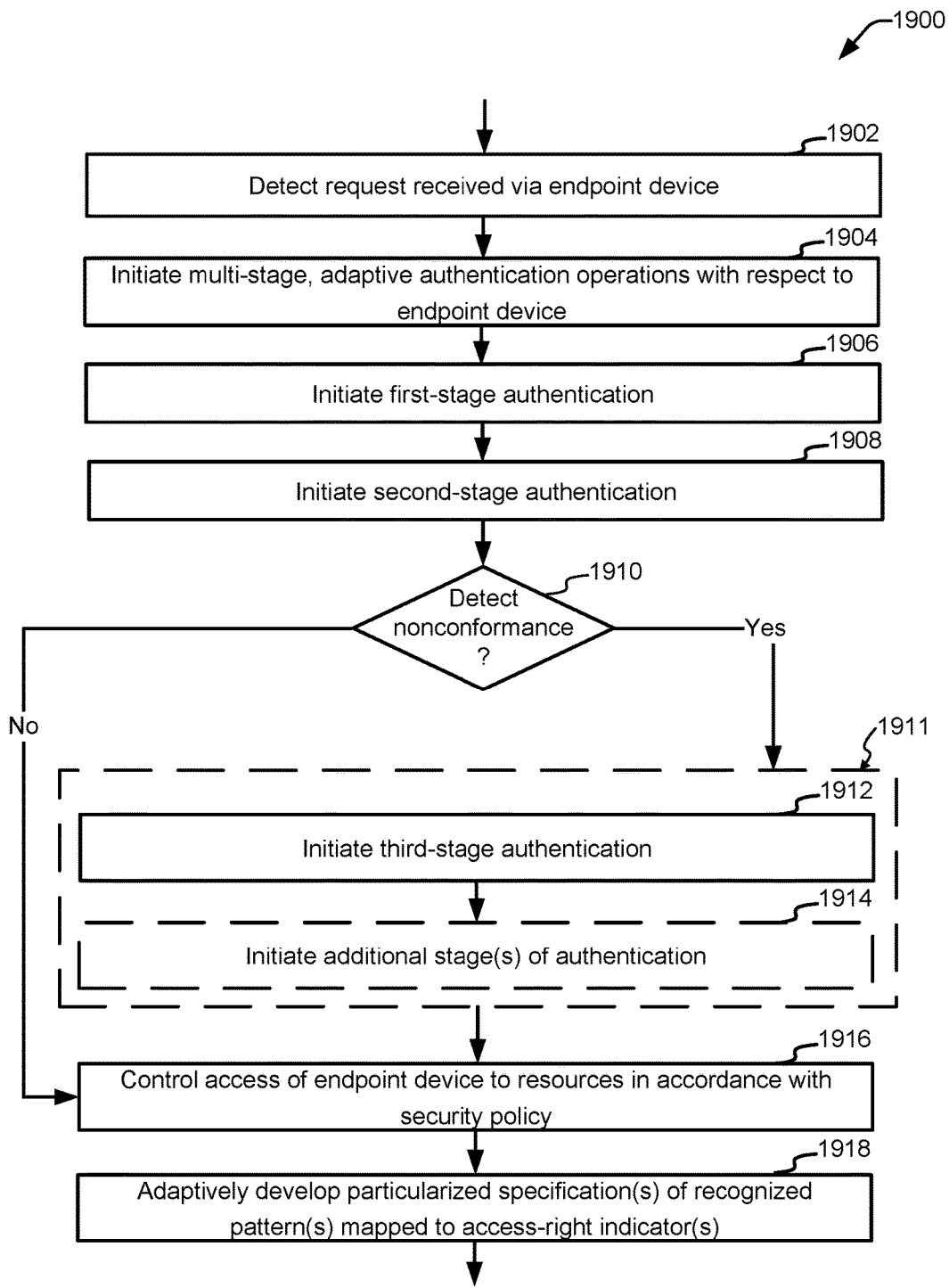
FIG. 19 depicts certain aspects of a method to adaptively secure a set of access operations with respect to one or more electronic resources, in accordance with embodiments of the present disclosure.

FIG. 19 depicts certain aspects of a method 1900 to adaptively secure a set of access operations with respect to one or more electronic resources, in accordance with embodiments of the present disclosure. Again, in various embodiments, one or combination of operations of the method 1900 and the other methods herein may be performed in whole or in part by the adaptive authentication system 100, including the subsystem 100-1 and the one or more adaptive processing devices 500-1. The method 1900 and the subsequent methods may include additional operations, and the steps described herein may be rearranged, omitted, and/or modified to include other operations and/or features described in this disclosure.

As indicated by block 1902, an indicator of a requested authenticated operation may be detected. In some embodiments, for example, the indicator of the requested authenticated operation can be received by the one or more adaptive processing devices of the adaptive authentication system 100. In some embodiments, for example, the indicator of the requested authenticated operation can be received from one of the servers. In addition or in alternative, for example, the indicator of the requested authenticated operation can be received from one of the endpoint devices 106. As indicated by block 1904, after the indicator of the requested authenticated operation has been received, multi-stage, adaptive authentication operations may be initiated with respect to the endpoint device. Such operations may include one or a combination of the following.

Figure 20:
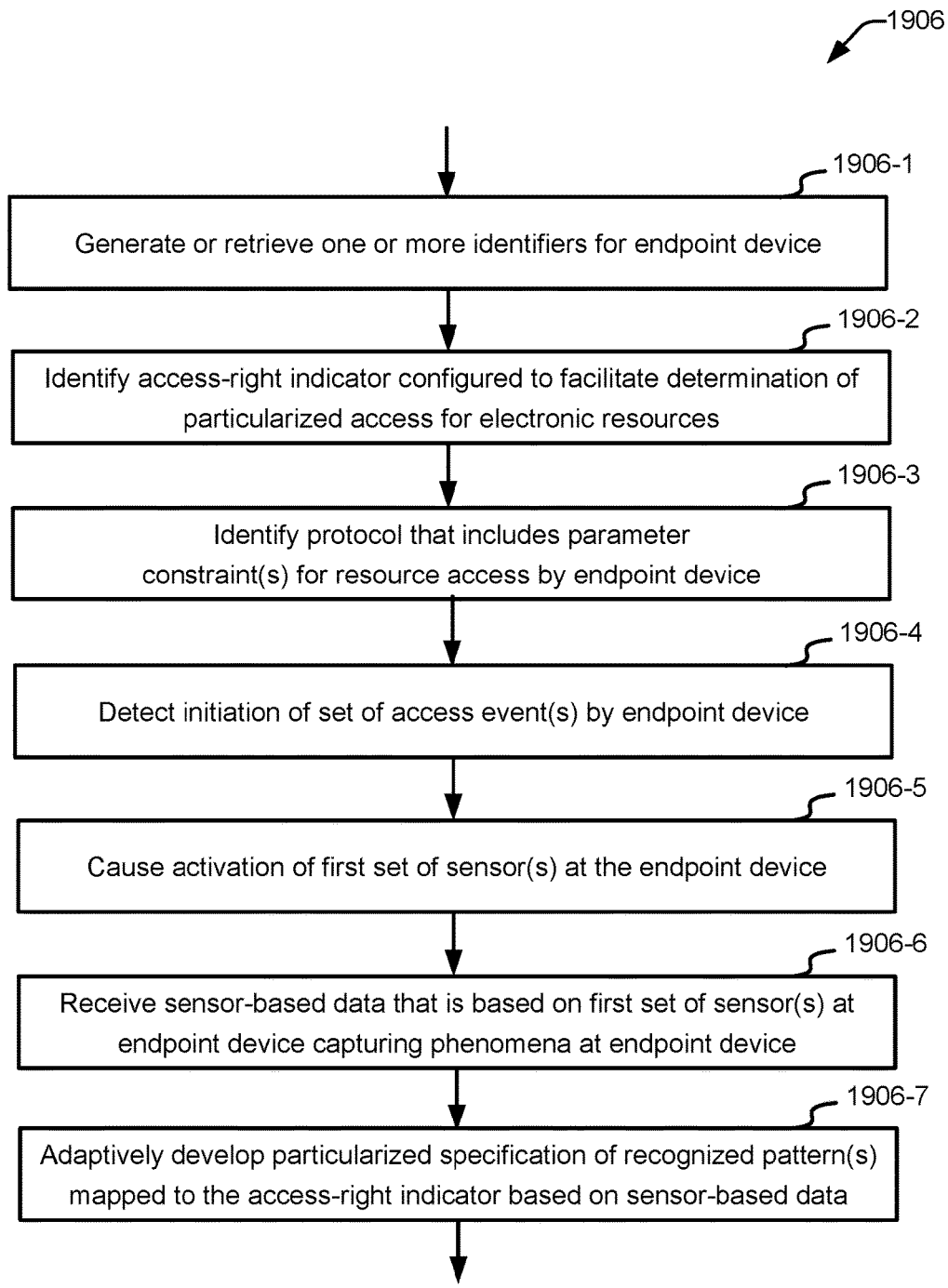
FIG. 20 depicts certain aspects of first-stage authentication, in accordance with embodiments of the present disclosure.

As indicated by block 1906, first-stage authentication may be initiated. FIG. 20 illustrates certain aspects of first-stage authentication, in accordance with embodiments of the present disclosure. With reference to FIG. 20, as indicated by block 1906-1, after the indicator of the requested authenticated operation has been received, one or more identifiers for the endpoint device may be generated or retrieved. The one or more identifiers may uniquely correspond to the endpoint device amongst a set of endpoint devices. The one or more identifiers may also inhibit discovery of an endpoint corresponding to the endpoint device. For example, the one or more identifiers may omit identifying information, such as a name, identifying number (or alphanumeric code) or address.

As indicated by block 1906-2, an access-right indicator configured to facilitate determination of particularized access for electronic resources may be identified. The access-right indicator may be identified based at least in part on the one or more identifiers and/or administrative input. The access-right indicator can be configured to enable a determination as to which types of access are to be granted with respect to one or more electronic resources are to be granted. The access-right indicator may be identified (for example) by looking up an identifier of the endpoint or endpoint device or transmitting a request for the access-right indicator to a resource or authorizing administratory or backend device for a set of one or more permission values, specifications, codes, and/or the like linked to an endpoint identifier.

As indicated by block 1906-3, a protocol that includes parameter constraint(s) for resource access by the endpoint device may be identified. The protocol may be identified based at least in part on the one or more identifiers, the access-right indicator, and/or administratory input. The protocol may include or identify one or more parameter constraints pertaining to operation of a system. A parameter constraint may include, for example, a constraint on a performance result (e.g., specified as one or more individual values, categories and/or via one or more thresholds), which may pertain to (for example) a throughput, operation time or frequency, quality metric, and/or efficiency. A parameter constraint may include, for example, a constraint on resource accesses (e.g., to pertain to endpoints and/or endpoint devices), such as indications as to which types of resources are available for use, types of permitted use and/or times of permitted use. A protocol may have been defined at least in part based on input corresponding to human-provided specifications and/or based on an automated processing of past performance, such as via machine learning.

As indicated by block 1906-4, initiation of a set of one or more access events by the endpoint device may be detected. The set of one or more access events may correspond to one or more of the various interactions with resources via endpoint devices 106 disclosed herein. For example, an access event may correspond to an authenticated operation. In some embodiments, for example, the authenticated operation can be provided to one of the endpoint devices 106, and the authenticated operation can be provided by one of the components of the adaptive authentication system 100 such as, for example, the content management server 102.

As indicated by block 1906-5, activation of a first set of one or more sensors 209 may be caused. As disclosed herein, the first set of one or more sensors may be communicatively connected to the one or more adaptive processing devices 501-1. In some embodiments, the activation of the first set may be caused after the initiation of the set of one or more access events. In other embodiments, the activation may be caused prior to the initiation of the set of one or more access events. For example, the activation may be caused in response to a previous request from the endpoint and/or a previous initiation of one or more access events. The first set of one or more sensors 209 may correspond to a first sensor type. For example, the first set may correspond to a camera 209. However, in other embodiments, the first set of one or more sensors 209 may include a plurality of sensors of two or more different sensor types.

Further, the activation of the first set of one or more sensors may correspond to a first mode of operation. A mode of sensor operation may include sensor activation such that the sensor is in an on state, or a detection state, as a function of time. For instance, in the case of a camera 209, one mode of operation may include the camera being activated for detection and image capture until a deactivation command is received and/or for one or more specified durations. Further, the first mode of operation may include the camera being activated repeatedly at regular intervals, random intervals, and/or upon triggering by the subsystem 100-1. A mode of sensor operation may include sensor activation such that the sensor operates according to one or more specified rates, for example, sampling rates. Hence, in the example of a camera 209, one mode of operation may correspond to a first sampling rate (e.g., number of frames per second, duration of video recording, number of still image captures per minute, number of images in a burst of still image captures, and/or the like).

However, in other embodiments, the first set of one or more sensors 209 may be activated by default and/or may already be activated to capture sensor data at the endpoint device. For example, as disclosed herein, the captured sensor data may include input via an input interface of the endpoint device. Such data may be used by the subsystem 100-1 to determine keystroke patterns, mouse movement patterns, interaction patterns like common misspellings, interaction patterns with software, performance attributes (e.g., patterns of grades, writing style, word choice, typing speed, etc.), and/or the like.

As indicated by block 1906-6, sensor-based data that is based at least in part on the first set of one or more sensors at the endpoint device capturing phenomena at the endpoint device may be received. Hence, such data may be based at least in part on the first set of one or more sensors operating according to a first mode of operation. The sensor-based data may be processed by the subsystem 100-1 and used to develop an endpoint specification. Such sensor-based data may be included in the sensor input 208A and/or endpoint input 106A gathered and processed by the monitoring engine 521, as disclosed above with respect to FIG. 15.

Referring to FIG. 20, as indicated by block 1906-7, a particularized specification of one or more recognized patterns mapped to the access-right indicator may be adaptively developed based at least in part on processing the sensor-based data. For example, as disclosed above with respect to FIG. 15, the matching engine 507 may adaptively develop the particularized specification one or more recognized patterns mapped to the access-right indicator corresponding to a particular endpoint. The particularized specification of the one or more recognized patterns may include one or more recognized patterns of sensor input. The particularized specification may include a set of values of pattern data 716 that may be structured data corresponding to anticipated sensor input corresponding to one or more of the types of sensors 209.

Referring again to FIG. 19, second-stage authentication may be initiated, as indicated by block 1908. In some embodiments, the second-stage authentication may include ongoing operation of the first set of one or more sensors 209 after a specified time period or limit imposed on the first-stage authentication, which may include after one or more regular intervals, one or more random intervals, and/or upon triggering by the subsystem 100-1. The second-stage authentication may, in some embodiments, include causing activation of the first set of one or more sensors 209 again at a later time subsequent to the activation of the first set along with the first-stage authentication. In various such embodiments, the subsequent activation may be according to the same mode of operation as the first mode of operation or may be according to a different mode of operation. In other embodiments, the second-stage authentication may include causing activation of a second set of one or more sensors 209 that is partially or completely different from the first set of one or more sensors 209. In some embodiments, the second set of one or more sensors 209 may include one or more different sensors of one or more different types, different from the first set of one or more sensors 209. With some embodiments, the second-stage authentication may include operations similar to those indicated by blocks 1906-5 and 1906-6, but based at least in part on a different set of one or more sensors.

Per the second-stage authentication, additional sensor-based data may be received. In various embodiments, the additional sensor-based data may be one or more of based at least in part on the first set of one or more sensors, based at least in part on the second set of one or more sensors at the endpoint device, and/or based at least in part on input via an input interface of the endpoint device. Again, such sensor-based data may be included in the sensor input 208A and/or endpoint input 106A gathered and processed by the monitoring engine 521. The subsystem 101-1 may derive one or more values corresponding to the subsequent sensor-based data and may compare the one or more derived values to one or more stored values mapped to the access-right indicator. For instance, the subsystem 101-1 may process the subsequent sensor-based data to identify distinctive values for comparison to the set of values of pattern data 716 that may be structured data stored in the particularized specification.

As indicated by block 1910, it may be determined whether a nonconformance and/or inconsistency is detected. For example, the matching engine 507 of the subsystem 101-1 may compare the additional sensor-based data to stored reference data. This may include determining whether a deviation of the additional data with respect to the particularized specification of the one or more recognized patterns mapped to the access-right indicator is detected.

In the case that a nonconformance and/or inconsistency is not detected, the operational flow may proceed to block 1916. However, in the case that a nonconformance and/or inconsistency is detected, the operational flow may proceed to additional machine-intelligent authentication, as indicated by block 1911.

As indicated by block 1912, third-stage authentication may be initiated. In various embodiments, the third-stage authentication may include causing activation of a second set of one or more sensors 209 that is partially or completely different from the first set of one or more sensors 209. In various embodiments, the third-stage authentication may include causing activation of a third set of one or more sensors 209 that is partially or completely different from the first set of one or more sensors 209 and/or the second set of one or more sensors 209. In various embodiments, the third set of one or more sensors 209 may include one or more different sensors of one or more different types, different from the first set of one or more sensors 209 and/or the second set of one or more sensors 209. With some embodiments, the third-stage authentication may include operations similar to those indicated by blocks 1906-5 and 1906-6, but based at least in part on a different set of one or more sensors. Hence, the third-stage authentication may include, responsive to the detection of the nonconformance, selectively causing an activation adjustment in operation of one or both of the first set of one or more sensors and the second set of one or more sensors, and collecting subsequent sensor-based data based at least in part on the activation adjustment of one or both of the first set of one or more sensors and the second set of one or more sensors. The activation adjustment may be a function of an authentication score that is based at least in part on the additional data.

Further, the sensor activation of the third-stage authentication may correspond to another particularized mode of operation, which may, in various embodiments, be different from the first mode of operation. For instance, a second mode of operation may include the one or more sensors being activated for different durations and/or according to one or more specified rates (e.g., sampling rates). By way of example, the second mode of operation may include throttling of the one or more sensors—say, camera 209—to operate for one or more specified times according to a second sampling rate (e.g., number of frames per second, duration of video and/or audio recording, number of repeated video recordings, number of still image captures per minute, number of images in a burst of still image captures, and/or the like) that is different from the first sampling rate. One difference in the operational modes may be a function of time—e.g., sensor activation for longer periods of time and/or at shorter intervals, which may correspond to one or more rolling windows that may allow a period of time of sensor-captured phenomena to be reviewed via an administrative device from before a triggering event and after the triggering event. In addition or in alternative, another difference in the operational modes may be a function of sensor configuration and/or resolution—e.g., throttling the sampling rate such that the subsequent sampling rate is greater than the previous sampling rate.

Figure 21:
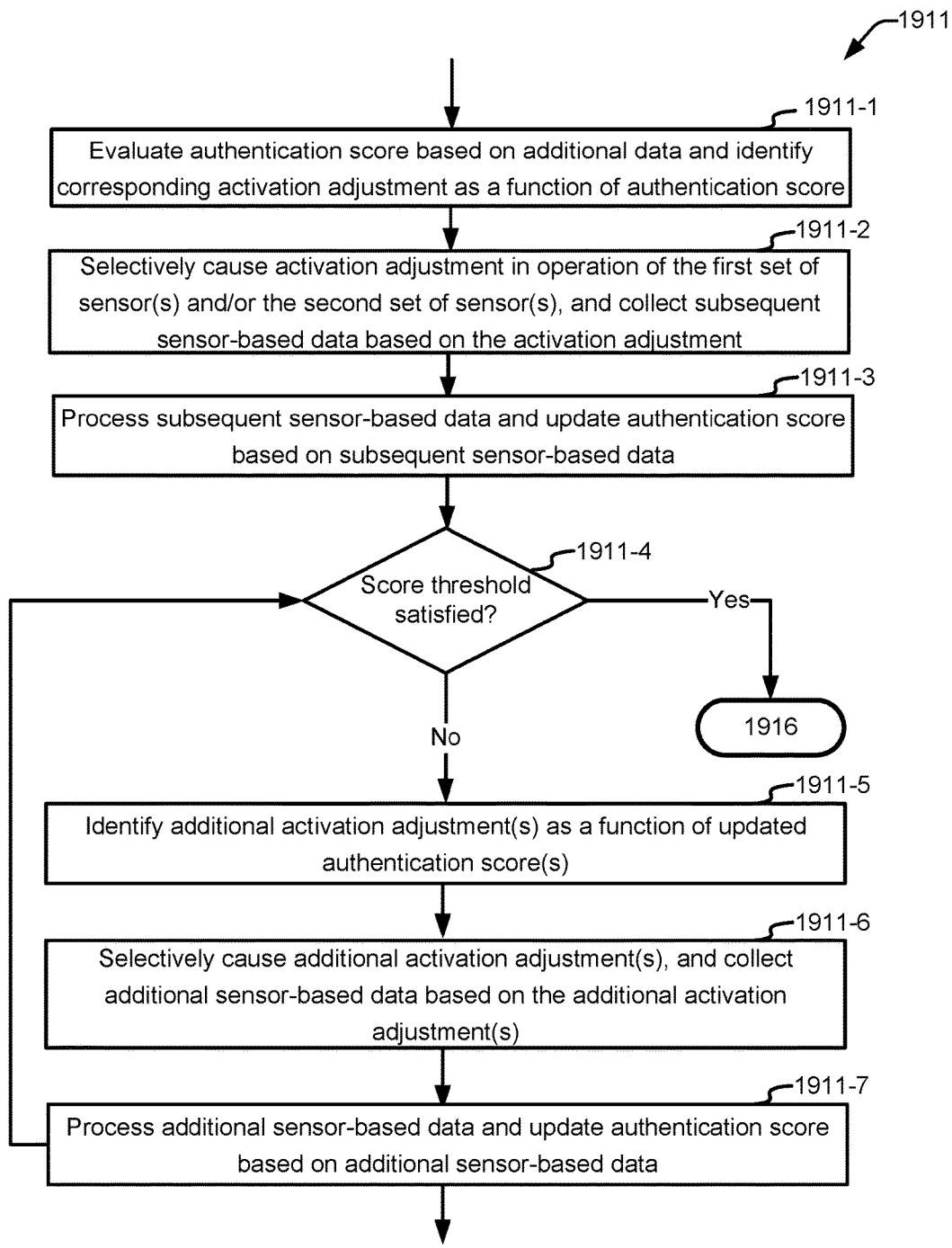
FIG. 21 depicts certain aspects of additional machine-intelligent authentication, in accordance with embodiments of the present disclosure.

FIG. 21 illustrates certain aspects of additional machine-intelligent authentication, in accordance with embodiments of the present disclosure. With reference to FIG. 21, as indicated by block 1911-1, the authentication score based at least in part on the additional sensor-based data may be evaluated with respect to the protocol for the endpoint device. A corresponding activation adjustment may be identified as a function of the authentication score. As indicated by block 1911-2, the activation adjustment in operation of the first set of one or more sensors and/or the second set of one or more sensors may be selectively caused, and subsequent sensor-based data based at least in part on the activation adjustment may be collected. This may correspond to the operations indicated by block 1912 of FIG. 19. As indicated by block 1911-3, the subsequent sensor-based data may be processed, and the authentication score may be updated based at least in part on the subsequent sensor-based data.

As indicated by block 1911-4, it may be determined whether a score threshold is satisfied. For example, in one case, the updated authentication score may meet or exceed a positive threshold dispositive of authentication. In case, the updated authentication score may meet or exceed a negative threshold dispositive of a lack of integrity, high-level suspicion, and/or fraud. In either case, the process flow may transition to block 1916, or access of the endpoint device to resources may be controlled in accordance with security policy. However, in another case, the authentication score may not necessarily satisfy a threshold, but may be within a midrange that is not deemed dispositive of authentication or fraud or the like. And such, the process flow may transition to block 1911-5.

As indicated by block 1911-5, one or more additional activation adjustments may be identified as a function of the updated authentication score. As indicated by block 1911-6, the additional sensor-based data gathered pursuant to the one or more additional activation adjustments may be processed, and the additional sensor-based data may be collected based at least in part on the one or more additional activation adjustments. As indicated by block 1911-7, the authentication score may be updated based at least in part on the additional sensor-based data. The process flow may loop back to block 1911-4 for a subsequent determination of whether the updated authentication score satisfies a score threshold. These operations may correspond to the operations indicated by block 1914 of FIG. 19. As indicated by block 1914, one or more additional stages of authentication may be implemented. As in the depicted example, in some embodiments, one or more additional stages may be implemented as a function of authentication score. Say, in the case of the authentication score in a midrange that is not deemed dispositive of authentication or fraud, additional stages of authentication may be implemented with different operational modes and/or sensor types in an effort to gather more authentication data to develop a more definitive authentication score. However, in some embodiments, in the case of the third-stage authentication sufficiently authenticating the endpoint, one or more additional stages may still be implemented as ongoing, periodic, or random checks to confirm authentication. In any case, the process flow may transition to block 1916 directly from block 1912 (e.g., when the authentication score sufficiently definitive to satisfy one or more thresholds) or indirectly from block 1912 by way of one or more additional stages of authentication.

The technical improvements provided by the subsystem 100-1 include improvements in accuracy, speed, timeliness, adaptability, sensitivity, and responsiveness in machine authentication based at least in part on adaptive authentication that performs appropriate multi-stage, multi-modal authentication in real-time using adaptive protocols. In some embodiments, the protocol may be based at least in part a precedence order of types of sensor-based authentication. The precedence order may be based at least in part on what types of sensors are available and adequately operational at a given endpoint device. For example, various sets of different types of sensors may be available in operational at various endpoint devices. The subsystem may detect available and operational sensors at a given endpoint device and adjust the protocol based at least in part on the availability. Moreover, the subsystem may detect nonoperational or low-quality sensors and adjust the protocol based at least in part on the practical unavailability of such sensors.

Additionally or alternatively, the precedence order may be based at least in part on reliability of various sensor-based authentication modes. As disclosed herein, certain authentication methods may be deemed more reliable than others. For example, fingerprint and facial recognition may be deemed more reliable than performance recognition. Thus, for example, the availability of a more reliable means of authentication may allow for the precedence order to weight the more reliable means more heavily. As a result, some embodiments may employ more reliable means of authentication in one or more early stages of authentication and/or when authentication scores are low (e.g., when an activity determined to have a significantly high likelihood of fraud is detected), which may trigger the more enhanced, more reliable means of authentication as a subsequent stage.

Additionally or alternatively, the protocol may take into account processing and/or storage capacities when adjusting the precedence order with respect to various means of authentication. For example, video/image analysis may require more processing resources than analysis of performance. The subsystem may take into account limitations on processing capacity, particularly in situations involving high numbers of endpoints and thus high authentication demands, and adjust the precedence order with respect to various means of authentication. As another example, audio analysis may less resource intensive than video analysis, which may be reflected by the precedence order. In such embodiments, the less processing intensive means of authentication may be used to a greater extent (e.g., an ongoing basis), and, when a trigger event (e.g., a significant deviation from a learned pattern) is detected, the more resource intensive means of authentication may be triggered as a subsequent stage. In some embodiments, as more resources become available to the subsystem, the subsystem may employ one or more of the more resource-intensive means of authentication in response to trigger events or without a trigger event (e.g., on an ongoing, periodic, or occasional basis).

Each means of authentication may be weighted differently according to the foregoing factors. The subsystem may take the different weights into account with the selection of additional means of authentication being based at least in part on the different weights of the various means of authentication. Additionally or alternatively, the selection of additional means of authentication may be based at least in part on the authentication score derived based at least in part on one or more previous means of authentication. For example, if an initial means of authentication is weighted heavily according to various factors (e.g., which may include reliability of authentication) and the current authentication score is relatively high to indicate a high level of authentication (i.e., a high likelihood of integrity), a subsequent means of authentication that is less reliable and that requires less processing power may be selected.

In some embodiments, the operational modes of the means of authentication may likewise be functions of authentication scores. For example, shorter operational durations, longer intervals, and/or smaller samples may correspond to operational modes selected as a function of high authentication scores. Conversely, longer operational durations, shorter intervals, and/or larger samples may correspond operational modes selected as a function of low authentication scores. Accordingly, more extensive operational modes may be selected by the subsystem in response to a triggering event. In various embodiments, such enhanced operational modes may be caused prior to causing activation of a different type of sensor, in accordance with the precedence order and is a function of authentication score. In other embodiments, such enhanced operational modes may be caused in conjunction with causing activation of a different type of sensor.

As indicated by block 1916, the access of the endpoint device to resources may then be controlled in accordance with one or more security policies based at least in part on the absence of any nonconformance and/or inconsistency. Performance of at least part of the set of one or more access events may be selectively permitted based at least in part on the processing the subsequent sensor-based data and matching of the one or more derived values corresponding to the subsequent sensor-based data to the one or more stored values mapped to the access-right indicator. However, performance of at least part of the set of one or more access events may be selectively prohibited based at least in part on the processing the subsequent sensor-based data and detecting a mismatch of the one or more derived values corresponding to the subsequent sensor-based data to the one or more stored values mapped to the access-right indicator. The subsequent sensor-based data may be stored in association with the one or more identifiers for the endpoint device, and a communication may be transmitted to a second endpoint device (e.g., that corresponds to an administratory endpoint) to facilitate authenticated access to the subsequent sensor-based data consequent to authentication of the second endpoint device by the one or more adaptive processing devices. For example, the communication may correspond to an email, a push notification, another type of message, a command, and/or the like, and may include a link, hyperlink, and/or another type of redirect command to access the sensor-based data. In various example instances, such access may include viewing one or more video recordings, listening to one or more audio recordings, viewing performance metrics, viewing data from the particularized specification, and/or the like, corresponding to the one or more authentication stages. Hence, notifications may include any suitable data to allow for system management, such as status, image data, audio and/or video data, configuration data, pattern data, summary metrics regarding a particularized specification, summary metrics regarding mismatches of derived sets of values, past performance metrics, anticipated input and performance metrics, and/or the like.

In some embodiments, the communication may correspond to an interrupt and/or a command a command that may interrupt one or more current processes on the second endpoint device and/or automatically launch, invoke, wake up, open, and/or otherwise activate a program, application, and/or subroutine on the second endpoint device to act as a notification and force immediate execution of operations of the second endpoint device to facilitate such access. Such a program, application, and/or subroutine may be provided directly or indirectly by subsystem 100-1 for installation and execution by the second endpoint device to allow for the notifications and responsive administratory input with one or more user-selectable options and input fields. In one example implementation, one or more modal windows may be generated that prevent further interactions with the second endpoint device without first interacting with the one or more modal windows and accessing the data corresponding to the one or more authentication stages.

Such access may request input to specify whether sensor-based data from one or more sensors should be presented, not presented, or if future notifications related to such sensors should be ignored. Having come to an inference about a particular endpoint that the system derives via its reasoning module, the system may cause one or more notifications to be directed to the second endpoint device to allow for input to confirm, refine, and/or reject the subsystem's inference. If future notifications are specified to be ignored, this may be for a predefined period of time, such as a quarter of an hour, or until log off operations corresponding to the first endpoint at the first endpoint device are executed. As another example, administratory input may include a command to initiate additional stages of authentication, which may include activation of different types of sensors according to different modes of operation for further phenomena capture and evaluation thereof regarding the particular endpoint.

As indicated by block 1918, the particularized specification of the one or more recognized patterns mapped to the access-right indicator may be adaptively developed based at least in part on processing the additional sensor-based data that is gathered and processed pursuant to the additional stages of authentication. Thus, over time, the subsystem 100-1 adapts to the particular endpoint using additional sensor-based data, gather at various times with various types of sensors and various modes of operation. Further, the particularized specification may be adaptively developed based at least in part on processing administratory input solicited with the notifications above that may confirm or deny authentication. Accordingly, the endpoint specifications may be automatically established and developed by the subsystem 100-1, along with system-solicited feedback.

Figure 22:
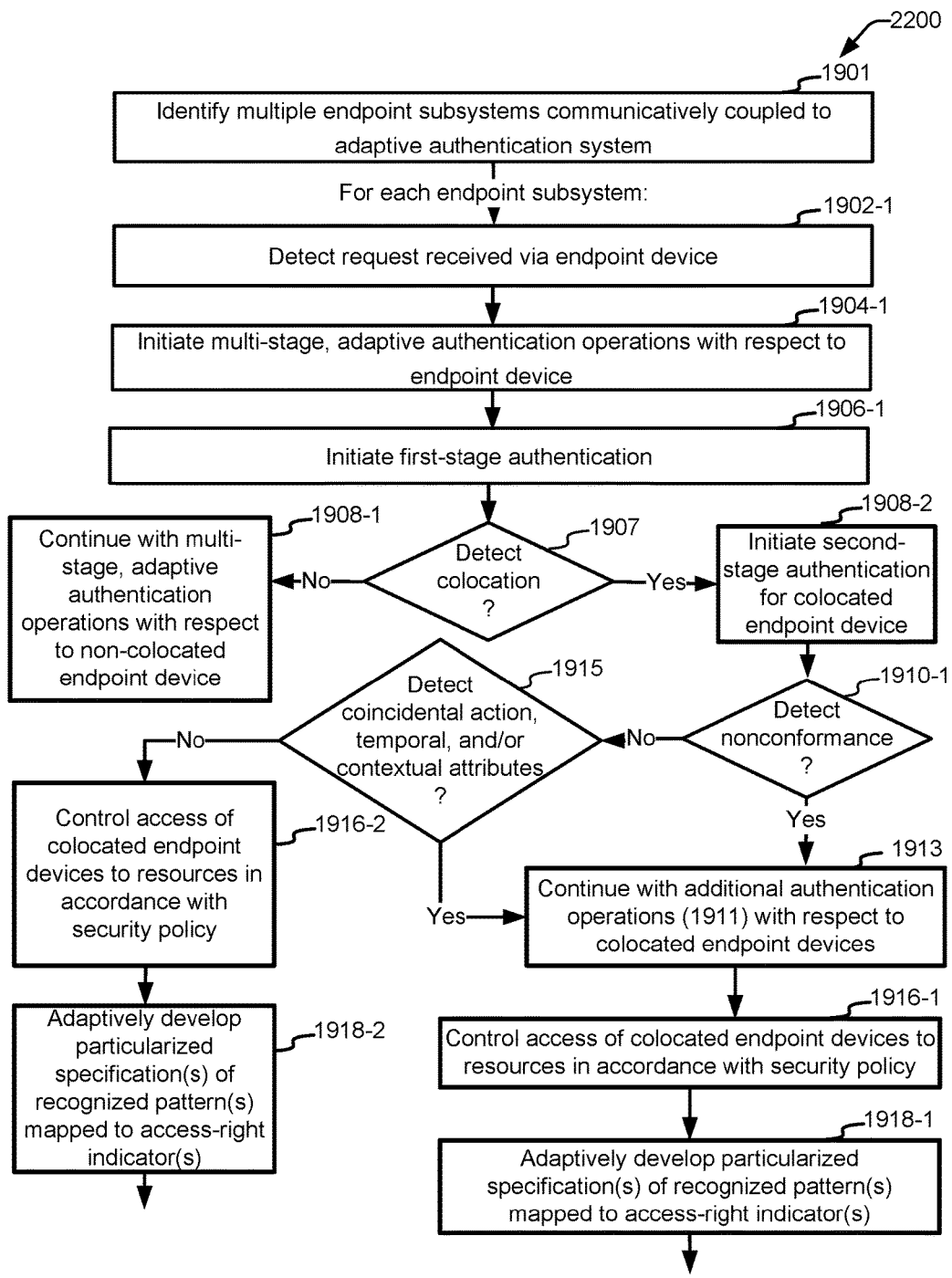
FIG. 22 depicts certain aspects of a method to adaptively secure a set of access operations with respect to electronic resources and with respect to multiple endpoint subsystems, in accordance with embodiments of the present disclosure.

FIG. 22 depicts certain aspects of a method 2200 to adaptively secure a set of access operations with respect to electronic resources, where the subsystem 100-1 adapts method 1900 with respect to multiple endpoint subsystems, in accordance with embodiments of the present disclosure. The technical improvements provided by the subsystem 100-1 include improvements in accuracy, speed, timeliness, adaptability, sensitivity, and responsiveness in machine authentication based at least in part on adaptive authentication that identifies colocated states of endpoint devices and provides machine-intelligent authentication based at least in part on the multiplicity of colocated endpoint devices requesting access to resources in close temporal proximity to enhance authentication measures for at least a subset of the colocated endpoint devices.

As indicated by block 1901, multiple subsystems within the system 100 may be identified. Each subsystem of a plurality of subsystems may include one or more endpoint devices 106. Each endpoint subsystem may further include one or more sensors 209. One or more subsystems may be colocated, while one or more other subsystems may be remotely located from one another in distant geographic locations. Each sub-system of the plurality of sub-systems can be configured to perform one or more different types and/or the same types of operations via access to and usage of different resources. Other embodiments may involve identifying only one subsystem of one or more endpoint devices 106. As indicated by block 1902-1, the identification of multiple subsystems may include detecting requests from multiple subsystems within a threshold of temporal proximity. The threshold of temporal proximity may include a time window (e.g., 15 minutes, one hour, two hours, etc.) and/or a state of multiple overlapping sessions were endpoint devices are logged into the system.

As indicated by FIG. 22, for each identified subsystem of the one or more subsystems, a number of operations to protect authentication integrity and to adaptively secure a set of access operations with respect to one or more electronic resources may be performed. Again, as indicated by block 1902-1, one or more requests received via each respective endpoint device may be detected, which, in various embodiments, may or may not be included in the previous operations indicated by block 1901. As indicated by block 1904-1, multi-stage, adaptive authentication operations may be initiated with respect to each respective endpoint device. As indicated at block 1906-1, first-stage authentication operations may be initiated with respect to each endpoint device.

As indicated by block 1907, it may be determined whether two or more of the endpoint devices are colocated. In some embodiments, the determination of colocation may be based at least in part on a previous request received. For example, the requests may include location identifiers (e.g., facility identifiers, access point identifiers, network identifiers, administrator identifiers, and/or the like). Additionally or alternatively, the determination may include detecting location data corresponding to each endpoint device as disclosed herein, and comparing the detected location data to determine a correspondence of locations of the endpoint devices within a certain proximity threshold (e.g., correspondence of access point, mapping the location data to the same facility, mapping the location data to geographic locations within a threshold distance, and/or the like). If none of the endpoint devices are determined to be colocated, the process flow may transition to block 1908-1, where multistage, adaptive authentication operations may continue with respect to each non-colocated endpoint device as previously disclosed herein. However, if two or more of the endpoint devices are determined to be colocated, the process flow may transition to block 1908-2.

As indicated by block 1908-2, second-stage authentication operations may be initiated for each colocated endpoint device. Such operations may correspond to previously disclosed authentication operations that include collecting action data, temporal data, and/or contextual data for correlation analyses with respect to the colocated endpoint devices. As indicated by block 1910-1, it may be determined whether a nonconformance and/or inconsistency is detected. This may correspond to the previous operations indicated with block 1910 with method 1900.

In the case that a nonconformance and/or inconsistency is detected, the operational flow may proceed to additional machine-intelligent authentication, as indicated by block 1913. Such additional authentication operations may correspond to the operations indicated by block 1911 of previous figures. Again, as part of such operations, one or more activation adjustments may be a function of authentication scores. However, in the case of colocated endpoint devices accessing resources within temporal proximity, such activation adjustments may apply to two or more of the colocated endpoint devices. For example, in some embodiments, when the updated authentication score satisfies a certain threshold as a result of being updated per the detected nonconformance and/or inconsistency, the activation adjustments may apply to subset of the colocated endpoint devices within a certain location proximity threshold (e.g., a certain number of feet or other distance threshold) if such location resolution is available to the subsystem based at least in part on the location determination methods disclosed herein and/or the sensor data available. However, in other cases, the activation adjustments may apply to all of the colocated endpoint devices. In some embodiments, the same activation adjustment may apply to all of the colocated endpoint devices. In some embodiments, different activation adjustments may apply to the different colocated endpoint devices. The determination of the types of activation adjustments apply severally to the different colocated endpoint devices may be based at least in part on the particularized protocols applied to the respective endpoint devices as disclosed previously herein.

The sensor-based data for each endpoint device gathered with the additional authentication operations may be analyzed and compared by the subsystem to identify correlations. For example, if the initially detected nonconformance corresponded to multiple voices or a different voice being detected at one endpoint device, the additional authentication operations may include gathering voice data at other endpoint devices to identify a match of additionally collected voice data with the initially collected voice data. As another example, the additional authentication operations may include gathering video data at other endpoint devices to identify instances where an endpoint may have moved from one endpoint device to another endpoint device. As still another example, if the initially detected nonconformance corresponded to multiple endpoints or a different endpoint being detected at one endpoint device, the additional authentication operations may include gathering video or other visual data at other endpoint devices to identify a match of additionally collected data with the initially collected data.

Each of the colocated endpoint devices may be authenticated separately. Thus, in some cases, one or more of the colocated endpoint devices may be sufficiently authenticated, while, in other cases, one or more of the colocated endpoint devices may be sufficiently authenticated. As indicated by block 1916-1, access of the colocated endpoint devices to resources may be controlled in accordance with security policy as a function of the results of the additional authentication operations. And, as indicated by block 1918-1, the particularized specifications of each of the colocated endpoint devices may be adaptively developed based at least in part on processing the additional sensor-based data that is gathered and processed pursuant to any of the stages of authentication.

If, at block 1910-1, a nonconformance and/or inconsistency is detected, the operational flow may proceed to block 1915. As indicated by block 1915, it may be determined whether coincidental action attributes, temporal attributes, and/or contextual attributes are detected with respect to two or more colocated endpoint devices. Such detection may be based at least in part on the subsystem analyzing the action data, temporal data, and/or contextual data, as disclosed herein. For example, time on task, timing of transitions between tasks, and/or the like may be analyzed to detect patterns of coincidental timing with respect to such temporal metrics. As another example, performance, including endpoint input, may be analyzed to detect coinciding patterns. The patterns of coincidental timing and/or performance may be deemed questionable or suspicious activity. In addition, similarities of endpoint devices may be taken into account to detect correlation of similar and/or identical types of resource access of multiple endpoint devices in close temporal proximity. The types of resource access operations could correspond to one another based on subject, sequence, classification, and would like. When such attributes are correlated between two or more endpoints, authentication scores of the two or more endpoints may be lowered, and the process flow may transition to block 1913.

Again, as indicated by block 1913, additional intelligent authentication may be performed, and operations may flow from there as previously described. However, in some embodiments, the additional authentication may be performed only with respect to those colocated endpoint devices identified via the correlated attributes. Accordingly, the additional authentication may target only a subset of the colocated endpoint devices.

If, at block 1910-1, a nonconformance and/or inconsistency is not detected, the operational flow may proceed to block 1916-2. As indicated by block 1916-2, access of the colocated endpoint devices to resources may be controlled in accordance with security policy. And, as indicated by block 1918-2, the particularized specifications of each of the colocated endpoint devices may be adaptively developed based at least in part on processing any additional sensor-based data that is gathered and processed pursuant to any stages of authentication.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary operations may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long team, short term, volatile, nonvolatile, or other storage medium and is not to be limited to any particular type of memory or number of memories, or type of media upon which memory is stored.

Moreover, as disclosed herein, the terms "storage medium," "machine-readable media," "processor-readable media," "computer-readable media," and variations of such terms may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed:

1. An adaptive authentication system to adaptively secure a set of access operations with respect to one or more electronic resources, the adaptive authentication system comprising:
one or more adaptive processing devices; and
one or more non-transitory, computer-readable storage media storing instructions which, when executed by the one or more adaptive processing devices, cause the one or more adaptive processing devices to perform actions including:
detecting a request received via an endpoint device, and initiating adaptive authentication with respect to the endpoint device, the adaptive authentication comprising:
responsive to the request, generating or retrieving one or more identifiers for the endpoint device, the one or more identifiers uniquely corresponding to the endpoint device amongst a set of endpoint devices;
identifying an access-right indicator configured to facilitate determination of whether particularized access for electronic resources is to be granted;
detecting initiation of a set of one or more access events by the endpoint device;
receiving sensor-based data that is based at least in part on a first set of one or more sensors at the endpoint device capturing phenomena at the endpoint device, where the first set of one or more sensors is communicatively connected to the one or more adaptive processing devices;
adaptively developing a particularized specification of one or more recognized patterns mapped to the access-right indicator based at least in part on processing the sensor-based data, the particularized specification of the one or more recognized patterns comprising one or more recognized patterns of sensor input;

receiving additional data that is one or more of based at least in part on the first set of one or more sensors, based at least in part on a second set of one or more sensors at the endpoint device, and/or based at least in part on input via an input interface of the endpoint device;

detecting a nonconformance of the additional data with respect to the particularized specification of the one or more recognized patterns mapped to the access-right indicator, and responsive to the detection of the nonconformance, selectively causing an activation adjustment in operation of one or both of the first set of one or more sensors and the second set of one or more sensors, and collecting subsequent sensor-based data based at least in part on the activation adjustment of one or both of the first set of one or more sensors and the second set of one or more sensors.

2. The adaptive authentication system to adaptively secure a set of access operations with respect to one or more electronic resources as recited in claim 1, wherein the actions further include:

consequent to the request received via the endpoint device, causing activation of the first set of one or more sensors at the endpoint device.

3. The adaptive authentication system to adaptively secure a set of access operations with respect to one or more electronic resources as recited in claim 1, wherein the actions further include:

selectively permitting performance of at least part of the set of one or more access events based at least in part on processing the subsequent sensor-based data and matching one or more derived values corresponding to the subsequent sensor-based data to one or more stored values mapped to the access-right indicator.

4. The adaptive authentication system to adaptively secure a set of access operations with respect to one or more electronic resources as recited in claim 3, wherein the actions further include:

after the selectively permitting performance, receiving subsequently detected data that is one or more of based at least in part on the first set of one or more sensors, based at least in part on the second set of one or more sensors at the endpoint device, based at least in part on a third set of one or more sensors at the endpoint device, and/or based at least in part on additional input via the input interface of the endpoint device;

detecting a subsequent nonconformance of the subsequently detected data with respect to the particularized specification of the one or more recognized patterns mapped to the access-right indicator;

responsive to the detection of the subsequent nonconformance, selectively causing a subsequent activation adjustment in operation of one or more of the first set of one or more sensors, the second set of one or more sensors, and/or the second set of one or more sensors; and selectively prohibiting further access based at least in part on the subsequent activation adjustment.

5. The adaptive authentication system to adaptively secure a set of access operations with respect to one or more electronic resources as recited in claim 1, wherein the actions further include:

selectively prohibiting performance of at least part of the set of one or more access events based at least in part on processing the subsequent sensor-based data and detecting a mismatch of one or more derived values corresponding to the subsequent sensor-based data to one or more stored values mapped to the access-right indicator.

6. The adaptive authentication system to adaptively secure a set of access operations with respect to one or more electronic resources as recited in claim 1, wherein the actions further include:

storing the subsequent sensor-based data in association with the one or more identifiers for the endpoint device; and transmitting a communication to a second endpoint device to facilitate authenticated access to the subsequent sensor-based data consequent to authentication of the second endpoint device by the one or more adaptive processing devices.

7. The adaptive authentication system to adaptively secure a set of access operations with respect to one or more electronic resources as recited in claim 1, wherein the particularized specification of the one or more recognized patterns of the sensor input mapped to the access-right indicator comprises a set of values corresponding to anticipated sensor input, and the actions further include processing the subsequent sensor-based data and comparing one or more derived values corresponding to the subsequent sensor-based data to the set of values.

8. One or more non-transitory, processor-readable media having processor-readable instructions thereon which, when executed by one or more processing devices, cause the one or more processing devices to facilitate adaptively securing a set of access operations with respect to one or more electronic resources by performing actions including:

detecting a request received via an endpoint device, and initiating adaptive authentication with respect to the endpoint device, the adaptive authentication comprising:

responsive to the request, generating or retrieving one or more identifiers for the endpoint device, the one or more identifiers uniquely corresponding to the endpoint device amongst a set of endpoint devices;

identifying an access-right indicator configured to facilitate determination of whether particularized access for electronic resources is to be granted;

detecting initiation of a set of one or more access events by the endpoint device;

receiving sensor-based data that is based at least in part on a first set of one or more sensors at the endpoint device capturing phenomena at the endpoint device, where the first set of one or more sensors is communicatively connected to the one or more processing devices;

adaptively developing a particularized specification of one or more recognized patterns mapped to the access-right indicator based at least in part on processing the sensor-based data, the particularized specification of the one or more recognized patterns comprising one or more recognized patterns of sensor input;

receiving additional data that is one or more of based at least in part on the first set of one or more sensors, based at least in part on a second set of one or more sensors at the endpoint device, and/or based at least in part on input via an input interface of the endpoint device;

detecting a nonconformance of the additional data with respect to the particularized specification of the one or more recognized patterns mapped to the access-right indicator; and responsive to the detection of the nonconformance, selectively causing an activation adjustment in operation of one or both of the first set of one or more sensors and the second set of one or more sensors, and collecting subsequent sensor-based data based at least in part on the activation adjustment of one or both of the first set of one or more sensors and the second set of one or more sensors.

9. The one or more non-transitory, processor-readable media as recited in claim 8, wherein the actions further include:

consequent to the request received via the endpoint device, causing activation of the first set of one or more sensors at the endpoint device.

10. The one or more non-transitory, processor-readable media as recited in claim 8, wherein the actions further include:

selectively permitting performance of at least part of the set of one or more access events based at least in part on processing the subsequent sensor-based data and matching one or more derived values corresponding to the subsequent sensor-based data to one or more stored values mapped to the access-right indicator.

11. The one or more non-transitory, processor-readable media as recited in claim 10, wherein the actions further include:

after the selectively permitting performance, receiving subsequently detected data that is one or more of based at least in part on the first set of one or more sensors, based at least in part on the second set of one or more sensors at the endpoint device, based at least in part on a third set of one or more sensors at the endpoint device, and/or based at least in part on additional input via the input interface of the endpoint device;

detecting a subsequent nonconformance of the subsequently detected data with respect to the particularized specification of the one or more recognized patterns mapped to the access-right indicator;

responsive to the detection of the subsequent nonconformance, selectively causing a subsequent activation adjustment in operation of one or more of the first set of one or more sensors, the second set of one or more sensors, and/or the second set of one or more sensors; and selectively prohibiting further access based at least in part on the subsequent activation adjustment.

12. The one or more non-transitory, processor-readable media as recited in claim 8, wherein the actions further include:

selectively prohibiting performance of at least part of the set of one or more access events based at least in part on processing the subsequent sensor-based data and detecting a mismatch of one or more derived values corresponding to the subsequent sensor-based data to one or more stored values mapped to the access-right indicator.

13. The one or more non-transitory, processor-readable media as recited in claim 8, wherein the actions further include:

storing the subsequent sensor-based data in association with the one or more identifiers for the endpoint device; and transmitting a communication to a second endpoint device to facilitate authenticated access to the subsequent sensor-based data consequent to authentication of the second endpoint device by the one or more processing devices.

14. A method of adaptive authentication to adaptively secure a set of access operations with respect to one or more electronic resources, the method comprising:

detecting a request received via an endpoint device, and initiating adaptive authentication with respect to the endpoint device, the adaptive authentication comprising:

responsive to the request, generating or retrieving one or more identifiers for the endpoint device, the one or more identifiers uniquely corresponding to the endpoint device amongst a set of endpoint devices;

identifying an access-right indicator configured to facilitate determination of whether particularized access for electronic resources is to be granted;

detecting initiation of a set of one or more access events by the endpoint device;

receiving sensor-based data that is based at least in part on a first set of one or more sensors at the endpoint device capturing phenomena at the endpoint device, where the first set of one or more sensors is communicatively connected to one or more adaptive processing devices;

adaptively developing a particularized specification of one or more recognized patterns mapped to the access-right indicator based at least in part on processing the sensor-based data, the particularized specification of the one or more recognized patterns comprising one or more recognized patterns of sensor input;

receiving additional data that is one or more of based at least in part on the first set of one or more sensors, based at least in part on a second set of one or more sensors at the endpoint device, and/or based at least in part on input via an input interface of the endpoint device;

detecting a nonconformance of the additional data with respect to the particularized specification of the one or more recognized patterns mapped to the access-right indicator; and responsive to the detection of the nonconformance, selectively causing an activation adjustment in operation of one or both of the first set of one or more sensors and the second set of one or more sensors, and collecting subsequent sensor-based data based at least in part on the activation adjustment of one or both of the first set of one or more sensors and the second set of one or more sensors.

15. The method of adaptive authentication to adaptively secure a set of access operations with respect to one or more electronic resources as recited in claim 14, the method further comprising:

consequent to the request received via the endpoint device, causing activation of the first set of one or more sensors at the endpoint device.

16. The method of adaptive authentication to adaptively secure a set of access operations with respect to one or more electronic resources as recited in claim 14, the method further comprising:

selectively permitting performance of at least part of the set of one or more access events based at least in part on processing the subsequent sensor-based data and matching one or more derived values corresponding to the subsequent sensor-based data to one or more stored values mapped to the access-right indicator.

17. The method of adaptive authentication to adaptively secure a set of access operations with respect to one or more electronic resources as recited in claim 16, the method further comprising:
- after the selectively permitting performance, receiving subsequently detected data that is one or more of based at least in part on the first set of one or more sensors, based at least in part on the second set of one or more sensors at the endpoint device, based at least in part on a third set of one or more sensors at the endpoint device, and/or based at least in part on additional input via the input interface of the endpoint device;
- detecting a subsequent nonconformance of the subsequently detected data with respect to the particularized specification of the one or more recognized patterns mapped to the access-right indicator;
- responsive to the detection of the subsequent nonconformance, selectively causing a subsequent activation adjustment in operation of one or more of the first set of one or more sensors, the second set of one or more sensors, and/or the second set of one or more sensors; and
- selectively prohibiting further access based at least in part on the subsequent activation adjustment.

18. The method of adaptive authentication to adaptively secure a set of access operations with respect to one or more electronic resources as recited in claim 14, the method further comprising:
- selectively prohibiting performance of at least part of the set of one or more access events based at least in part on processing the subsequent sensor-based data and detecting a mismatch of one or more derived values corresponding to the subsequent sensor-based data to one or more stored values mapped to the access-right indicator.

19. The method of adaptive authentication to adaptively secure a set of access operations with respect to one or more electronic resources as recited in claim 14, the method further comprising:
- storing the subsequent sensor-based data in association with the one or more identifiers for the endpoint device; and
- transmitting a communication to a second endpoint device to facilitate authenticated access to the subsequent sensor-based data consequent to authentication of the second endpoint device by the one or more adaptive processing devices.

20. The method of adaptive authentication to adaptively secure a set of access operations with respect to one or more electronic resources as recited in claim 14, wherein the particularized specification of the one or more recognized patterns of the sensor input mapped to the access-right indicator comprises a set of values corresponding to anticipated sensor input, and the method further comprises:
- processing the subsequent sensor-based data; and
- comparing one or more derived values corresponding to the subsequent sensor-based data to the set of values.

* * * * *